(12) United States Patent
Jung et al.

(10) Patent No.: US 12,477,322 B2
(45) Date of Patent: Nov. 18, 2025

(54) ELECTRONIC DEVICE, AND METHOD FOR PROCESSING PROFILE POLICY RULE OF EMBEDDED SUBSCRIBER IDENTIFICATION MODULE BY ELECTRONIC DEVICE

(71) Applicant: Samsung Electronics Co., Ltd., Suwon-si (KR)

(72) Inventors: Jieun Jung, Suwon-si (KR); Sunang Kim, Suwon-si (KR); Junwon Kang, Suwon-si (KR); Hyongjin Ban, Suwon-si (KR); Jeongtak Bae, Suwon-si (KR); Sanghwi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 17/884,951

(22) Filed: Aug. 10, 2022

(65) Prior Publication Data

US 2022/0386105 A1    Dec. 1, 2022

Related U.S. Application Data

(63) Continuation of application No. PCT/KR2021/001658, filed on Feb. 8, 2021.

(30) Foreign Application Priority Data

Feb. 10, 2020    (KR) .................... 10-2020-0015946

(51) Int. Cl.
*H04W 8/20* (2009.01)
*H04W 8/18* (2009.01)
*H04W 12/45* (2021.01)

(52) U.S. Cl.
CPC .......... *H04W 8/205* (2013.01); *H04W 8/183* (2013.01); *H04W 12/45* (2021.01)

(58) Field of Classification Search
CPC ..... H04W 8/205; H04W 8/183; H04W 12/45; H04W 12/08; H04M 1/72469; H04M 1/72448; H04L 63/102
See application file for complete search history.

(56) References Cited

U.S. PATENT DOCUMENTS

| 11,134,372 B2 * | 9/2021 | Park .................. H04W 8/205 |
| 2015/0110035 A1 | 4/2015 | Lee et al. |

(Continued)

FOREIGN PATENT DOCUMENTS

| CA | 3042959 A1 * | 6/2018 | ............ H04W 68/02 |
| KR | 10-2016-0087634 A | 7/2016 | |

(Continued)

OTHER PUBLICATIONS

Korean Office Action dated May 22, 2024, issued in Korean Application No. 10-2020-0015946.

(Continued)

*Primary Examiner* — Julio R Perez
(74) *Attorney, Agent, or Firm* — Jefferson IP Law, LLP

(57) ABSTRACT

An electronic device is provided. The electronic device includes a display device, at least one embedded universal integrated circuit card (eUICC), and at least one processor electrically connected to the display device and the eUICC, wherein the at least one processor is configured to receive an enable request for a first profile stored in the eUICC, in response to the enable request, identify whether at least one profile policy rule (PPR) is applied to the first profile, when the at least one PPR is applied to the first profile as a result of the identification, control to display a first screen including information related to the an application of the PPR through the display device, and upon receiving an enable approval for the first profile input through the first screen, process to enable the first profile.

20 Claims, 63 Drawing Sheets

(56) References Cited

U.S. PATENT DOCUMENTS

| | | | |
|---|---|---|---|
| 2016/0205538 A1 | 7/2016 | Kweon et al. | |
| 2018/0084426 A1 | 3/2018 | Yang | |
| 2018/0324672 A1 | 11/2018 | Kang et al. | |
| 2019/0104401 A1 | 4/2019 | Park et al. | |
| 2019/0253884 A1 | 8/2019 | Fan et al. | |
| 2020/0127991 A1* | 4/2020 | Nix | H04W 12/35 |
| 2020/0314639 A1* | 10/2020 | Yu | H04W 8/183 |
| 2022/0386105 A1* | 12/2022 | Jung | H04W 12/45 |
| 2023/0370949 A1* | 11/2023 | Kang | H04W 48/02 |

FOREIGN PATENT DOCUMENTS

| | | | | |
|---|---|---|---|---|
| KR | 10-2017-0109467 A | 9/2017 | | |
| KR | 10-2006375 B1 | 8/2019 | | |
| KR | 10-2019-0137800 A | 12/2019 | | |
| WO | WO-2016055419 A1 * | 4/2016 | | H04W 12/35 |
| WO | 2019-119267 A1 | 6/2019 | | |
| WO | WO-2021257259 A1 * | 12/2021 | | H04W 12/35 |

OTHER PUBLICATIONS

Korean Office Action dated Mar. 18, 2025, issued in Korean Application No. 10-2020-0015946.

* cited by examiner

ELECTRONIC DEVICE, AND METHOD FOR PROCESSING PROFILE POLICY RULE OF EMBEDDED SUBSCRIBER IDENTIFICATION MODULE BY ELECTRONIC DEVICE

CROSS-REFERENCE TO RELATED APPLICATION(S)

This application is a continuation application, claiming priority under § 365(c), of an International application No. PCT/KR2021/001658, filed on Feb. 8, 2021, which is based on and claims the benefit of a Korean patent application number 10-2020-0015946, filed on Feb. 10, 2020, in the Korean Intellectual Property Office, the disclosure of which is incorporated by reference herein in its entirety.

BACKGROUND

1. Field

The disclosure relates to an electronic device and a method for processing a profile policy rule of an embedded subscriber identification module (eSIM) in an electronic device.

2. Description of Related Art

In a wireless communication system, an electronic device (e.g., user equipment (UE)) may access a wireless communication network and use a voice communication or data communication service in a stopped state or on the move. To provide a communication service to an electronic device, an appropriate authentication process is required. In general, a universal integrated circuit card (UICC) is inserted into the electronic device, and authentication may be performed between the electronic device and the server of the mobile network operator (MNO) through a universal subscriber identity module (USIM) installed in the UICC. UICC may be called subscriber identity module (SIM) in the case of global system for mobile communications (GSM) and universal subscriber identity module (USIM) in the case of wideband code division multiple access (WCDMA), long term evolution (LTE), and new radio (NR).

If the user of the electronic device subscribes to a wireless communication service provided by the mobile network operator, the mobile network operator may provide a UICC (e.g., a SIM card or a USIM card) to the user. The user may insert the provided UICC into her electronic device. If the UICC is inserted into the electronic device, the USIM application installed in the UICC is executed, and an authentication process may be performed with the server the mobile network operator, which stores the same value, using to the international mobile subscriber identity (IMSI) value stored in the UICC and the encryption key value for authentication. After the authentication process is performed, the electronic device may use a wireless communication service.

The UICC may be manufactured as a dedicated card for a specific communication carrier at the request of the specific communication carrier when manufacturing the card and may come equipped with authentication information (e.g., USIM application and subscriber identification (ID) (e.g., IMSI)) for network connection of the corresponding communication carrier and an encryption key (e.g., a known K value or Ki value). The UICC may be provided to subscribers of the communication service through the corresponding communication carrier and, as necessary later, the communication carrier may use technology, such as over the air (OTA), to install, modify, and delete applications within the UICC. The user may insert the UICC into the terminal and use the network and application services of the corresponding communication carrier. When replacing the terminal, the user may insert a removable UICC from the old terminal to the new terminal, thereby using the authentication information, phone number, and personal contact information stored in the UICC on the new terminal.

Unlike UICCs, which are manufactured and distributed exclusively for a specific communication carrier, the user may purchase a specific UICC or the user may subscribe to (or purchase) a communication service after obtaining a UICC and the user may subscribe to and cancel, or change to another communication carrier. Thus, there have been proposed methods for remotely installing the communication carrier's USIM application and subscriber identity ID and encryption key on the UICC, and safely and flexibly installing and managing authentication information for various communication carriers.

For example, there has been proposed so-called embedded UICC (eUICC) capable of remotely installing a profile for providing a communication service through a network without replacing the UICC even when the user changes a communication carrier. The eUICC may be manufactured as a pre-mounted UICC, fixed in the form of a chip, in the terminal during the manufacturing process of the terminal. Accordingly, the eUICC may be used for various terminals that may have a structure in which it is not easy to mount or remove the UICC, such as machine to machine (M2M) or device to device (D2D) terminals, as well as general wireless terminal, such as mobile phones. The eUICC may also be referred to as an eSIM.

The above information is presented as background information only to assist with an understanding of the disclosure. No determination has been made, and no assertion is made, as to whether any of the above might be applicable as prior art with regard to the disclosure.

SUMMARY

The eSIM profile may include profile policy rules (PPR) that restrict the operation of the profile. For example, the PPR may be set so that a state change (e.g., change from the enabled state to disabled state) of the corresponding profile or deleting the profile is limited.

Since the PPR is included in the profile and operates within the electronic device when an operation related to the eSIM profile is performed, the user may not clearly recognize the corresponding operation. Further, when the user changes the state of a specific eSIM profile or deletes the current eSIM profile and installs another eSIM profile, the user's desired operation may not easily be done depending on whether the PPR is applied, causing inconvenience.

According to various embodiments, when using an eSIM profile, there may be provided an electronic device capable of providing a corresponding function according to whether a PPR is applied to the corresponding profile and a method for processing a profile policy rule of an embedded SIM.

In accordance with an aspect of the disclosure, an electronic device is provided. The electronic device includes a display device, at least one embedded universal integrated circuit card (eUICC) each storing at least one subscriber identification information, and at least one processor electrically connected to the display device and the eUICC. The at least one processor may be configured to receive an enable request for a first profile stored in the eUICC, in response to the enable request, identify whether at least one profile policy rule (PPR) is applied to the first profile, when the at least one PPR is applied to the first profile as a result of the identification, control to display a first screen including information related to an application of the PPR through the display device, and upon receiving an enable approval for the first profile input through the first screen, process to enable the first profile.

In accordance with another aspect of the disclosure, a method for operating an electronic device is provided. The method includes receiving an enable request for a first profile stored in at least one embedded universal integrated circuit card (eUICC) each storing at least one subscriber identification information, in response to the enable request, identifying whether at least one profile policy rule (PPR) is applied to the first profile, when the at least one PPR is applied to the first profile as a result of the identification, displaying a first screen including information related to the application of the PPR through a display of the electronic device, and upon receiving an enable approval for the first profile input through the first screen, processing to enable the first profile.

In accordance with another aspect of the disclosure, an electronic device is provided. The electronic device includes a display device, an embedded universal integrated circuit card (eUICC) storing at least one subscriber identification information, and at least one processor electrically connected to the display device and the eUICC. The at least one processor may be configured to receive a disable request for a first profile stored in the eUICC, in response to the disable request, identify whether at least one profile policy rule (PPR) is applied to the first profile, and when the at least one PPR is applied as a result of the identification, display, through the display device, a first screen including information indicating that it is impossible to disable the first profile requested to be disabled.

In accordance with another aspect of the disclosure, a method for operating an electronic device is provided. The method includes receiving a disable request for a first profile stored in an embedded universal integrated circuit card (eUICC) storing at least one subscriber identification information, in response to the disable request, identifying whether at least one profile policy rule (PPR) is applied to the first profile, and when the at least one PPR is applied as a result of the identification, displaying, through the display device, a first screen including information indicating that it is impossible to disable the first profile requested to be disabled.

According to various embodiments, when the eSIM profile is used, a corresponding function may be provided depending on whether a PPR is applied to the profile, so that when the user changes the state of a specific eSIM profile or deletes it and installs another eSIM profile, the user's desired operation may easily be performed depending on whether the PPR is applied.

Other aspects, advantages, and salient features of the disclosure will become apparent to those skilled in the art from the following detailed description, which, taken in conjunction with the annexed drawings, discloses various embodiments of the disclosure.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
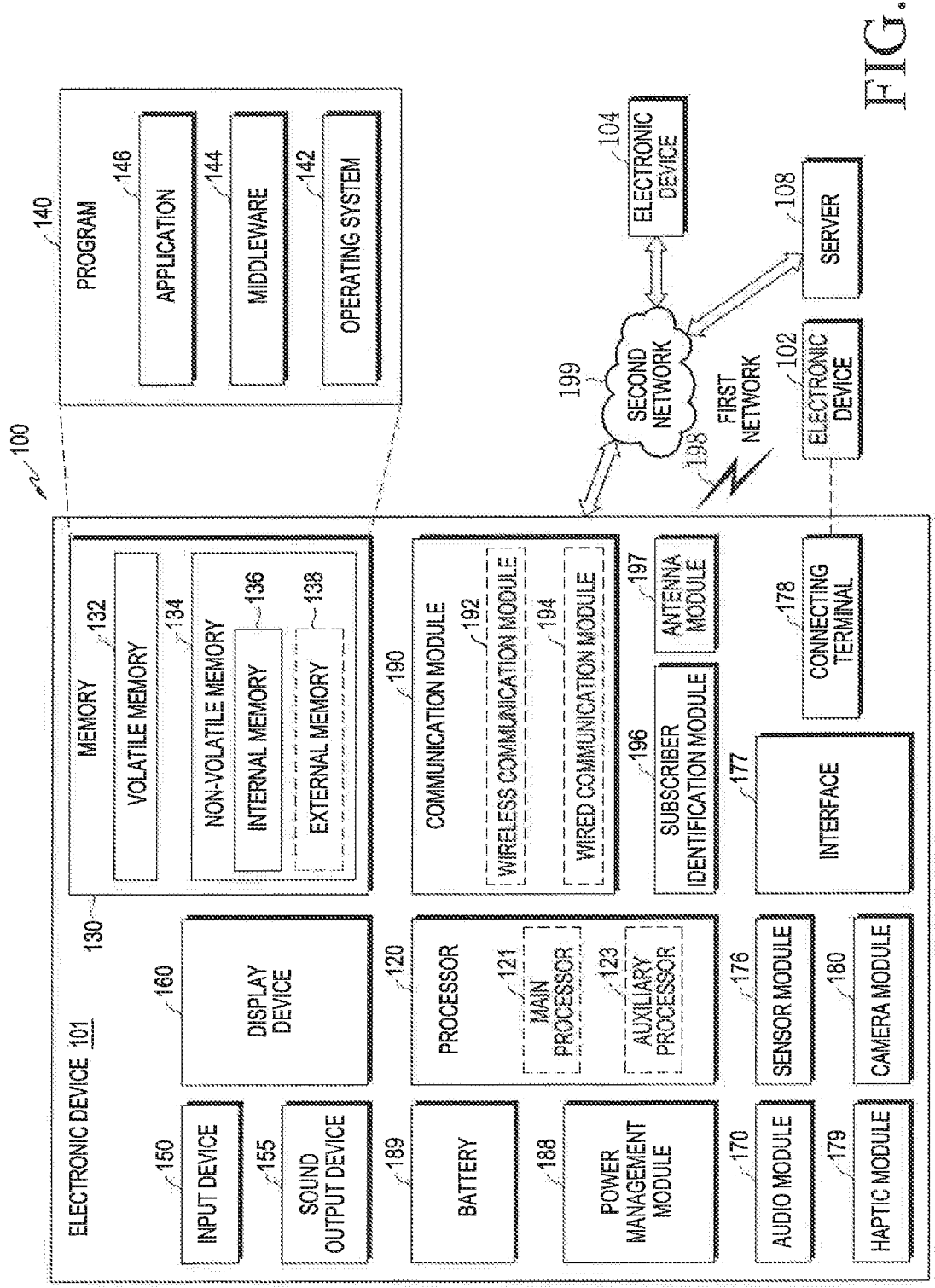
FIG. 1A is a block diagram illustrating an electronic device in a network environment according to an embodiment of the disclosure.

FIG. 1A is a block diagram illustrating an electronic device 101 in a network environment 100 according to an embodiment of the disclosure.

Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
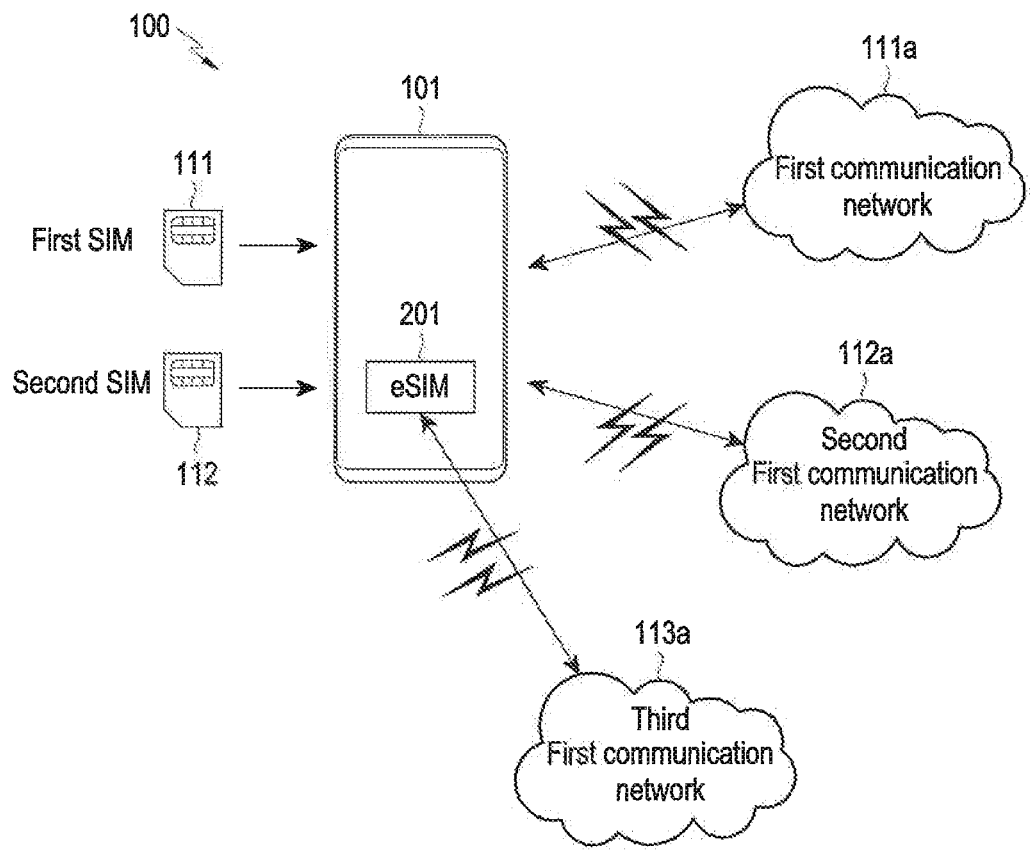
FIG. 1B is a view illustrating a network environment including an electronic device according to an embodiment of the disclosure.

FIG. 1B is a view illustrating a network environment 100 including an electronic device according to an embodiment of the disclosure.

Referring to FIG. 1B, according to various embodiments of the disclosure, a network may include an electronic device 101, a first communication network 111a, a second communication network 112a, or a third communication network 113a.

According to various embodiments, the electronic device 101 may operate as a dual SIM dual standby (DSDS) mode or dual SIM dual active (DSDA) mode electronic device supporting two SIMs in one device. For example, the electronic device 101 may be equipped with two SIMs, e.g., a first SIM 111 and a second SIM 112. The first SIM 111 and the second SIM 112 may be removable subscriber identification modules (rSIMs). For example, the electronic device 101 may be equipped with two SIM cards to support the two SIMs. Hereinafter, for convenience of description, the SIM card will be referred to as a SIM. As illustrated in FIG. 1B, two SIM cards, the first SIM 111 and the second SIM 112, may be mounted in the electronic device 101. The electronic device 101 may include a first slot (not shown) and a second slot (not shown), which are first structures, to receive the first SIM 111 and the second SIM 112, respectively.

According to various embodiments, the first SIM 111 is a SIM which has subscription to the mobile network operator of the first communication network 111a. The electronic device 101 may access the first communication network 111a using the first SIM 111 to receive the wireless communication service. The second SIM 112 is an SIM having subscription to the mobile network operator of the second communication network 112a. The electronic device 101 may access the second communication network 112a using the second SIM 112 to receive the wireless communication service. According to various embodiments, the electronic device 101 may include an embedded subscriber identity module (eSIM) 201. The eSIM may be referred to as an eUICC. The electronic device 101 may receive a wireless communication service by accessing the third communication network 113a through the eSIM 201. At least some of the first communication network 111a, the second communication network 112a, or the third communication network 113a may be provided by the same mobile network operator or by different mobile network operators.

Figure 2:
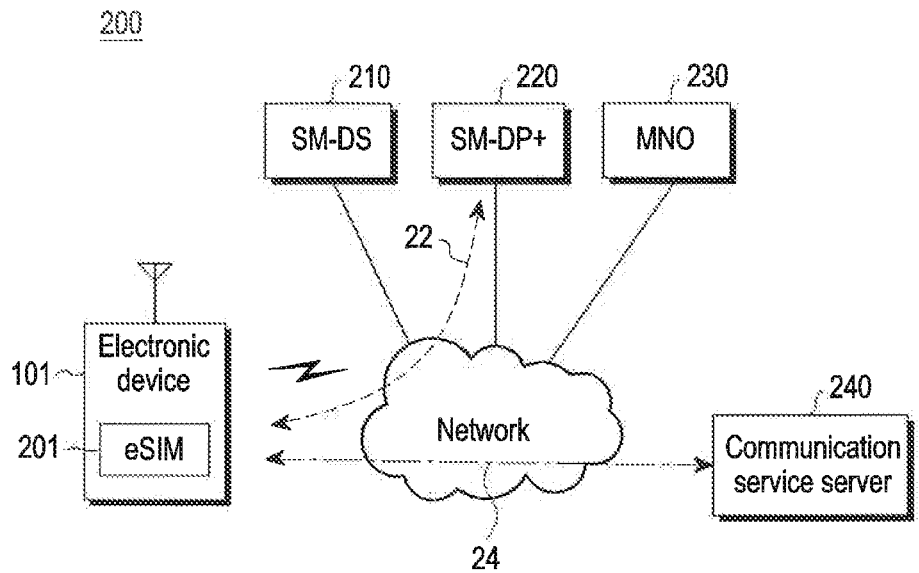
FIG. 2 is a view illustrating a system for providing a profile-based communication connection to an electronic device according to an embodiment of the disclosure.

FIG. 2 is a view illustrating a system for providing a profile-based communication connection to an electronic device according to an embodiment of the disclosure.

Referring to FIG. 2, according to various embodiments, a system 200 may include an electronic device 101, an SM-DS server 210, an SM-DP+ server 220, an MNO server 230, and a communication service server 240.

According to various embodiments, the electronic device 101 (e.g., the electronic device 101 of FIG. 1) may include an eSIM 201. For convenience of description, although not illustrated, the electronic device 101 may include two or more slots capable of receiving two or more rSIMs. Alternatively, the electronic device 101 may be implemented to include two eSIMs and one slot capable of receiving one rSIM. According to various embodiments, the electronic device 101 may include or receive N (N is a natural number) SIMs (eSIMs or rSIMs) and may perform switching to use some of them. There is no limitation to combining N SIMs, and there is also no limitation to the number.

According to various embodiments, the eSIM 201 may be inserted into the electronic device 101, provided integrally with the electronic device 101, or implemented to be accessible by the electronic device 101. According to various embodiments, the eSIM 201 may allow the electronic device 101 to perform authentication with a server of a communication carrier (mobile network operator (MNO)) using information in the eSIM 201 (e.g., a profile including universal subscriber identity module (USIM) information). According to an embodiment, the eSIM 201 may be called a subscriber identity module (SIM) card for global system for mobile communications (GSM) or called a universal subscriber identity module (USIM) card for wideband code division multiple access (WCDMA), long-term evolution (LTE), and fifth generation (5G) (e.g., new radio (NR)), and may also be called in other various terms depending on communication schemes. For example, if the user of the electronic device 101 subscribes to a wireless communication service provided by a communication carrier, the electronic device 101 may use information in the eSIM 201, e.g., international mobile subscriber identity (IMSI) value and encryption key K for authentication, to perform an appropriate authentication process with the server of the communication carrier, which stores the same value, and then use the wireless communication service. For example, the appropriate authentication process may be authentication and key agreement (AKA) authentication. Other authentication schemes may also be used.

According to various embodiments, the eSIM 201 may be manufactured as a dedicated card for a specific communication carrier at the request of the specific communication carrier when manufacturing the card and may come equipped with authentication information (e.g., USIM application and subscriber identification ID (e.g., IMSI)) for network connection of the corresponding communication carrier and an encryption key (e.g., a known K value or Ki value). An application (or information) in the eSIM 201 may be installed, modified, deleted, or updated using a technology, such as over the air (OTA) when necessary.

According to various embodiments, the eSIM 201 may download and/or store information for providing a communication service, in the form of a profile. According to an embodiment, the profile may be installed or stored in the manufacturing process of the eSIM 201 or may be downloaded by the terminal in an over the air (OTA) scheme and installed or stored in the eSIM 201. For example, the profile may include a provisioning profile and an operational profile. It will be appreciated by one of ordinary skill in the art that even when the provisioning profile is not installed, the electronic device 101 may download the operational profile through a Wi-Fi short-range connection or an Internet connection, and the provisioning profile does not necessarily need to be installed on the electronic device 101. For example, the operational profile may be a profile including subscriber identification information about the user of the electronic device, and the provisioning profile may include information (hereinafter, "first information") for downloading subscriber identity information or a profile (hereinafter, a "first operational profile") including subscriber identity information (hereinafter, "first subscriber identity information") in the electronic device. The electronic device may download the first operational profile based on the first information on the provisioning profile in the eSIM 201.

According to various embodiments, the electronic device 101 may receive a communication service using subscriber identity information (hereinafter, 'second subscriber identity information') of an operational profile (hereinafter, a 'second operational profile') installed or stored in the eSIM 201. For example, the profile including subscriber identification information may be a subscriber identity module (SIM) profile.

According to an embodiment, the operational profile may include, in addition to the subscriber identification information, the subscriber's network access authentication information, the subscriber's phone book, the subscriber's personal information (e.g., SMS), the subscribed communication carrier name, available services, available data amount, fee or service provision speed, or information to allow for safe use of wireless communication by performing subscriber authentication and traffic security key generation upon accessing a wireless communication network, such as GSM, WCDMA, LTE, or 5G (NR).

According to various embodiments, the first information for downloading data (e.g., the first operational profile) including the first subscriber identity information may include communication session information for a designated first communication connection for downloading the first operational profile. For example, the communication session information may include subscription manager discovery service (SM-DS) server 210 access information for downloading the first operational profile or information about the communication carrier network available for SM-DS server 210 access.

According to various embodiments, the SM-DS server 210 may provide the electronic device 101 with the address of the SM-DP+ server 220 for downloading the first operational profile based on the provisioning profile.

According to various embodiments, the subscription manager data preparation plus (SM-DP+) server 220 may be a profile providing server, an off-card entity of profile domain, a profile encryption server, a profile generating server, a profile provisioner, or a profile provider. The SM-DP+ server 220 may perform a first communication connection 22 with the electronic device 101 through a wireless communication network based on a first communication connection request based on the provisioning profile from the electronic device 101 and may provide the first operational profile to the electronic device 101 through the first communication connection 22. According to various embodiments, the wireless communication network may be a specific node of the wireless communication network. For example, the wireless communication network may be a base station, a subscriber information management node, or a mobility management node of the wireless communication network. According to an embodiment, the wireless communication network may include a home position register (HLR) and/or authentication center (AuC) server that is accessed by the electronic device 101 to perform a subscriber authentication function and, by access after authentication, may connect to the communication service server 240 capable of providing communication services, such as voice communication or data communication.

According to various embodiments, the mobile network operator (MNO) server 230 may be a server associated with a mobile communication network operator. According to various embodiments, the MNO server 230 may request the SM-DS+ server 220 to prepare for at least one profile (or profile package) (e.g., the first operational profile) associated with at least one subscriber identity information (e.g., the first subscriber identity information) and transfer information associated with the first operational profile to the SM-DS+ server 220. According to an embodiment, the MNO server 230 may transfer a signal for updating and managing the first operational profile to the SM-DS+ server 220. The MNO server 230 may perform second communication connection 24 between the electronic device 101 and the communication service server 240 through the second operational profile installed in the eSIM 201 of the electronic device 101.

According to various embodiments, the communication service server 240 may be a server providing communication services. According to various embodiments, the communication service may be a service associated with transmission or reception of data through a wireless communication network. According to an embodiment, the communication service may include a service associated with transmission or reception of another profile (or data) not including subscriber identity information other than downloading the operational profile (e.g., the first operational profile including the first subscriber identity information). For example, the communication service server 240 may include a service server associated with various data transmission and reception, such as a server associated with each of various applications, a push server, a search server, or a market server. The communication service by the communication service server 240 may include various services, such as data transmission/reception by application, notification reception, push reception, link reception and access, or service request.

According to various embodiments, upon requesting a service associated with transmission or reception of a profile (or data) not including subscriber identity information, the electronic device 101 may perform the second communication connection 24 with the communication service server 240 based on the second operational profile.

According to various embodiments, the SM-DS server 210, the SM-DP+ server 220, the MNO server 230, or the communication service server 240 is merely an example of implementation of servers for performing each function, may be called by other names, and the SM-DS server 210, SM-DP+ server 220, MNO server 230, or communication service server 240 each may be composed of one or a plurality of servers. Some or all of the SM-DS server 210, the SM-DP+ server 220, the MNO server 230, or the communication service server 240 may be configured as one integrated server. According to various embodiments, an electronic device (e.g., the electronic device 101 of FIG. 1A or 1B or the electronic device 101 of FIG. 2) may comprise a display (e.g., the display device 160 of FIG. 1A), a communication module (e.g., the communication module 190 of FIG. 1A), an embedded subscription identity module (e.g., the subscriber identification module 196 of FIG. 1A or the eSIM 201 of FIG. 2) storing first information associated with a first communication connection for downloading data including first subscriber identity information for accessing at least one communication service providing server, a memory (e.g., the memory 130 of FIG. 1A or the memory 211 of FIG. 2), and a processor (e.g., the processor 120 of FIG. 1A) electrically connected with the display, the communication module, and the memory. The processor may be configured to perform the first communication connection for downloading the data including the first subscriber identity information based on the first information using the communication module, terminating the first communication connection upon request for transmission or reception of data not including the first subscriber identity information during the first communication connection, and perform transmission or reception of the data by performing a second communication connection based on second subscriber identity information.

According to various embodiments, the first information may include a provisioning profile, and the data including the first subscriber identification information may include a first operational profile.

According to various embodiments, the processor may be configured to display that there is no second operational profile corresponding to the second subscriber identity information, through the display, when the subscription identity module does not include the second subscriber identity information upon request for transmission or reception of the data during the first communication connection.

According to various embodiments, the processor may be further configured to display a purchase screen associated with the second operational profile when the second operational profile does not exist.

According to various embodiments, the processor may be configured to perform a second communication session based on a second operational profile used before.

According to various embodiments, the processor may be configured to perform a second communication session based on a second operational profile selected by the user.

According to various embodiments, the processor may be configured to display at least one indicator indicating the first communication connection based on the provisioning profile through the display.

According to various embodiments, the at least one indicator may include at least one type of a service provider name (SPN), a radio access technology (RAT), and a reception signal strength indicator (RSSI).

According to various embodiments, the processor may be configured to select the provisioning profile associated with a network being in connection through the communication module.

According to various embodiments, the processor may be configured to select the provisioning profile associated with the network being in connection based on at least one of a public land mobile network (PLMN) identifier, a mobile country code (MCC), and area information about a network being in connection through the communication module.

Figure 3:
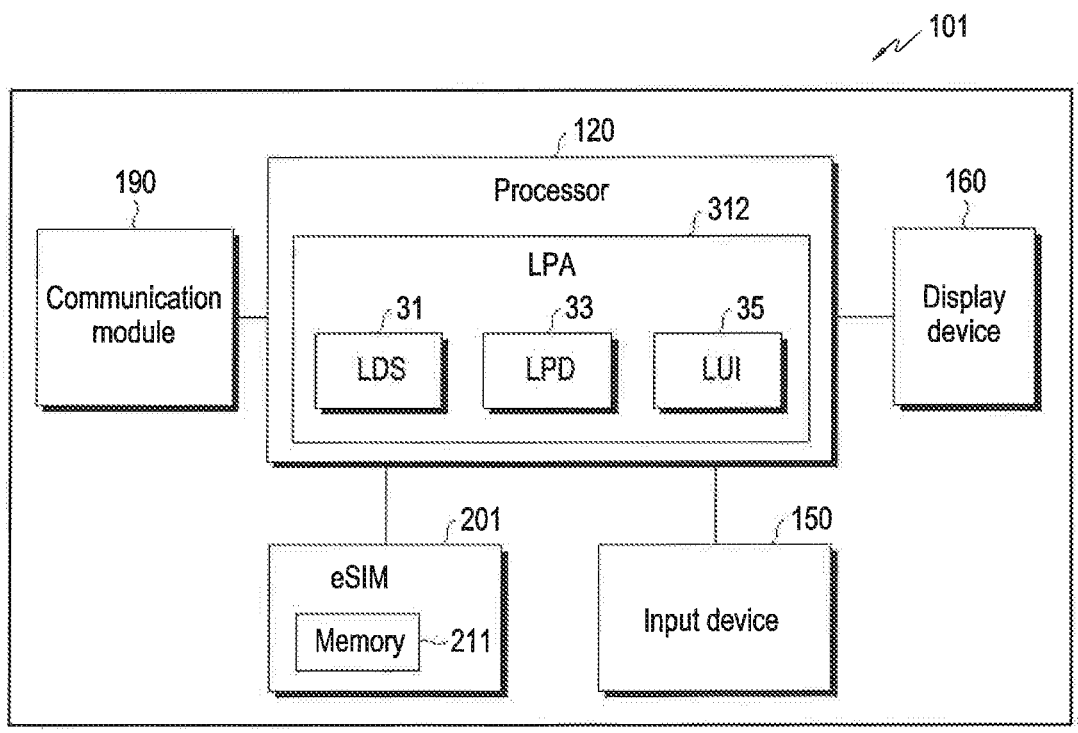
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, according to various embodiments, the electronic device 101 of FIG. 1A or 1B or the electronic device 101 of FIG. 2 may include a processor 120, an eSIM 201, a communication module 190, and a display device 160, and an input device 150. For convenience of description, although not illustrated, the electronic device 101 may include two or more slots capable of receiving two or more rSIMs.

According to various embodiments, the processor 120 (e.g., the processor 120 of FIG. 1A) may include one or more processors (e.g., the main processor 121 and the auxiliary processor 123 or the application processor and the communication processor of FIG. 1A) and, according to an embodiment, may include a local profile assistant (LPA) 312 (e.g., LPA device (LPAd)). According to various embodiments, when the processor 120 includes a plurality of processors, a portion of the LPA 312 may be included in some of the plurality of processors, and another portion of the LPA 312 may be included in others thereof. According to various embodiments, the LPA 312 may be included in the eSIM 201 and, in this case, the LPA 312 may be referred to as an LPAe (eUICC).

According to various embodiments, the LPA 312 may perform communication with a server to support profile download, installation, and management operations of the eSIM 201 or may perform the operation of providing a user interface required in the profile download, installation, and management operations. The LPA 312 may be a module that provides local discovery services (LDSs) 31, local profile download (LPD) 33, and local user interface (LUI) 35 operations in the electronic device 101.

According to various embodiments, the LDS 31 may perform the operation of receiving the address of the SM-DS+ server 220 capable of downloading the operational profile based on the provisioning profile from the SM-DS server 210 and communication with the SM-DS server 210.

According to various embodiments, the LPD 33 may perform the first communication connection 22 with the SM-DS+ server 220 through the wireless communication network based on the address of the SM-DS+ server 220 and perform the operation of receiving the first operational profile from the SM-DS+ server 220 through the first communication connection 22. According to various embodiments, the LPD 33 may support profile download, enable, disable, delete, or profile policy rule (PPR) download operations, started by the network, or may support profile enable, disable, delete, or eUICC reset operations by the electronic device.

According to various embodiments, the LUI 35 may perform the operation of providing various user interfaces upon downloading the operational profile. According to an embodiment, the LUI 35 may support data exchange between the LDS 31 and the LPD 33 and may include a UI for transferring the user's input to the LDS 31 or LPD 33.

According to an embodiment, the processor 120 may perform a communication service based on information stored in the eSIM 201 using (or by executing) the LPA 312. For example, the processor 120 may perform the first communication connection to download the profile (e.g., the first operational profile) including the first subscriber identity information, with the SM-DS+ server 220 through the communication module 190 based on the provisioning profile stored in the eSIM 201, using the LPA 312. Upon request of transmission or reception of the profile or data not including subscriber identity information during the first communication connection using the LPA 312, the processor 120 may terminate the first communication connection and perform the second communication connection based on the second subscriber identity information to transmit or receive a profile or data not including the subscriber identity information.

According to various embodiments, the eSIM 201 (e.g., the subscriber identification module 196 of FIG. 1A or the eSIM 201 of FIG. 2) may include one or more profiles, as information for receiving a communication service. The profile may mean a packaging, in the form of software, of at least one of applications, file systems, and authentication key values stored in the eSIM 201. For example, the profile may include a provisioning profile and an operational profile. The operational profile may include the subscriber identification information and may further include the subscriber's network access authentication information, the subscriber's phone book, the subscriber's personal information (e.g., SMS), the subscribed communication carrier name, available services, available data amount, fee or service provision speed, or information to allow for safe use of wireless communication by performing subscriber authentication and traffic security key generation upon accessing a wireless communication network, such as GSM, WCDMA, LTE, or NR. According to an embodiment, the operational profile may include a SIM profile. For example, the SIM profile may include a SIM file system (master file (MF), dedicated file (DF), elementary files (EF)). A subscriber identification information (IMSI) value may be stored in an elementary file.

According to various embodiments, the provisioning profile may be a profile including first information for downloading the first operational profile in the electronic device. For example, the first information may include communication session information for the first communication connection designated for downloading the first operational profile. For example, the communication session information may include SM-DS server (e.g., the SM-DS server 210 of FIG. 2) access information for downloading the first operational profile and may include information about the communication carrier network available for SM-DS server access.

According to various embodiments, the communication module 190 (e.g., the communication module 190 of FIG. 1A) may perform first communication based on the provisioning profile or second communication based on the second operational profile. At least one screen associated with the first communication based on the provisioning profile or the second communication based on the second operational profile may be displayed on the display device 160.

According to an embodiment, the LPA 312 has been described as being included in the processor 120, but at least some functions of the LPA 312 may be performed by the processor 120, or a separate LPA 312 may be operated in conjunction with the processor 120. For example, the LPA 312 may be included in a program (e.g., the program 140 of FIG. 1A) and may be loaded onto the processor 120 and executed. When the LPA 312 is loaded on the processor 120 and executed, it may be understood as the operation of the processor 120. According to various embodiments, the function modules (e.g., the LDS 31, the LPD 33, or the LUI 35) included in the LPA 312 are exemplarily split and may not be limited as expressed as other function modules. According to various embodiments, the LPA 312 may be included in the eSIM 201.

Figure 4:
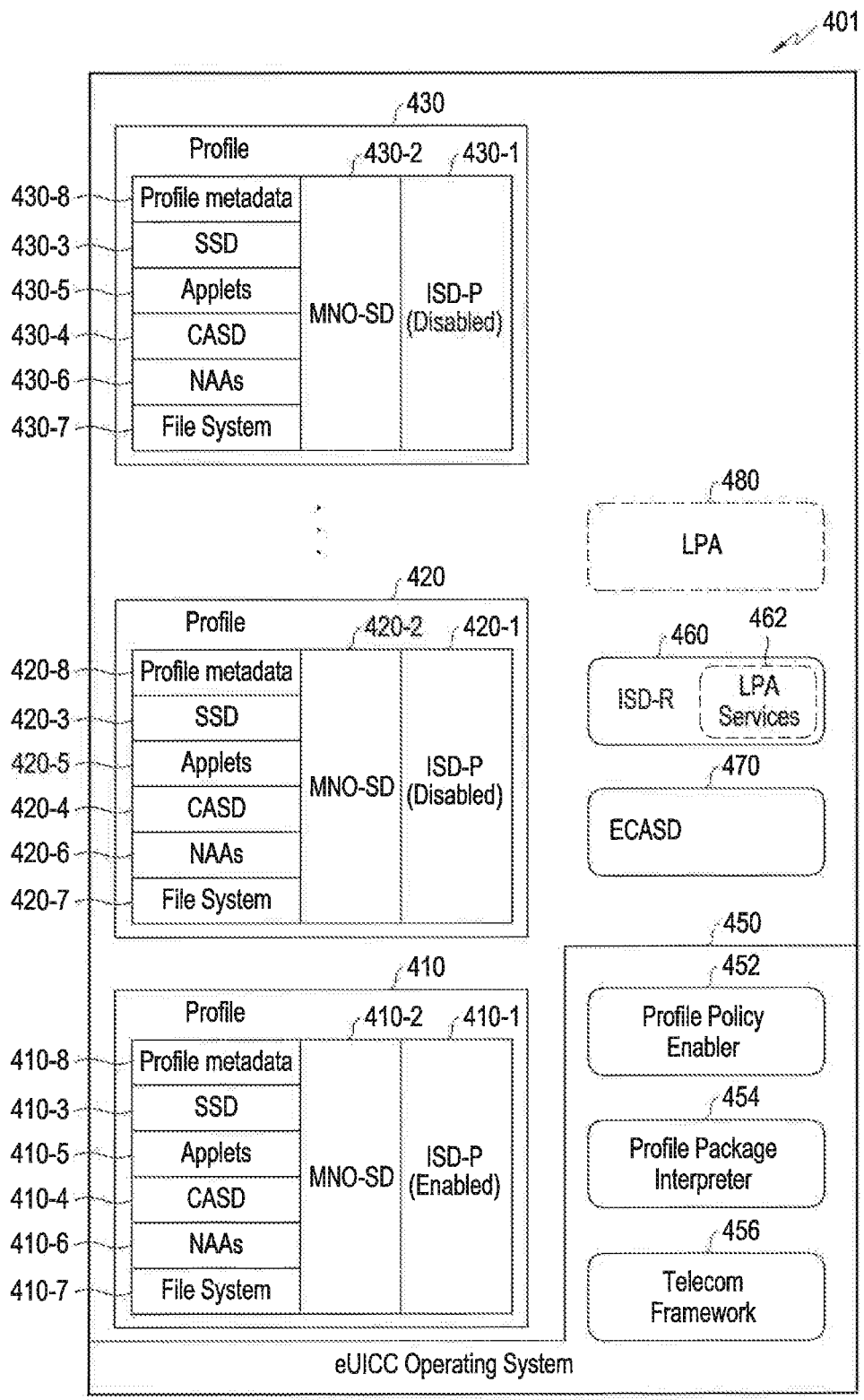
FIG. 4 is a view illustrating an internal structure of an eUICC according to an embodiment of the disclosure.

FIG. 4 is a view illustrating an internal structure of an eUICC according to an embodiment of the disclosure.

According to an embodiment, the eUICC 401 (e.g., the eSIM 201 of FIG. 2 or 3) may be in the form of a card or chip, and at least one profile 410, 420, and 430 in the form of software may be installed. According to various embodiments, each of the one or more profiles 410, 420, and 430 may be a provisioning profile or an operational profile. At least one profile 410, 420, and 430 may operate on an eUICC operating system (OS) 450. Each of the at least one profile 410, 420, and 430 may be enabled or disabled by a processor or LPA (e.g., LPA 312 of FIG. 3 or LPA 480 of FIG. 4). Referring to FIG. 4, according to an embodiment, one profile 410 may be in an enabled state, and the remaining profiles 420 and 430 may be in a disabled state.

According to various embodiments, the eUICC operating system (OS) 450 of the eUICC 401 may include a profile policy enabler 452, a profile package interpreter 454, and a telecom framework 456. According to an embodiment, the profile policy enabler 452 may manage a policy rule (profile policy rule (PPR)) for each of the one or more profiles 410, 420, and 430. According to an embodiment, the profile package interpreter 454 may unpackage the profile package received from the SM-DP 220, in a form that may be installed in the eUICC 401. According to an embodiment, the telecom framework 556 may perform a function associated with communication of applications in the eUICC 401. According to various embodiments, the eUICC 401 may include an issuer security domain root (ISD-R) 460 and an ECASD 470. According to an embodiment, the ISD-R 460 may manage at least one profile 410, 420, and 430 installed in the eUICC 401. For example, ISD-R 460 may include LPA services 462. The LPA services 462 may manage at least one profile 410, 420, and 430 installed in the eUICC 401 through an interface with the processor or LPA (e.g., the LPA 312 of FIG. 3 or the LPA 480 of FIG. 4). According to an embodiment, the eUICC controlling authority security domain (ECASD) 470 may perform security processing on at least one profile 410, 420, and 430 installed in the eUICC 401.

According to various embodiments, each of the at least one profile 410, 420, and 430 may include an ISD-P 410-1, 420-1 or 430-1, an MNO-SD 410-2, 420-2 or 430-2, a supplementary security domain (SSD) 410-3, 420-3 or 430-3, a controlling authority security domain (CASD) 410-4, 420-4 or 430-4, applets 410-5, 420-5 or 430-5, network access applications (NAAs) 410-6, 420-6 or 430-6, a file system 410-7, 420-7 or 430-7, or profile metadata 410-8, 420-8 or 430-8.

According to an embodiment, the ISD-P 410-1, 420-1 or 430-1 may include information for decoding and interpretation of the profile package, and in cooperation with the profile package interpreter 454, may be used to unpackage and install the profile package received from the SM-DP+ 220.

According to an embodiment, the MNO-SD 410-2, 420-2 or 430-2 may include the over the air (OTA) key of the MNO and may include information for providing a secure OTA channel capable of communicating with the MNO.

According to an embodiment, the supplementary security domain (SSD) 410-3, 420-3 or 430-3 and the controlling authority security domain (CASD) 410-4, 420-4 or 430-4 may include information for performing security processing on the profile.

According to an embodiment, the applets 410-5, 420-5, or 430-5 may include various application information associated with the user of the profile.

According to an embodiment, network access applications (NAAs) 410-6, 420-6 or 430-6 may include application information that allows the profile to access the network.

According to an embodiment, the file system 410-7, 420-7 or 430-7 may include a file system associated with each piece of information in the profile.

According to an embodiment, the profile metadata 410-8, 420-8 or 430-8 may also be referred to as a profile record and may include metadata information about the profile in text form. The metadata information may include at least one of the profile's integrated circuit card ID (ICCID), profile name, profile providing MNO's name, user's profile nickname, icon, profile class, notification configuration information, profile owner information, or profile policy rule (PPR).

According to various embodiments, the ICCID of the profile, as a profile identifier, may indicate a unique identifier of each profile. The name of the profile may include the name of each profile. The profile providing MNO's name may include the name of the communication carrier that provided the profile. The user's profile nickname may include the user-specified profile nickname. The icon may include an icon corresponding to the profile. The profile class may include information indicating whether the profile type is a provisioning profile or an operational profile. The notification configuration information may include the address of the server (e.g., the SM-DP+ server 220) to receive notifications. The profile owner information may include mobile country code (MCC), mobile network code (MNC), and group identifier (GID) 1 or 2 information associated with the profile owner. For example, the mobile country code (MCC) may be a code for identifying the country, and the mobile network code (MNC) may be a code for identifying the mobile communication carrier. Group identifier (GID) 1 or 2 may be code area information for identifying the group or area to which the profile belongs. The area information may include a group including a plurality of countries. The profile policy rule (PPR) may include policy rule information for managing the profile.

According to various embodiments, the electronic device 101 may identify whether it is a provisioning profile or an operational profile using the profile class information of the profile metadata 410-8, 420-8 or 430-8 included in each of at least one profile 410, 420 or 430 included in the eUICC 401 and enable or disable each of the provisioning profile or the operational profile through the LPA (the LPA 312 of FIG. 3 or the LPA 480 of FIG. 4).

Figure 5A:
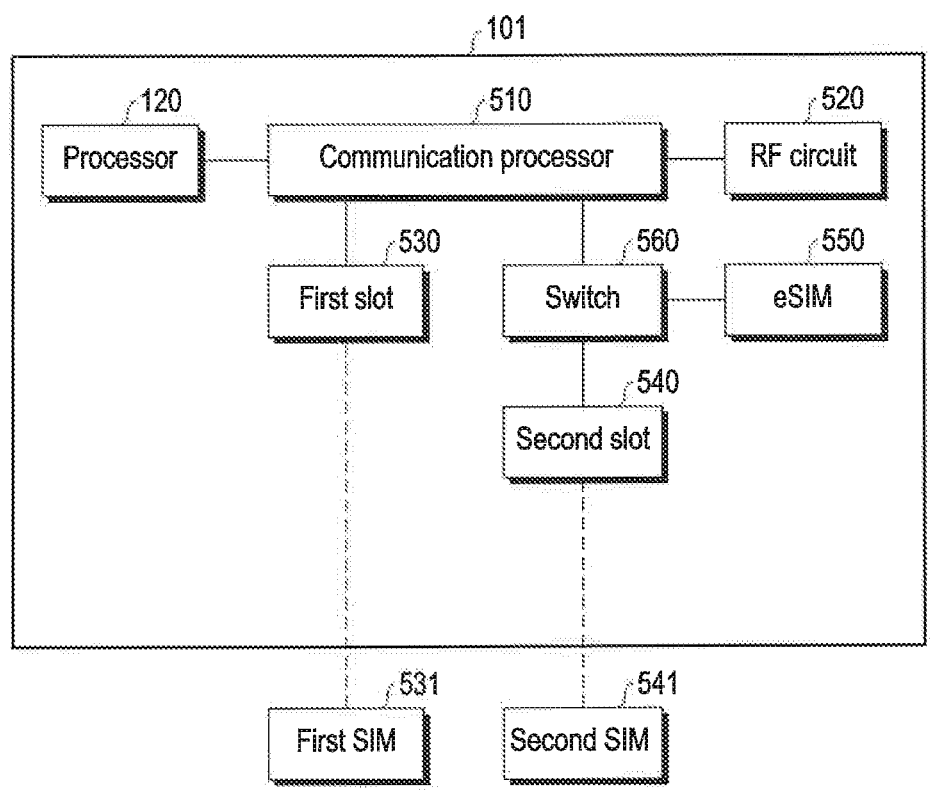
FIG. 5A is a block diagram illustrating an electronic device according to an embodiment of the disclosure.

FIG. 5A is a block diagram illustrating an electronic device according to an embodiment of the disclosure.

According to various embodiments, an electronic device 101 may include at least one of a processor 120, a communication processor 510, an RF circuit 520, a first slot 530, a second slot 540, an eSIM 550, or a switch 560. The communication processor 510 may establish a communication channel of a band that is to be used for wireless communication or may support network communication via the established communication channel. For example, the communication processor 510 may support at least one of second generation (2G), third generation (3G), fourth generation (4G), or 5G network communication. The RF circuit 520 may include at least one of, e.g., a radio frequency integrated circuit (RFIC), a radio frequency front end (RFFE), or an antenna module. The RF circuit 520 may process data (e.g., a baseband signal) output from the communication processor 510 into an RF signal and transmit it through an antenna module. Or, the RF circuit 520 may convert the RF signal, received through the antenna module, into a baseband signal and transfer the converted signal to the communication processor 510. The RF circuit 520 may process RF signals or baseband signals according to the communication scheme supported by the communication processor 510, and the type of the RF circuit 520 is not limited. The inter-component interface 213 may be implemented as, e.g., general purpose input/output (GPIO), universal asynchronous receiver/transmitter (UART) (e.g., high speed-UART (HS-UART)) or peripheral component interconnect bus express (PCIe) interface, but is not limited to a specific kind. Alternatively, at least some of the components may exchange control information or packet data information using, e.g., a shared memory. Meanwhile, in the embodiment of FIG. 5A, the processor 120 and the communication processor 510 are shown as different hardware, but this is merely exemplary. The processor 120 and the communication processor 510 may be different hardware but, according to another embodiment, the processor 120 and the communication processor 510 may be implemented in a single chip.

According to various embodiments, the communication processor 510 may perform an authentication procedure based on information stored in the above-described SIM. The communication processor 510 may be connected to the first SIM 531 through the first slot 530. For example, the first SIM 531 may be connected to a stack (e.g., a stack according to ISO7816) of the communication processor 510. The communication processor 510 may include two stacks in the embodiment of FIG. 5A. For example, the first slot 530 may be a structure that may receive the first SIM 531 that is an rSIM and, when the first SIM 531 is received, may include at least one terminal capable of transferring information from the first SIM 531 to the communication processor 510. The second slot 540 may be a structure that may receive the second SIM 541 that is an rSIM and, when the second SIM 541 is received, may include at least one terminal capable of transferring information from the second SIM 541 to the communication processor 510. The first slot 530 and the second slot 540 may be of the same type, but may be of different types according to implementations. The communication processor 510 may obtain information stored in the first SIM 531 from the first SIM 531 received in the first slot 530. For example, in at least one of the first SIM 531, the second SIM 541, or the eSIM 550 (e.g., the eSIM 201 of FIG. 3), an integrated circuit card identifier (ICCID), an IMSI, or home public land mobile network (HPLMN)-related information, or mobile subscriber international ISDN number (MSISIDN) may be stored. This may be referred to as an elementary file (EF). The communication processor 510 may perform, through the RF circuit 520, an authentication procedure for network communication corresponding to the first SIM 531, based on the obtained information stored in the first SIM 531. If authentication is successful, the communication processor 510 may perform network communication corresponding to the first SIM 531 through the RF circuit 520.

According to various embodiments, at least one of the processor 120 or the communication processor 510 may control the state of the switch 560. The state of the switch 560 may be either a first state connecting the communication processor 510 and the second slot 540 or a second state connecting the communication processor 510 and the eSIM 550. For example, at least one of the processor 120 or the communication processor 510 may control the switch 560 to connect the second slot 540 to the communication processor 510. In other words, at least one of the processor 120 or the communication processor 510 may provide a control signal for controlling the state of the switch 560 to the first state to the switch 560. If the normal state in which the switch 560 does not receive a specific signal is the first state, at least one of the processor 120 or the communication processor 510 may perform no special operation to connect the second slot 540 to the communication processor 510. A signal for controlling the switch 560 may be transferred through, e.g., general purpose input/output (GPIO), but the interface is not limited. In some cases, the state of the switch 560 may be controlled in a third state in which it is connected to neither the second slot 540 nor the eSIM 550. The switch 560 may include, e.g., at least one metal oxide semiconductor field effect transistor (MOSFET), or a freewheeling switch, but it will be understood by one of ordinary skill in the art that the type is not limited.

Although FIG. 5A illustrates that the communication processor 510 is selectively connected to the second slot 540 or the eSIM 550 according to the state control of the switch 560, this is merely exemplary. According to various embodiments, the communication processor 510 may optionally use a soft SIM installed exclusively for the communication carrier in the electronic device 101 instead of the eSIM 550. For example, when a soft SIM is installed in the electronic device 101 (e.g., in the processor 120 or in the communication processor 510), the communication processor 510 may be connected to the second slot 540 to selectively use the second SIM 541 or the soft SIM. According to various embodiments, the eSIM in each of the embodiments described below may be replaced with the soft SIM and applied in an identical or similar manner.

Figure 5B:
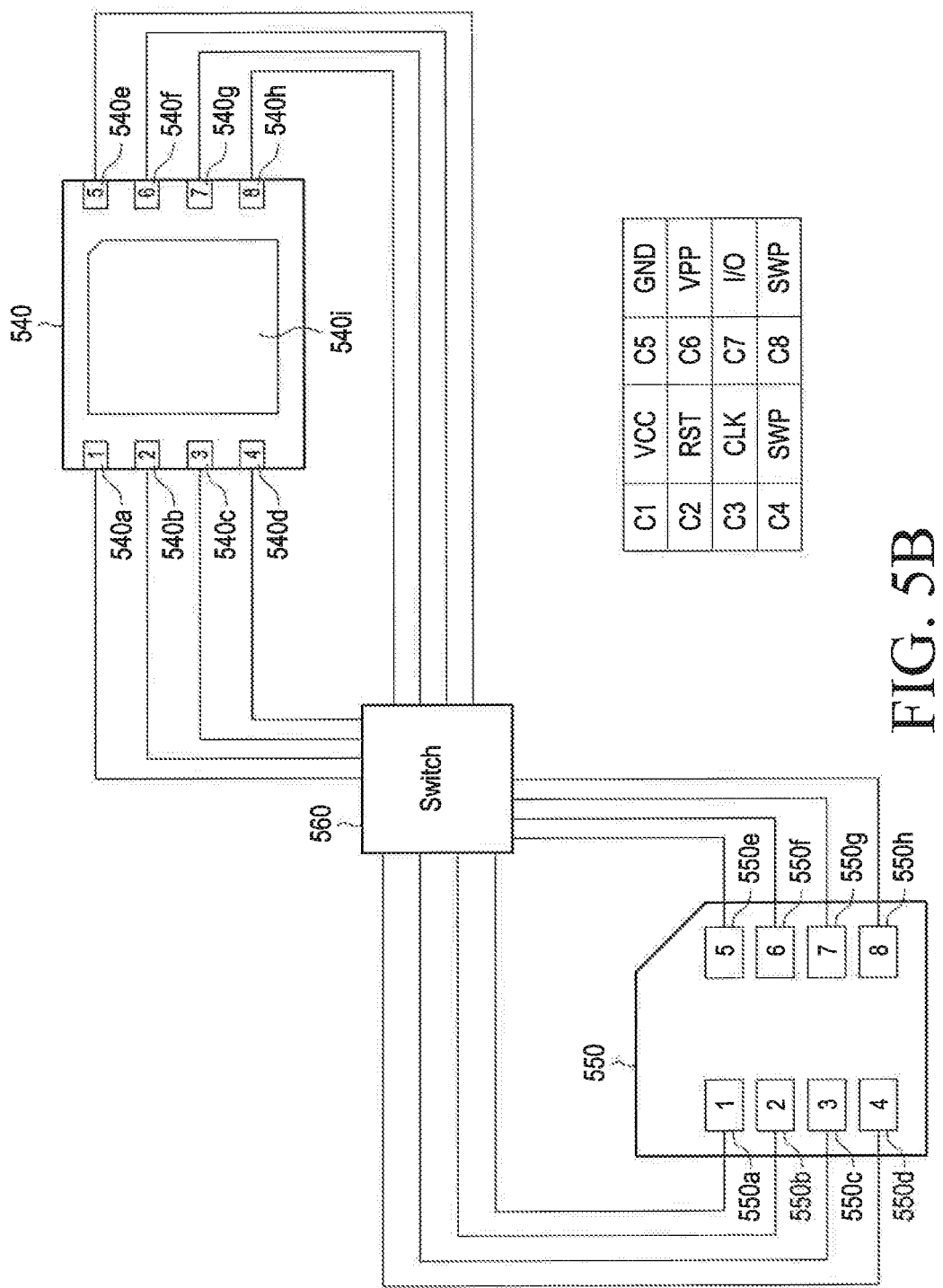
FIG. 5B is a view illustrating a switch according to an embodiment of the disclosure.

FIG. 5B is a view illustrating a switch according to an embodiment of the disclosure.

Referring to FIG. 5B, according to various embodiments, the switch 560 may be selectively connected to either the second slot 540 or the eSIM 550. The second slot 540 may include at least one of a voltage common collector (VCC) terminal 540a, a reset (RST) terminal 540b, a clock (CLK) terminal 540c, a single wire protocol (SWP) terminal 540d, a ground (GND) terminal 540e, a voltage programming power (VPP) terminal 540f, an input/output (I/O) terminal 540g, or an SWP terminal 540h. The second SIM 541 may include terminals connectable to the VCC terminal 540a, the RST terminal 540b, the CLK terminal 540c, the SWP terminal 540d, the GND terminal 540e, the VPP terminal 540f, the I/O terminal 540g, or the SWP terminal 540h. The second SIM 541 may be received in the opening 540i of the second slot 540. When the second SIM 541 is received in the second slot 540, the terminals 540a to 540h of the second slot 540 may contact (or connect to) the terminals (not shown) of the second SIM 541 so that the second SIM 541 may be connected to the communication processor 510. In various embodiments, that the switch 560 is in the first state may mean that at least some of the plurality of terminals 540a to 540h of the second slot 540 are connected to the communication processor 510. For example, the eSIM 550 may include at least one of a VCC terminal 550a, an RST terminal 550b, a CLK terminal 550c, an SWP terminal 550d, a GND terminal 550e, a VPP terminal 550f, an I/O terminal 550g, or an SWP terminal 550h. The second SIM 541 may include terminals connectable to the VCC terminal 550a, the RST terminal 550b, the CLK terminal 550c, the SWP terminal 550d, the GND terminal 550e, the VPP terminal 550f, the I/O terminal 550g, or the SWP terminal 550h. In various embodiments, that the switch 560 is in the second state may mean that at least some of the plurality of terminals 550a to 550h of the eSIM 550 are connected to the communication processor 510.

According to various embodiments, while the communication processor 510 is connected to the second slot 540, the communication processor 510 may obtain information stored in the second SIM 541 from the second SIM 541 received in the second slot 540. For example, at least one of the processor 120 or the communication processor 510 may control the switch 560 to connect the eSIM 550 to the communication processor 510. In other words, at least one of the processor 120 or the communication processor 510 may provide a control signal for controlling the state of the switch 560 to the second state to the switch 560. The normal state in which the switch 560 does not receive a specific signal may be the second state. In this case, at least one of the processor 120 or the communication processor 510 may perform no special operation to connect the eSIM 550 to the communication processor 510. In various embodiments of the disclosure, that the processor 120 or the communication processor 510 controls the switch 560 to have a specific state may include not only outputting a signal to allow the switch 560 to have the corresponding state but also outputting no special signal to have the corresponding state. As described above, the communication processor 510 may perform an authentication procedure for network communication corresponding to the eSIM 550 based on the obtained information stored in the eSIM 550. If authentication is successful, the communication processor 510 may perform network communication corresponding to the eSIM 550 through the RF circuit 520.

According to various embodiments, the communication processor 510 may perform dual-SIM network communications according to the first SIM 531 and the second SIM 541 or dual-SIM network communications according to the first SIM 531 and the eSIM 550. It will be understood by one of ordinary skill in the art that, depending on the implementation of the RF circuit 520, dual-SIM network communications may be performed in either a DSDS mode or a DSDA mode.

According to various embodiments, the communication processor 510 may include two stacks (e.g., stacks according to ISO7816) for processing the SIMs. The first SIM 531 and the second SIM 532 may be connected to the two stacks, or the first SIM 531 and the eSIM 550 may be connected to the two stacks. For example, the first slot 530 may be fixedly connected to one stack, and the second slot 540 or the eSIM 550 may be selectively connected to the other stack. As such, an embodiment of a structure capable of processing three or more SIMs without adding a stack of the communication processor 510 is disclosed herein.

Figure 6A:
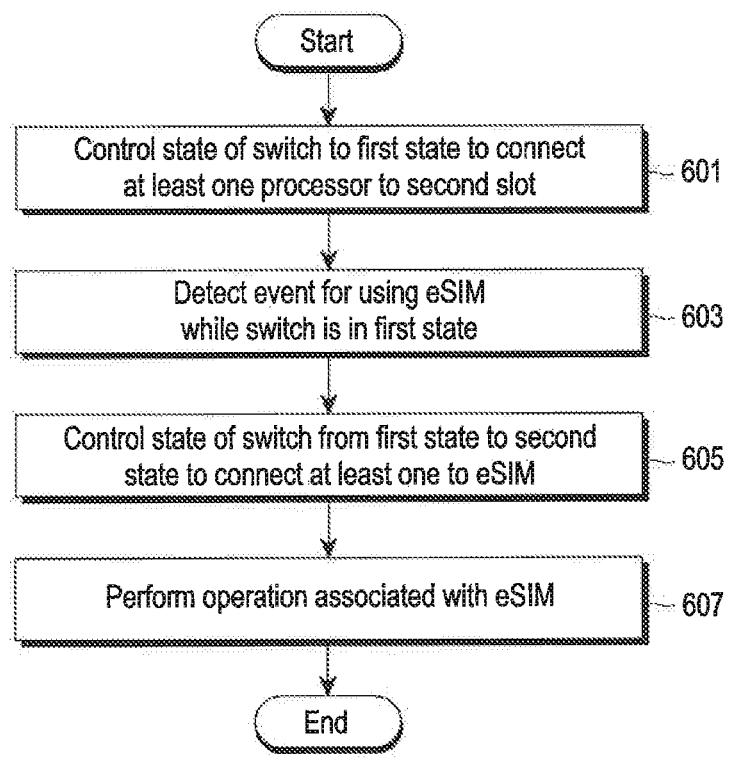
FIG. 6A is a flowchart illustrating an operation method of an electronic device according to an embodiment of the disclosure.

FIG. 6A is a flowchart illustrating an operation method of an electronic device according to an embodiment of the disclosure.

According to various embodiments, the operations of FIG. 6A are described with reference to the electronic device 101 of FIG. 1A or 5A.

According to various embodiments, the electronic device 101 (e.g., at least one of the processor 120 or the communication processor 510) may control the state of the switch 560 to the first state to connect at least one processor (e.g., the communication processor 510) to the second slot 540 in operation 601. For example, the electronic device 101 may connect the communication processor 510 to the second slot 540 based on detection of an event for use of the second SIM 541. The event for use of the second SIM 541 may be, e.g., detection of reception of the second SIM 541 into the second slot 540, or a user command to use the second SIM 541. However, the type of the event is not limited as long as it is an event requiring data transmission/reception between the second SIM 541 and the communication processor 510. Alternatively, the first SIM 531 and the second SIM 541 may be set as default SIMs for use in which case the communication processor 510 may be connected to the second slot 540 without any special control of the electronic device 101.

According to various embodiments, in operation 603, the electronic device 101 may detect an event for using the eSIM 550 while the switch 560 is in the first state. The event for using the eSIM 550 may be, e.g., enablement of at least one profile set in the eSIM 550 or deletion or addition of at least one profile set in the eSIM 550, but is not limited in type as long as it is an event requiring data transmission/reception between the eSIM 550 and the communication processor 510. In operation 605, the electronic device 101 may control the state of the switch 560 from the first state to the second state to thereby connect at least one processor (e.g., the communication processor 510) to the eSIM 550. In operation 607, the electronic device 101 may perform operations associated with the eSIM 550. For example, the electronic device 101 may perform network authentication based on information stored from the eSIM 550. Alternatively, the electronic device 101 may control the eSIM 550 to delete or add a profile of the eSIM 550.

Meanwhile, FIG. 6A illustrates a configuration in which the electronic device 101 controls the switch 560 from the first state to the second state based on detection of an event for using the eSIM 550, but this is exemplary. According to various embodiments, it will be appreciated by one of ordinary skill in the art that the electronic device 101 may control the state of the switch 560 from the second state to the first state based on detection of an event for use of the second SIM 541 in a state in which the eSIM 550 is connected to the communication processor 510.

Figure 6B:
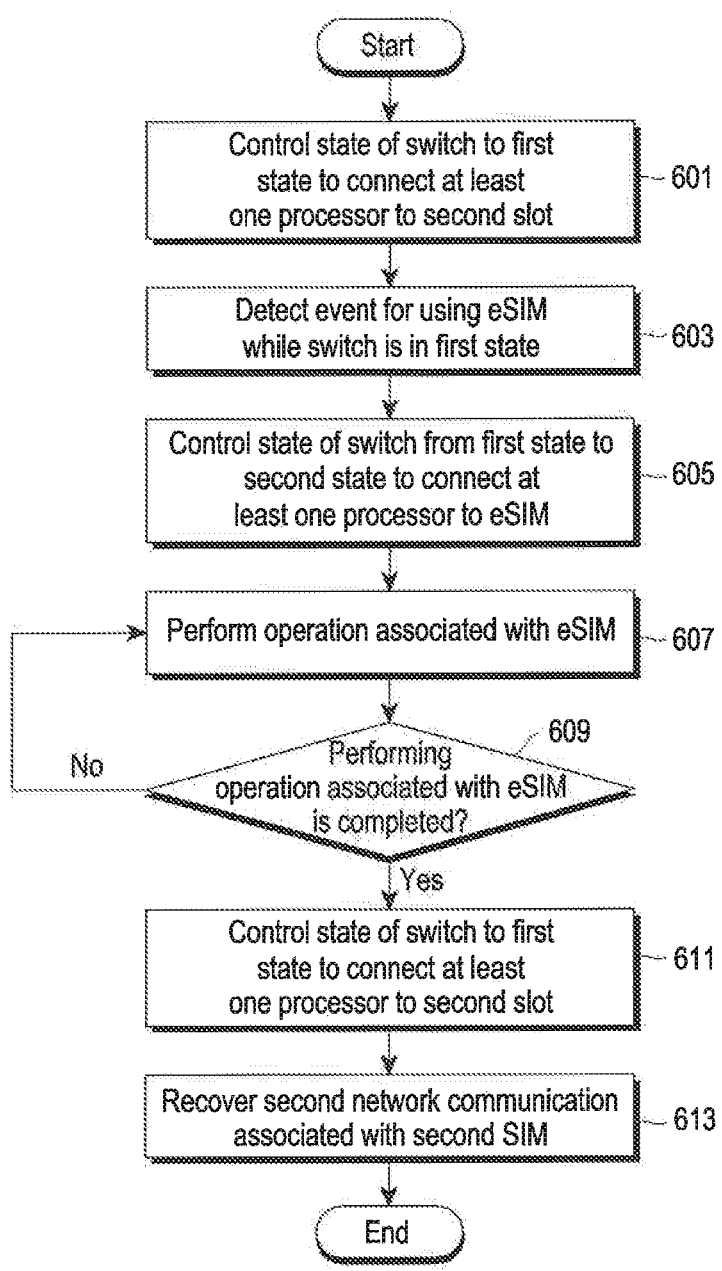
FIG. 6B is a flowchart illustrating an operation method of an electronic device according to an embodiment of the disclosure.

FIG. 6B is a flowchart illustrating an operation method of an electronic device according to an embodiment of the disclosure. Among the operations of FIG. 6B, those already described above are briefly described below.

According to various embodiments, the operations of FIG. 6B are described with reference to the electronic device 101 of FIG. 1A or 5A. According to various embodiments, the electronic device 101 (e.g., at least one of the processor 120 or the communication processor 510) may control the state of the switch 560 to the first state to connect at least one processor (e.g., the communication processor 510) to the second slot 540 in operation 601. While the state of the switch 560 is the first state, it is assumed that the electronic device 101 performs network communication corresponding to the first SIM 531 and network communication corresponding to the second SIM 541. In operation 603, the electronic device 101 may detect an event for using the eSIM 550 while the switch 560 is in the first state. For example, the electronic device 101 may detect an event for temporarily using the eSIM 550. In various embodiments, the event for using the eSIM 550 may include an event for temporarily using the eSIM 550 and an event for non-temporarily using the eSIM 550. For example, the event for temporarily using the eSIM 550 may be deletion or addition of a profile set in the eSIM 550, or a request for information about the profile of the eSIM 550, but this is exemplary. The event for temporarily using the eSIM 550 is not limited as long as it is an event that does not require connection of network communication corresponding to the eSIM 550 or that requires data transmission/reception from/to the eSIM 550 while requiring temporary connection of network communication. The event of non-temporarily using the eSIM 550 may be an event that requires connection of network communication corresponding to the eSIM 550 or an event that requires that network communication be connected or maintained for at least a predetermined time (or procedure) or more. Upon detecting an event for temporarily using the eSIM 550, the electronic device 101 may control the state of the switch 560 from the first state to the second state to connect at least one processor (e.g., the communication processor 510) to the eSIM 550 in operation 605. While the state of the switch 560 is the second state, network communication corresponding to the second SIM 541 may be released. In operation 607, the electronic device 101 may perform operations associated with the eSIM 550.

According to various embodiments, in operation 609, the electronic device 101 may identify whether performing the operation associated with the eSIM 550 is completed. Upon identifying that performing the operation associated with the eSIM 550 is not completed (no in 609), the electronic device 101 may perform the operation associated with the eSIM 550. Upon identifying that performing the operation associated with the eSIM 550 is completed (yes in 609), the electronic device 101 may control the state of the switch 560 to the first state to connect the at least one processor (e.g., the communication processor 510) to the second slot 540 in operation 611. Accordingly, the second SIM 541 received in the second slot 540 may be connected to the communication processor 510. In operation 613, the electronic device 101 may recover the network communication associated with the second SIM 541. The electronic device 101 may recover network communication based on the information stored in the second SIM 541.

Although not shown, upon detecting an event for non-temporarily using the eSIM 550, e.g., a network communication connection event corresponding to the eSIM 550, the electronic device 101 may form a network communication corresponding to the eSIM 550 and perform data transmission/reception based on the corresponding network communication. In this case, operations 609 to 613 may not be performed.

Figure 6C:
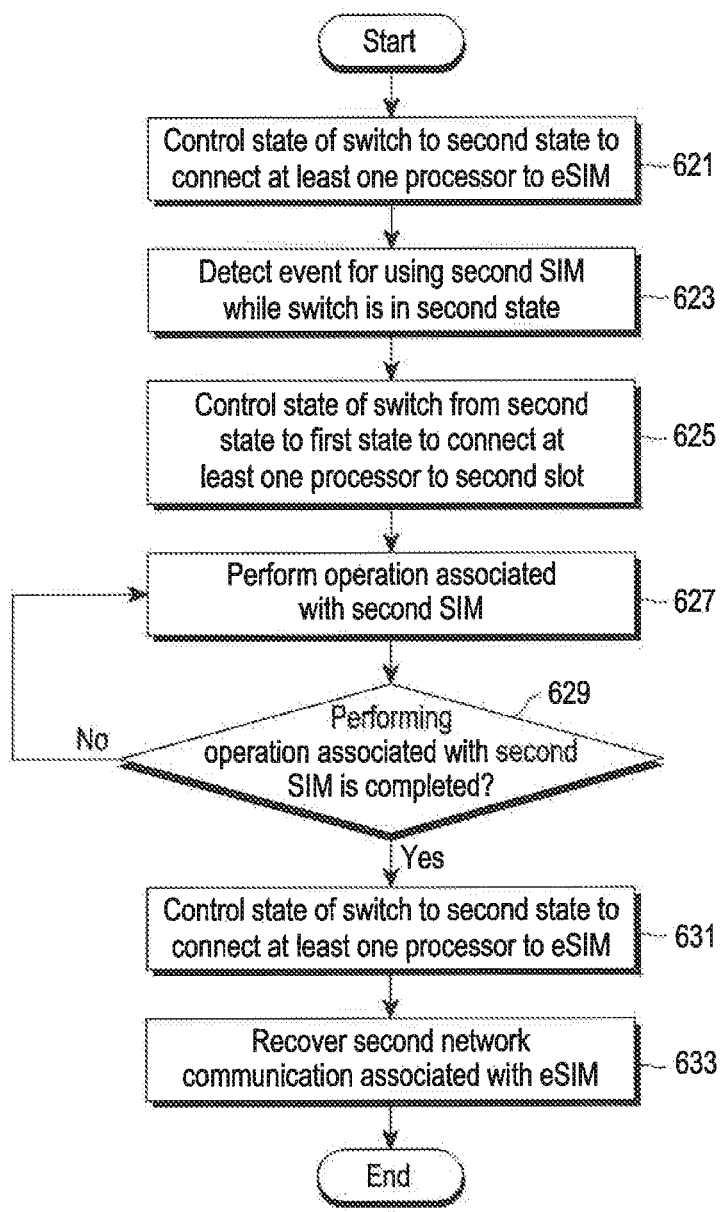
FIG. 6C is a flowchart illustrating an operation method of an electronic device according to an embodiment of the disclosure.

FIG. 6C is a flowchart illustrating an operation method of an electronic device according to an embodiment of the disclosure. Among the operations of FIG. 6C, those already described above are briefly described below.

According to various embodiments, the operations of FIG. 6C are described with reference to the electronic device 101 of FIG. 1A or 5A. According to various embodiments, the electronic device 101 (e.g., at least one of the processor 120 or the communication processor 510) may control the state of the switch 560 to the second state to connect at least one processor (e.g., the communication processor 510) to the eSIM 550 in operation 621. For example, the electronic device 101 may connect the communication processor 510 to the eSIM 550 based on detection of an event for use of the eSIM 550. The event for using the eSIM 550 may be a user command to use the eSIM 550, but is not limited in type as long as it is an event requiring data transmission/reception between the eSIM 550 and the communication processor 510. Alternatively, the first SIM 531 and the eSIM 550 may be set as default SIMs for use in which case the communication processor 510 may be connected to the eSIM 550 without any special control of the electronic device 101.

According to various embodiments, in operation 623, the electronic device 101 may detect an event for using the second SIM 541 while the switch 560 is in the second state. For example, the electronic device 101 may detect an event for temporarily using the second SIM 541. In various embodiments, the event for using the second SIM 541 may include an event for temporarily using the second SIM 541 and an event for non-temporarily using the second SIM 541. For example, the event for temporarily using the second SIM 541 may be an information request from the second SIM 541, but this is merely an example. The event for temporarily using the second SIM 541 is not limited as long as it is an event that does not require connection of network communication corresponding to the second SIM 541 or that requires data transmission/reception from/to the second SIM 541 while requiring temporary network communication. The event of non-temporarily using the second SIM 541 may be an event that requires connection of network communication corresponding to the second SIM 541 or an event that requires that network communication be connected or maintained for at least a predetermined time (or a predetermined procedure) or more. Upon detecting an event for temporarily using the second SIM 541, the electronic device 101 may control the state of the switch 560 from the second state to the first state to connect at least one processor (e.g., the communication processor 510) to the second SIM 541 in operation 625. While the state of the switch 560 is the first state, network communication corresponding to the eSIM 550 may be released. In operation 627, the electronic device 101 may perform operations associated with the second SIM 541.

According to various embodiments, in operation 629, the electronic device 101 may identify whether performing the operation associated with the second SIM 541 is completed. Upon identifying that performing the operation associated with the second SIM 541 is not completed (no in 629), the electronic device 101 may perform the operation associated with the second SIM 541. Upon identifying that performing the operation associated with the second SIM 541 is completed (yes in 629), the electronic device 101 may control the state of the switch 560 to the second state to connect the at least one processor (e.g., the communication processor 510) to the eSIM 550 in operation 631. In operation 633, the electronic device 101 may recover the network communication associated with the eSIM 550. The electronic device 101 may recover network communication based on the information stored in the eSIM 550.

Although not shown, upon detecting an event for non-temporarily using the second SIM 541, e.g., a network communication connection event corresponding to the second SIM 541, the electronic device 101 may form a network communication corresponding to the second SIM 541 and perform data transmission/reception based on the corresponding network communication. In this case, operations 629 to 633 may not be performed.

Figure 7A:
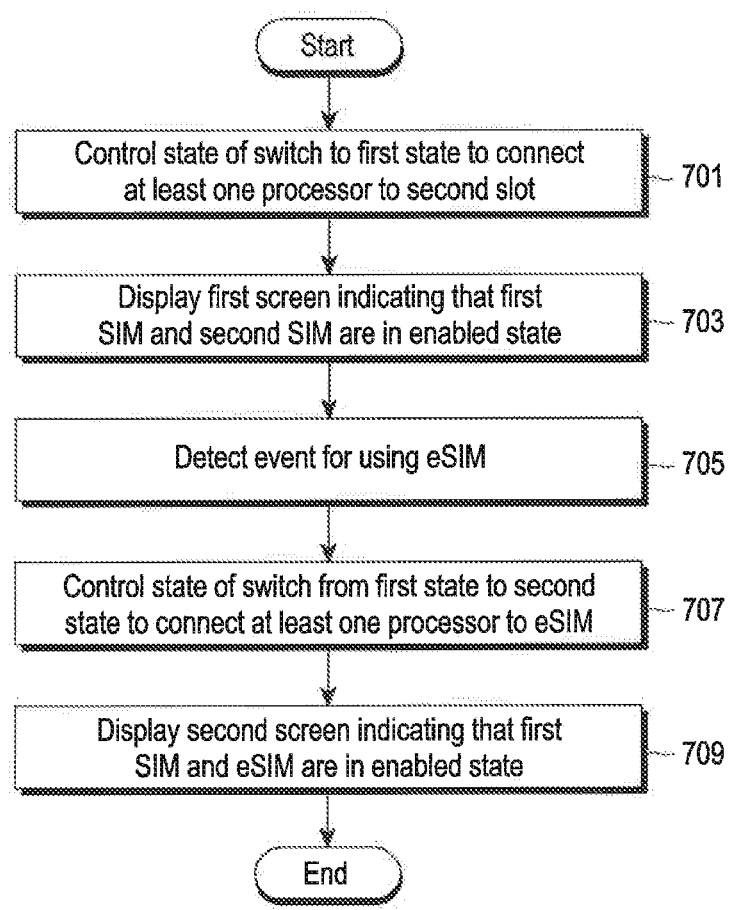
FIGS. 7A and 7B are flowcharts illustrating an operation method of an electronic device according to an embodiment of the disclosure.

FIG. 7A is a flowchart illustrating an operation method of an electronic device according to an embodiment of the disclosure.

According to various embodiments, the operations of FIG. 7A are described with reference to the electronic device 101 of FIG. 1A or 5A.

Among the operations of FIG. 7A, those already described above are briefly described below.

According to various embodiments, the electronic device 101 (e.g., at least one of the processor 120 or the communication processor 510) may control the state of the switch 560 to the first state to connect at least one processor (e.g., the communication processor 510) to the second slot 540 in operation 701. The second SIM 541 may be connected to the communication processor 510 through the second slot 540. In operation 703, the electronic device 101 may control, e.g., the display device 160 to display a first screen indicating that the first SIM 531 and the second SIM 541 are in an enabled state. The first screen may include at least a portion of, e.g., information about the first SIM 531 and the second SIM 541, information about network communication connected based on the first SIM 531 and the second SIM 541, information indicating whether the first SIM 531 or the second SIM 541 is enabled. Here, enablement of the first SIM 531 and the second SIM 541 may mean that network communication corresponding to the first SIM 531 and the second SIM 541 has been formed. For example, even when at least a portion of the first SIM 531 and the second SIM 541 is in a standby state based on the DSDS mode, if a corresponding SIM may wake up at a predetermined period (or based on an event) in the standby state, the corresponding SIM may be referred to as being in the enabled state. Alternatively, although at least a portion of the first SIM 531 and the second SIM 541 is in the sleep mode according to the discontinuous reception (DRX), if it may wake up at a predetermined period (or based on an event), the corresponding SIM may be referred to as being in the enabled state. The configuration of the first screen is not limited, and is described below. Alternatively, although no network communication is connected for a specific SIM due to failure in PLMN search, cell search, camp-on cell, or RRC connection for a specific cell, if a procedure for communication of network communication for the corresponding SIM is being performed, the corresponding may be referred to as being in the enabled state.

According to various embodiments, in operation 705, the electronic device 101 may detect an event for using the eSIM 550. For example, the electronic device 101 may detect an event for using the eSIM 550 based on a user input to the first screen. In operation 707, the electronic device 101 may control the state of the switch 560 from the first state to the second state to thereby connect at least one processor to the eSIM 550. In operation 709, the electronic device 101 may display a second screen indicating that the first SIM 531 and the eSIM 550 are in the enabled state.

Meanwhile, as the eSIM 550 switches to the enabled state, the second SIM 541 may switch to the disabled state. The electronic device 101 may output a message indicating that network communication corresponding to the second SIM 541 will be released and, for example, be configured to enable the eSIM 550 upon receiving an additional command from the user.

Figure 7B:
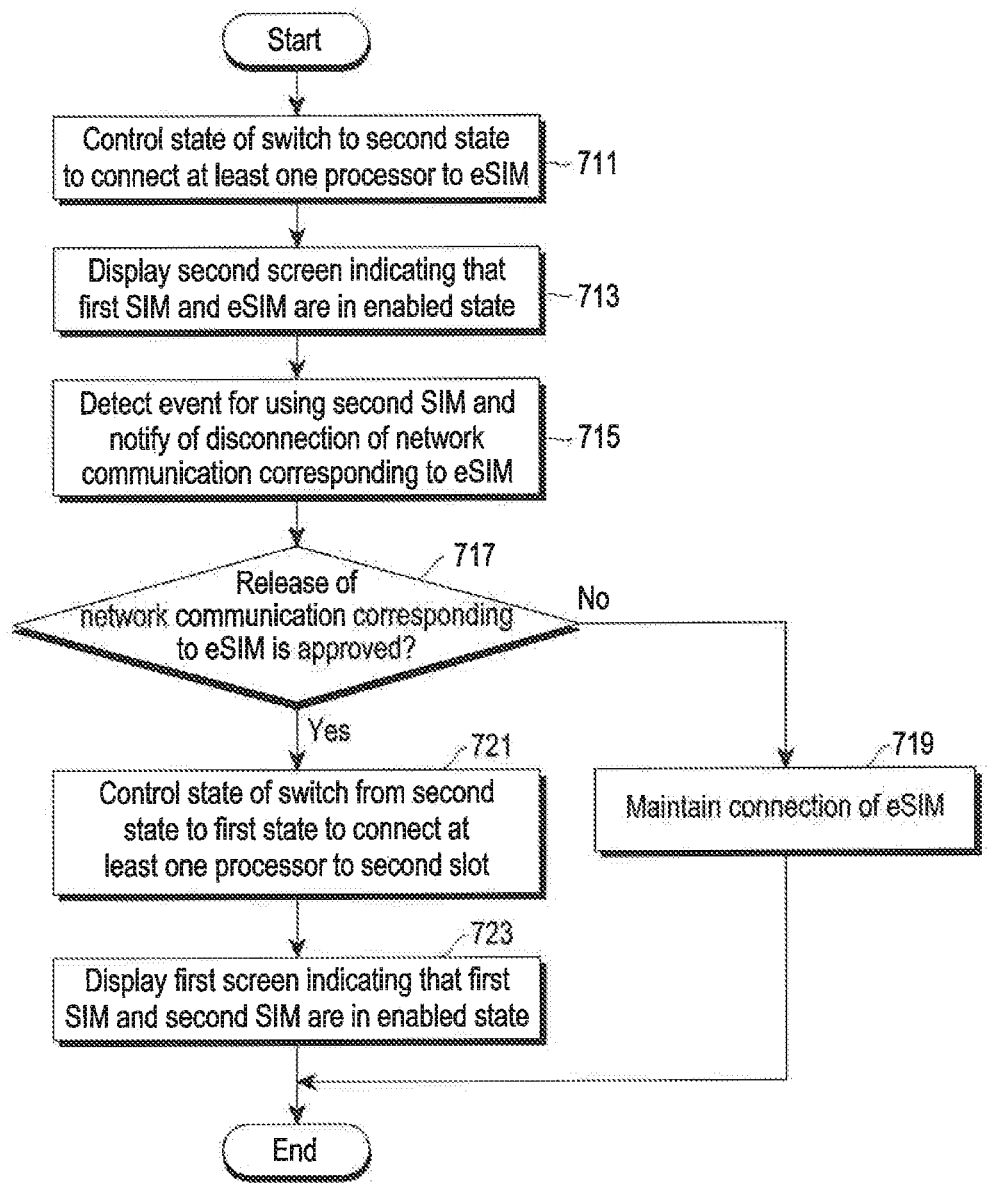

FIG. 7B is a flowchart illustrating an operation method of an electronic device according to an embodiment of the disclosure. Among the operations of FIG. 7B, those already described above are briefly described below. FIG. 7B is described with reference to the electronic device 101 of FIG. 1A or 5A and FIGS. 8A to 8D.

According to various embodiments, the electronic device 101 (e.g., at least one of the processor 120 or the communication processor 510) may control the state of the switch 560 to the second state to connect at least one processor (e.g., the communication processor 510) to the eSIM 550 in operation 711. In operation 713, the electronic device 101 may display a second screen indicating that the first SIM 531 and the eSIM 550 are in the enabled state.

FIGS. 8A, 8B, 8C, and 8D illustrate screens displayed on an electronic device, according to various embodiments of the disclosure.

Figure 8A:
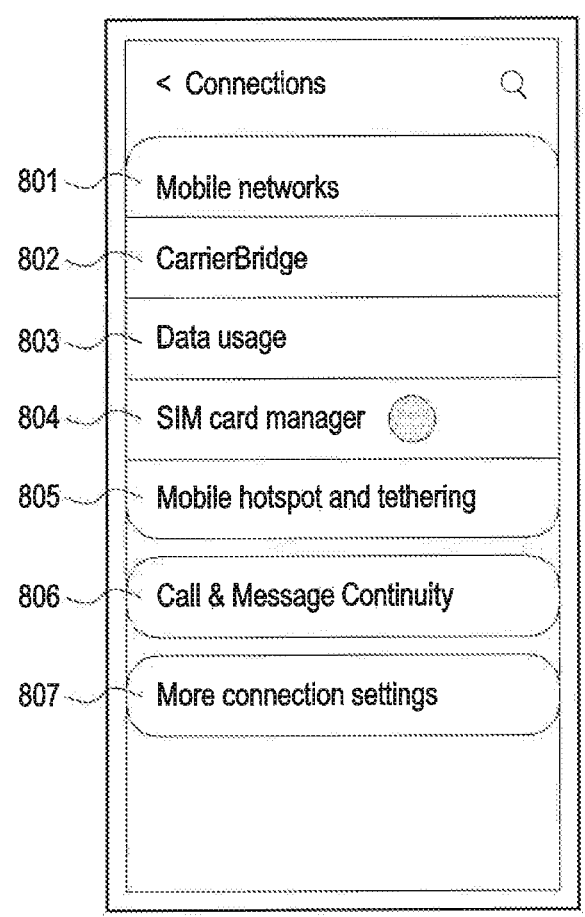
FIGS. 8A, 8B, 8C, and 8D illustrate screens displayed on an electronic device, according to various embodiments of the disclosure.
Figure 8B:
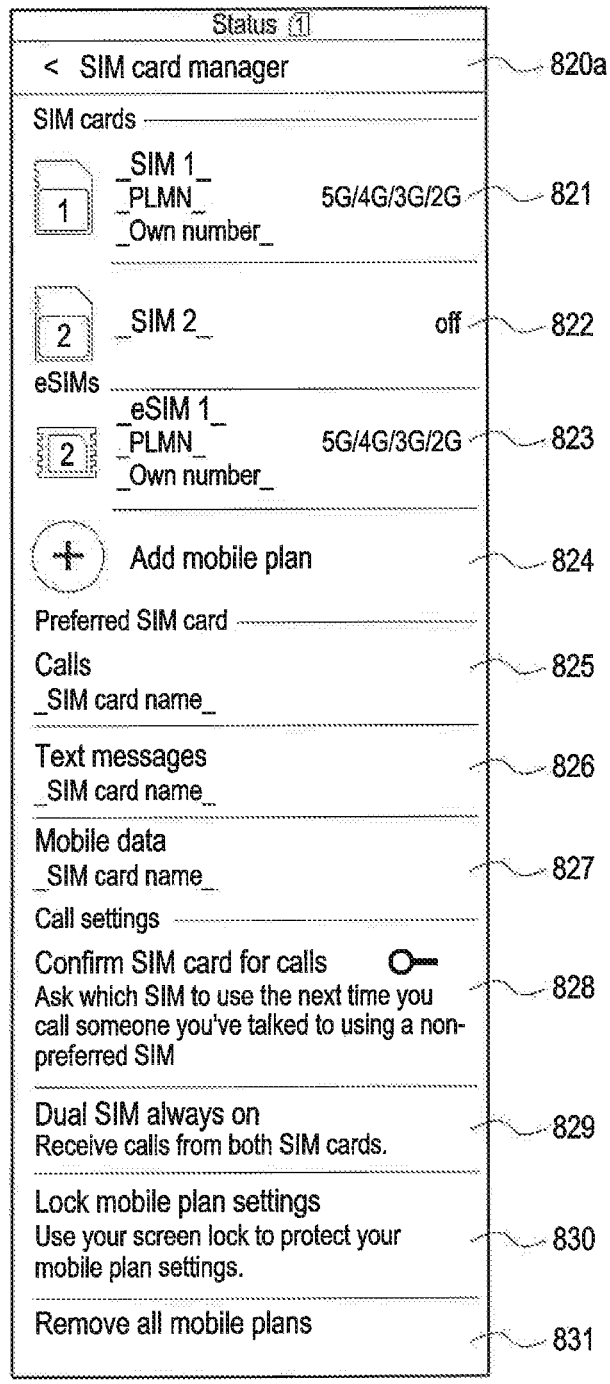

Referring to FIG. 8A, the electronic device 101 may display a screen for setting the connection of network communication. The screen for setting the connection may include at least one of, e.g., a mobile network setting tab 801, a carrier-bridge setting tab 802, a data usage check tab 803, a SIM card manager settings tab 804, a mobile hotspot and tethering setting tab 805, a call and message continuity setting tab 806, or a more connection setting tab 807, but the type of the tab is not limited. When the SIM card manager setting tab 804 among the tabs 801 to 807 is selected, the electronic device 101 may display a screen 820a including information associated with the SIM as shown in FIG. 8B.

According to various embodiments, the screen 820a including information associated with the SIM may include a tab 821 corresponding to the first SIM 531, a tab 822 corresponding to the second SIM 541, and a tab 823 corresponding to the first profile (e.g., eSIM1) stored in the eSIM 550. The electronic device 101 may display information (e.g., own number (e.g., mobile station international subscriber directory number (MSISDN)), PLMN information, or supportable network communication types) associated with the first SIM 531 on the tab 821 corresponding to the first SIM 531. The electronic device 101 may display the supportable network communication type to be visually distinguished from the tab 822 corresponding to the disabled SIM (e.g., the second SIM 541), based on the first SIM 531 being in the enabled state. The number "1" included in the icon in the tab 821 may correspond to, e.g., the first slot 530, and the number "2" included in the icon in the tabs 822 and 823 may correspond to, e.g., the second slot 540, but this is merely exemplary and the icon may be omitted. The electronic device 101 may display information (e.g., own number, PLMN information, or supportable network communication types) associated with the second SIM 541 on the tab 822 corresponding to the second SIM 541. However, the electronic device 101 may simply display the characters "off" on the tab 822 corresponding to the second SIM 541 based on the second SIM 541 being in the disabled state. The electronic device 101 may display information (e.g., own number, PLMN information, or supportable network communication types) associated with the eSIM 550 on the tab 823 corresponding to the first profile. The electronic device 101 may display the supportable network communication type to be visually distinguished from the tab 822 corresponding to the disabled SIM (e.g., the second SIM 541), based on the eSIM 550 being in the enabled state. The electronic device 101 may display the supportable network types (e.g., 5G/4G/3G/2G) for the enabled SIMs (e.g., the first SIM 531 and the eSIM 550) and display an indicator (e.g., the text "off") indicating that the disabled SIM (e.g., the second SIM 541) is in the disabled state for the disabled SIM, thereby allowing the user to identify the currently enabled/disabled SIMs. According to an implementation, the screen 820a including the information associated with the SIM may further include a tab 824 for adding a mobile plane, a calls-related tab 825, a text messages-related tab 826, a mobile data-related tab 827, a confirm SIM card for calls tab 828, a dual SIM always on tab 829, a lock mobile plan settings tab 830, and a delete all mobile plans tab 831, but is not limited. A mobile plan may include a profile.

Figure 8C:
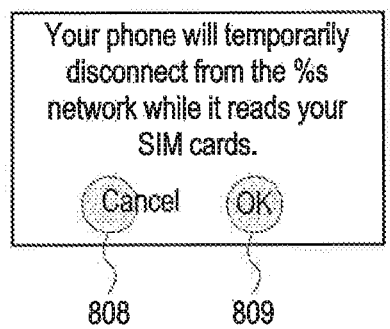

According to various embodiments, in operation 715, the electronic device 101 may indicate detection of an event for using the second SIM 541 and release of connection of network communication corresponding to the eSIM 550. For example, the electronic device 101 may detect an event (e.g., receiving the SIM into the second slot 540) for temporarily using the second SIM 541. The electronic device 101 may display a pop-up window indicating that the network communication (e.g., % s network) corresponding to the eSIM 550 may be temporarily disconnected, as shown in FIG. 8C, for example. The popup window may include an icon 808 for rejection and an icon 809 for approval. In operation 717, the electronic device 101 may identify whether the release of network communication corresponding to the eSIM 550 has been approved. For example, when the icon 809 for approving on the popup window is selected, the electronic device 101 may identify that the release of network communication corresponding to the eSIM 550 has been approved. Upon identifying that the release of the network communication corresponding to the eSIM 550 is not approved (no in 717) (e.g., when the icon 808 for rejection is selected or when detection of selection of the icon 809 for approval fails), the electronic device 101 may maintain connection of the eSIM 550 in operation 719. Upon identifying that the release of the network communication corresponding to the eSIM 550 is approved (yes in 717), the electronic device 101 may control the state of the switch 560 from the second state to the first state to connect the at least one processor (e.g., the communication processor 510) to the second slot 540 in operation 721.

According to various embodiments, in operation 723, the electronic device 101 may display a first screen indicating that the first SIM 531 and the second SIM 541 are in the enabled state. For example, the electronic device 101 may display information (e.g., own number, PLMN-related information, or supportable network communication types) associated with the second SIM 541 on the tab 822 corresponding to the second SIM 541 as the screen 820b of FIG. 8D. The electronic device 101 may display the supportable network communication type to be visually distinguished from the tab 823 corresponding to the disabled SIM (e.g., the eSIM 550), based on the second SIM 541 being in the enabled state. The electronic device 101 may display the supportable network types (e.g., 5G/4G/3G/2G) for the enabled SIMs (e.g., the first SIM 531 and the second SIM 541) and display an indicator (e.g., the text "off") indicating that the disabled SIM (e.g., the eSIM 550) is in the disabled state for the disabled SIM, thereby allowing the user to identify the currently enabled/disabled SIMs.

Meanwhile, although not shown, the electronic device 101 may switch the screen (e.g., the screen 820b of FIG. 8D) indicating that the eSIM 550 is disabled to the screen (e.g., the screen 820a of FIG. 8B 0 indicating that the eSIM 550 is enabled as described in connection with FIG. 7A. Further, upon detecting an event for using the eSIM 550, the electronic device 101 may display a popup window indicating that the network communication corresponding to the second SIM 541 is scheduled to be temporarily released, in a similar manner to that shown in FIG. 8C and, upon identifying an approve command, enable the eSIM 550 and disable the second SIM 541.

Figure 9:
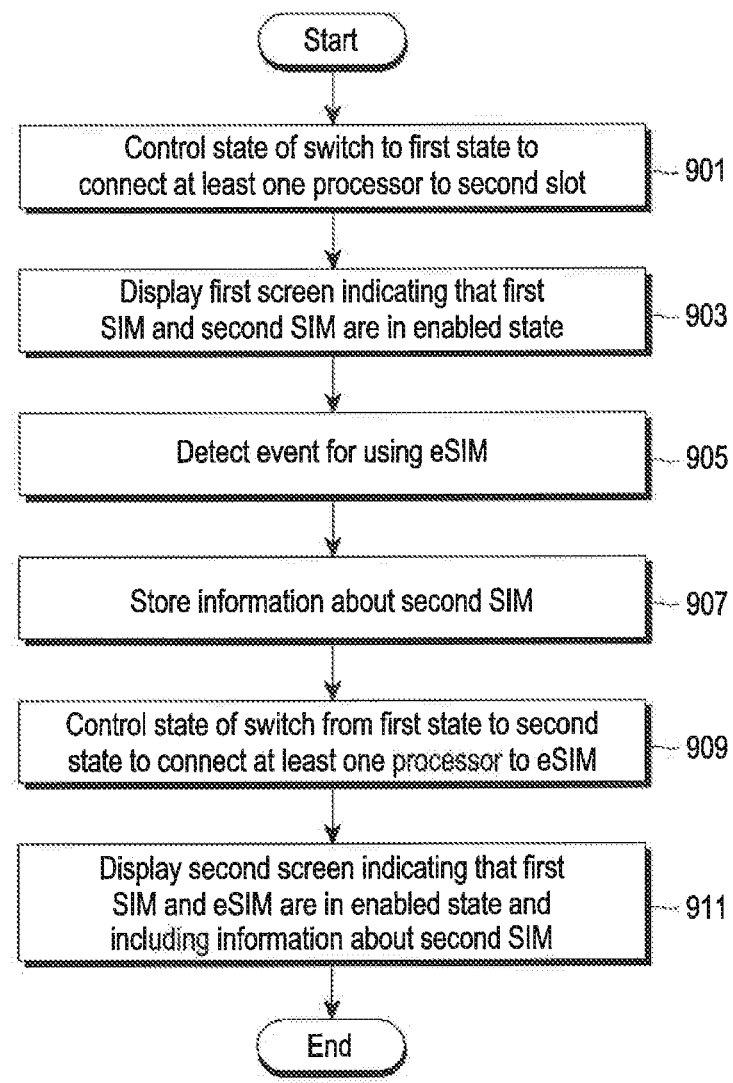
FIG. 9 is a flowchart illustrating an operation method of an electronic device according to an embodiment of the disclosure.

FIG. 9 is a flowchart illustrating an operation method of an electronic device according to an embodiment of the disclosure.

Among the operations of FIG. 9, those already described above are briefly described below. FIG. 9 is described with reference to the electronic device 101 of FIG. 1A or 5A and FIG. 10.

Figure 10:
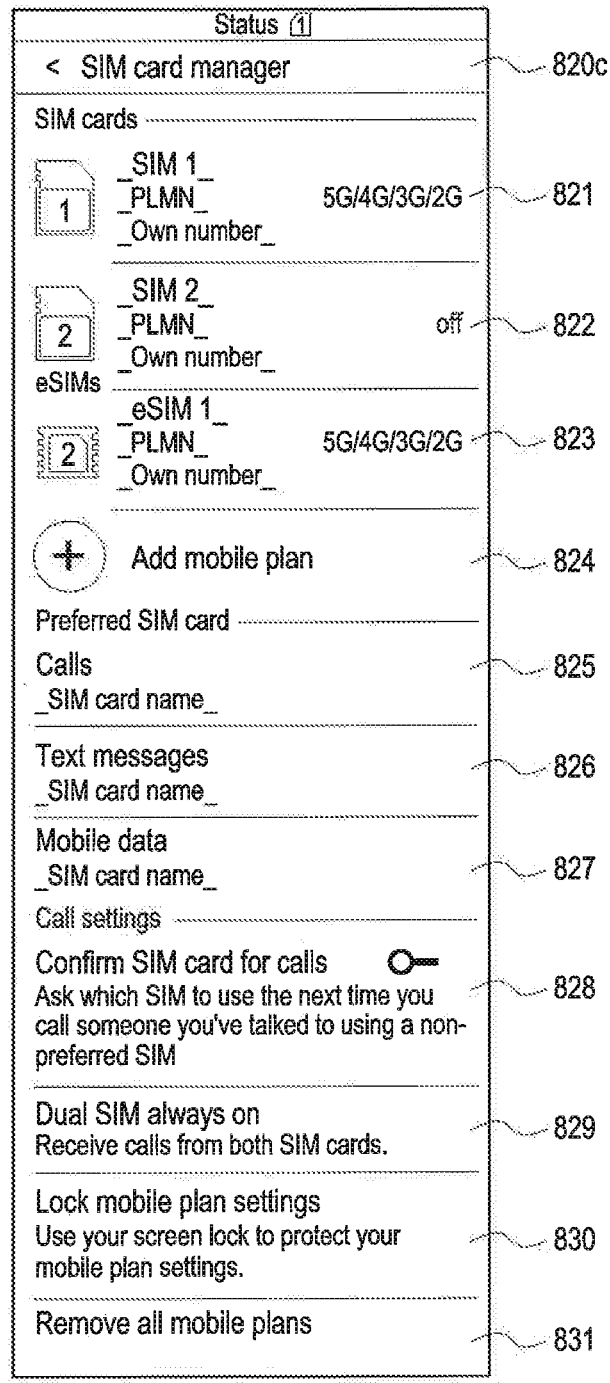
FIG. 10 is a view illustrating a screen displayed on an electronic device according to an embodiment of the disclosure.

FIG. 10 is a view illustrating a screen displayed on an electronic device according to an embodiment of the disclosure.

According to various embodiments, the electronic device 101 (e.g., at least one of the processor 120 or the communication processor 510) may control the state of the switch 560 to the first state to connect at least one processor (e.g., the communication processor 510) to the second slot 540 in operation 901. In operation 903, the electronic device 101 may display a first screen (e.g., the screen of FIG. 8D) indicating that the first SIM 531 and the second SIM 541 are in the enabled state, in a state in which the second SIM 541 is connected. In operation 905, the electronic device 101 may detect an event for using the eSIM 550.

According to various embodiments, in operation 907, the electronic device 101 may store information about the second SIM 541. For example, the electronic device 101 may store at least some of ICCID, IMSI, HPLMN-related information, and MSISIDN corresponding to the second SIM 541. The electronic device 101 is illustrated as storing information about the second SIM 541 upon detecting an event for using the eSIM 550, but this is exemplary. The electronic device 101 may store (or update) the information about the second SIM 541 upon initializing the second SIM 541 (e.g., upon initializing the SIM due to the booting of the electronic device 101), upon initial enablement of the second SIM 541, upon reenabling the second SIM 541, or at other various times, but the time is not limited. When the information about the second SIM 541 is stored before detecting an event for using the eSIM 550, operation 907 may be omitted or be replaced with the operation of reading the information about the second SIM 541. In operation 909, the electronic device 101 may control the state of the switch 560 from the first state to the second state to thereby connect at least one processor (e.g., the communication processor 510) to the eSIM 550.

According to various embodiments, in operation 911, the electronic device 101 may display a second screen indicating that the first SIM 531 and the eSIM 550 are in the enabled state and that includes information (e.g., PLMN information and own number) about the second SIM 541. For example, the electronic device 101 may display a screen 820c as shown in FIG. 10. Referring to FIG. 10, the electronic device 101 may display the text "off" which is an indicator indicating that it is in the disabled state on the tab 822 corresponding to the second SIM 541. The electronic device 101 may further display information about the PLMN corresponding to the second SIM 541 on the tab 822 corresponding to the second SIM 541. The electronic device 101 may display the information about the second SIM 541 stored in operation 905 (or before detecting an event for using the eSIM 550). Accordingly, the user may identify the information about the corresponding SIM even while the specific SIM (e.g., the second SIM 541) is temporarily disabled.

According to various embodiments, although not shown, the electronic device 101 may also store the information about the eSIM 550. As the switch 560 is controlled in the first state, the second SIM 541 may be in the enabled state, and the eSIM 550 may be controlled in the disabled state. The electronic device 101 may display a screen indicating that the first SIM 531 and the second SIM 541 are in the enabled state and the eSIM 550 is in the disabled state, along with the information about the eSIM 550.

Figure 11A:
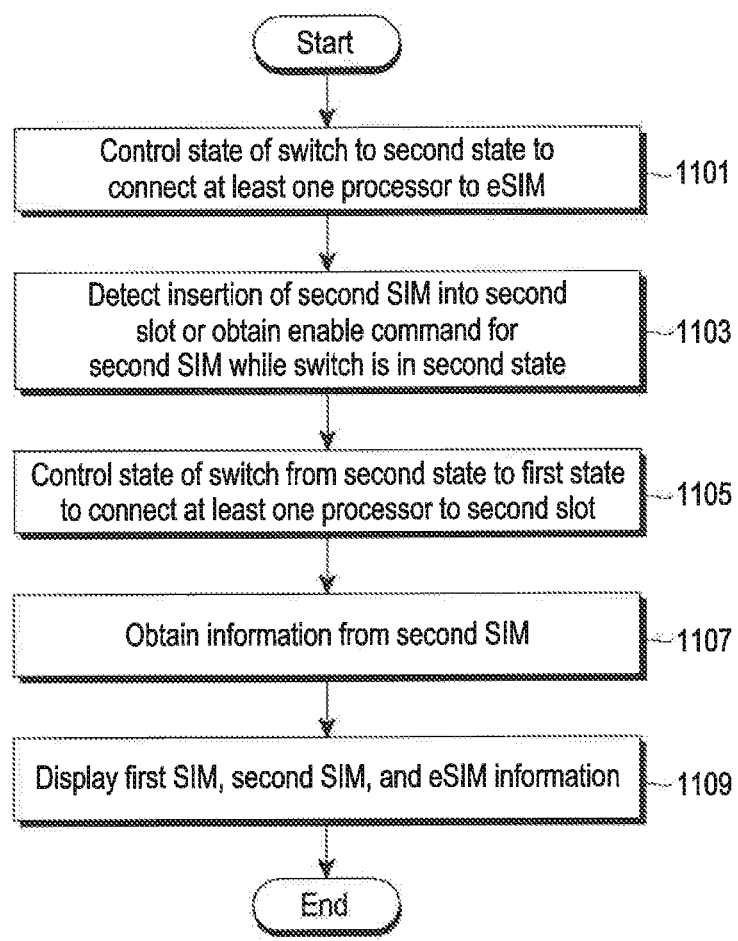
FIG. 11A is a flowchart illustrating an operation method of an electronic device according to an embodiment of the disclosure.

FIG. 11A is a flowchart illustrating an operation method of an electronic device according to an embodiment of the disclosure. Among the operations of FIG. 11A, those already described above are briefly described below. FIG. 11A is described with reference to the electronic device 101 of FIG. 1A or 5A and FIGS. 11B to 11F.

FIGS. 11B, 11C, 11D, 11E, and 11F illustrate screens displayed on an electronic device, according to various embodiments of the disclosure.

Figure 11B:
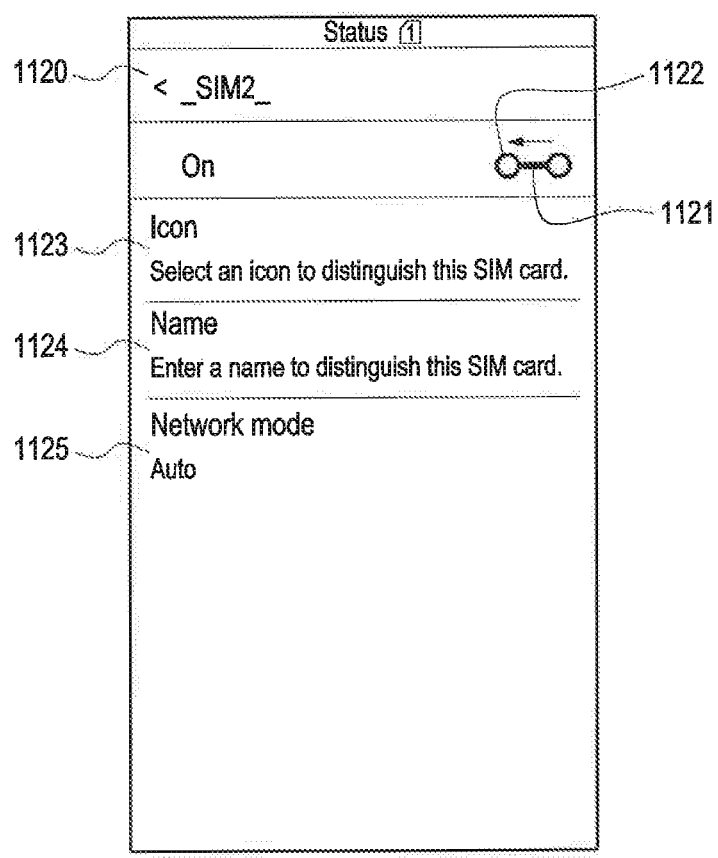
FIGS. 11B, 11C, 11D, 11E, and 11F illustrate screens displayed on an electronic device, according to various embodiments of the disclosure.

According to various embodiments, the electronic device 101 (e.g., at least one of the processor 120 or the communication processor 510) may control the state of the switch 560 to the second state to connect at least one processor (e.g., the communication processor 510) to the eSIM 550 in operation 1101. For example, the electronic device 101 may display a screen indicating that the first SIM 531 and the eSIM 550 are in the enabled state and the second SIM 541 is in the disabled state, as shown in FIG. 8B. In operation 1103, the electronic device 101 may detect insertion of the second SIM 541 into the second slot 540 or a command for enabling the second SIM 541 while the switch 560 is in the second state. For example, if the tab 822 corresponding to the second SIM 541 is selected on the screen as shown in FIG. 8B, the electronic device 101 may display a screen 1120 including information corresponding to the second SIM 541 as shown in FIG. 11B. The screen 1120 including the information corresponding to the second SIM 541 may include a bar 1121 for toggling the object 1122. If the object 1122 is placed in a first position on the bar 1121, the second SIM 541 may be enabled, and text (e.g., On) indicating that it is in the enabled state may be displayed. If the object 1122 is placed in a second position on the bar 1121, the second SIM 541 may be disabled, and text (e.g., Off) indicating that it is in the disabled state may be displayed. The electronic device 101 may change the position of the object 1122 based on a drag input corresponding to the object 1122 (or a touch input to designate the first position or the second position) and control whether to enable the second SIM 541 (or the state of the switch 560) based on the position of the object 1122. Upon identifying an input to move the object 1122 from the second position of the bar 1121 to the first position as shown in FIG. 11B, the electronic device 101 may identify that a command for enabling the second SIM 541 is obtained and change the text from "Off" to "On" as shown in FIG. 11B. In operation 1105, the electronic device 101 may control the state of the switch 560 from the second state to the first state, connecting at least one processor to the second slot 540. Although the screen 1120 may include a SIM card corresponding icon control tab 1123, a name-related ab 1124, and a network mode-related tab 1125, this is merely an example.

Figure 11C:
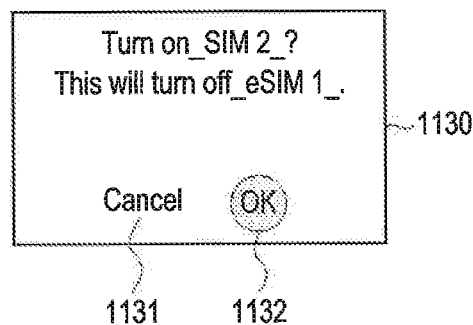

According to various embodiments, the electronic device 101 may display a popup window 1130 indicating that the network communication corresponding to the eSIM 550 is to be released as shown in FIG. 11C. The popup window 1130 may include an icon 1131 for rejection and an icon 1132 for approval. If the icon 1132 for approval is selected, the electronic device 101 may change the state of the switch 560 from the second state to the first state, thereby enabling the second SIM 541. If the icon 1131 for rejection is designated, the electronic device 101 may maintain the enabled state of the eSIM 550.

Figure 11D:
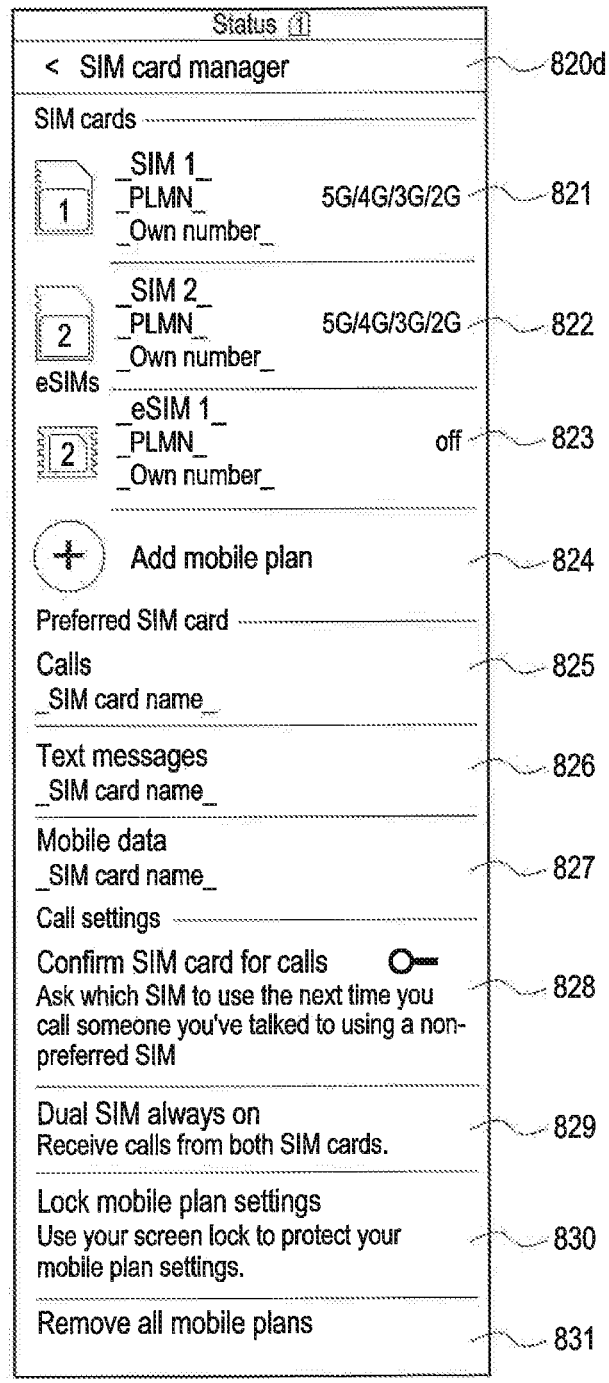

According to various embodiments, in operation 1107, the electronic device 101 may obtain information from the second SIM 541. The electronic device 101 may perform operations (e.g., an authentication procedure for the network communication corresponding to the second SIM 541 and network communication connection) corresponding to the second SIM 541 based on the obtained information. In operation 1109, the electronic device 101 may display information about the first SIM 531, the second SIM 541, and the eSIM 550. For example, as shown in FIG. 11D, the electronic device 101 may display supportable network communication (e.g., 5G/4G/3G/2G) on the tab 822 corresponding to the second SIM 541, thereby indicating that the second SIM 541 is in the enabled state. The electronic device 101 may display an indicator (e.g., the text "Off") indicating that the eSIM 550 is in the disabled state on the tab 823 corresponding to the first profile. Meanwhile, the electronic device 101 may also store information about the eSIM 550. For example, the electronic device 101 may store the information about the eSIM 550 after connection of the eSIM 550 in operation 1101, but the time of storage is not limited. The electronic device 101 may display the stored information (e.g., PLMN information) about the eSIM 550 on the tab 823 corresponding to the first profile.

Figure 11E:
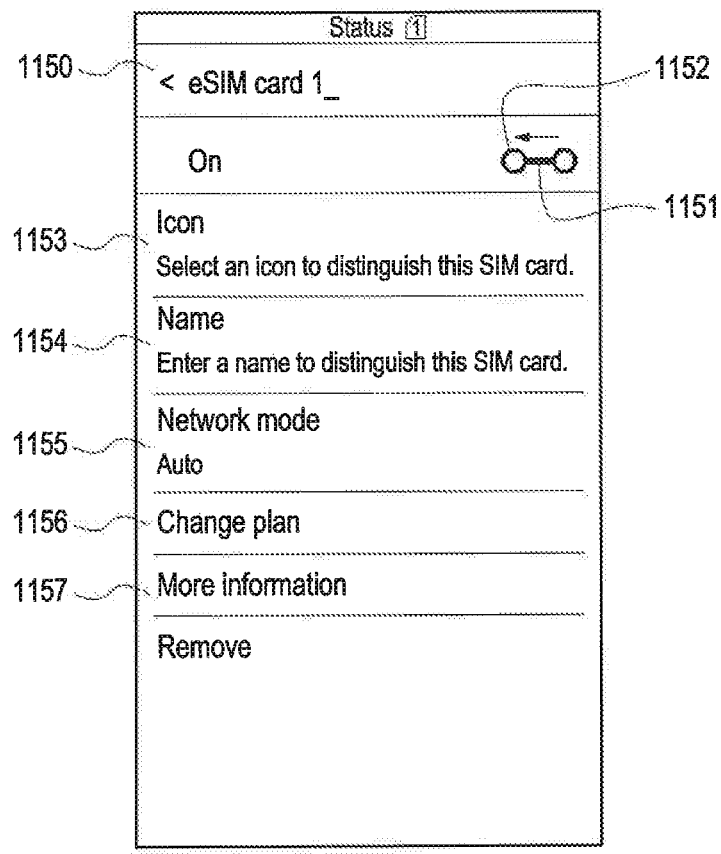

According to various embodiments, the electronic device 101 may obtain a command for enabling the eSIM 550. For example, the electronic device 101 may detect selection of the tab 823 corresponding to the first profile in a state in which the screen 820d as shown in FIG. 11D is displayed. If the tab 823 corresponding to the first profile is selected, the electronic device 101 may display the screen 1150 including the information corresponding to the eSIM 550 as shown in FIG. 11E. The screen 1150 including the information corresponding to the eSIM 550 may include a bar 1151 for toggling may include a bar 1151 for toggling the object 1152. If the object 1152 is placed in a first position on the bar 1151, the eSIM 550 may be enabled, and text (e.g., On) indicating that it is in the enabled state may be displayed. If the object 1152 is placed in a second position on the bar 1151, the eSIM 550 may be disabled, and text (e.g., Off) indicating that it is in the disabled state may be displayed. The electronic device 101 may change the position of the object 1122 based on a drag input corresponding to the object 1122 and control whether to enable the eSIM 550 (or the state of the switch 560) based on the position of the object 1152. Upon identifying an input to move the object 1152 from the second position of the bar 1151 to the first position as shown in FIG. 11E, the electronic device 101 may identify that a command for enabling the eSIM 550 is obtained and change the text from "Off" to "On" as shown in FIG. 11E. The electronic device 101 may control the state of the switch 560 from the first state to the second state to thereby connect at least one processor to the eSIM 550. The screen 1150 may include at least one of a SIM card corresponding icon control tab 1153, a name-related tab 1154, a network mode-related tab 1155, a mobile plan change tab 1156, and an additional information-related tab 1157.

Figure 11F:
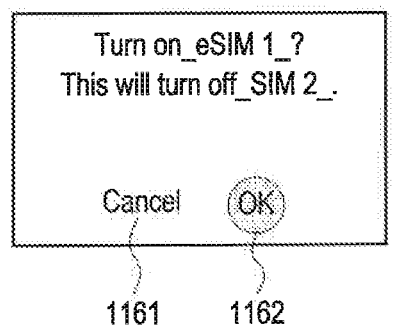

According to various embodiments, the electronic device 101 may display a popup window 1160 indicating that the network communication corresponding to the second SIM 541 is to be released as shown in FIG. 11F. The popup window 1160 may include an icon 1161 for rejection and an icon 1162 for approval. If the icon 1162 for approval is designated, the electronic device 101 may change the state of the switch 560 from the first state to the second state, thereby enabling the second SIM 541. If the icon 1161 for rejection is designated, the electronic device 101 may maintain the enabled state of the second SIM 541.

Figure 12:
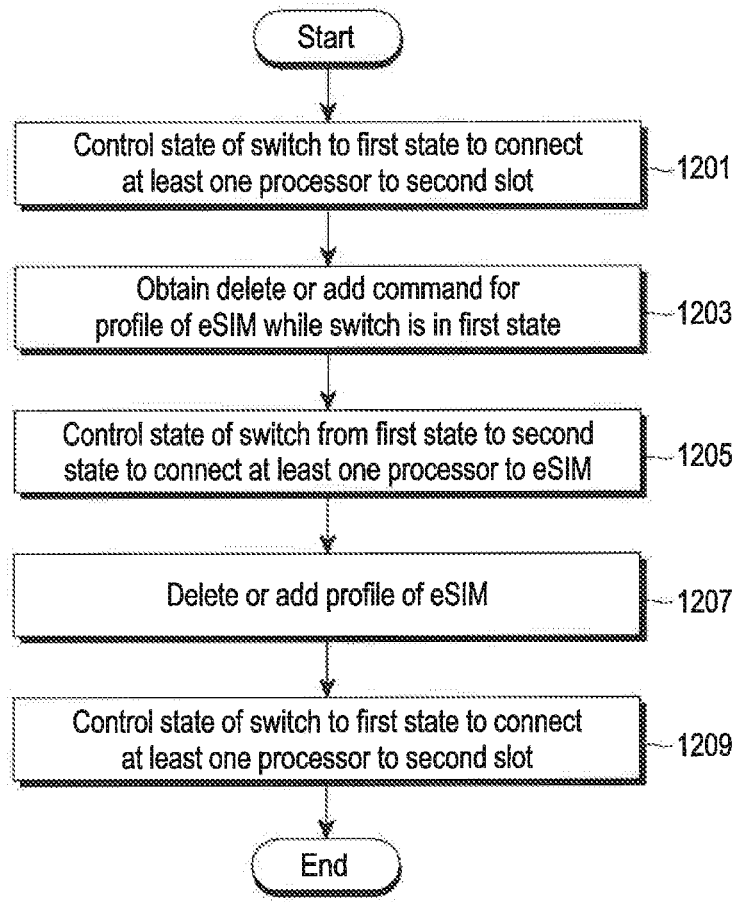
FIG. 12 is a flowchart illustrating an operation method of an electronic device according to an embodiment of the disclosure.

FIG. 12 is a flowchart illustrating an operation method of an electronic device according to an embodiment of the disclosure. Among the operations of FIG. 12, those already described above are briefly described below. FIG. 12 is described with reference to the electronic device 101 of FIG. 1A or 5A and FIGS. 13A to 13E.

FIGS. 13A, 13B, 13C, 13D, and 13E illustrate screens displayed on an electronic device, according to various embodiments of the disclosure.

Figure 13A:
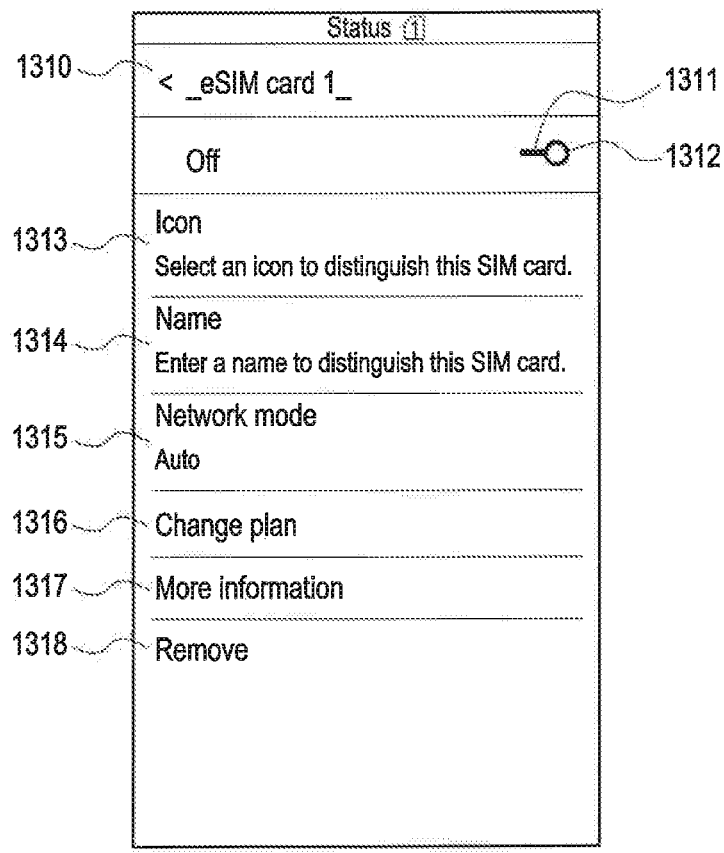
FIGS. 13A, 13B, 13C, 13D, and 13E illustrate screens displayed on an electronic device, according to various embodiments of the disclosure.

According to various embodiments, the electronic device 101 (e.g., at least one of the processor 120 or the communication processor 510) may control the state of the switch 560 to the first state to connect at least one processor (e.g., the communication processor 510) to the second slot 540 in operation 1201. In operation 1203, the electronic device 101 may obtain a command for deleting or adding a profile of the eSIM 550 while the switch 560 is in the first state. The electronic device 101 may detect selection of the tab 823 corresponding to the first profile while displaying a screen (e.g., the screen of FIG. 8D) indicating that the second SIM 541 is in the enabled state and the eSIM 550 is in the disabled state. If the tab 823 corresponding to the first profile is selected, the electronic device 101 may display the screen 1310 including the information corresponding to the eSIM 550 as shown in FIG. 13A. The screen 1310 including the information corresponding to the eSIM 550 may include a bar 1311 for toggling may include a bar 1151 for toggling the object 1312. If the object 1312 is placed in a first position on the bar 1311, the eSIM 550 may be enabled, and text (e.g., On) indicating that it is in the enabled state may be displayed. If the object 1312 is placed in a second position on the bar 1311, the eSIM 550 may be disabled, and text (e.g., Off) indicating that it is in the disabled state may be displayed. Since the current state is the disabled state of the eSIM 550, the text "Off" may be displayed. The screen 1310 may include at least one of a SIM card corresponding icon control tab 1313, a name-related tab 1314, a network mode-related tab 1315, a mobile plan change tab 1316, an additional information-related tab 1317, or a mobile plan (e.g., profile) delete tab 1318. If the mobile plan delete tab 1318 is selected, the electronic device 101 may identify that a profile delete command is obtained.

Figure 13B:
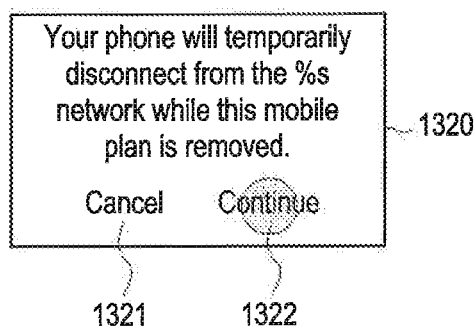

According to various embodiments, upon obtaining a profile delete command or add command, the electronic device 101 may control the state of the switch 560 from the first state to the second state to connect at least one processor to the eSIM 550 in operation 1205. According to various embodiments, the electronic device 101 may identify whether the corresponding profile can be deleted and, if so, start a delete procedure to control the state of the switch 560 from the first state to the second state. For example, when a profile policy rules 2 (PPR 2) is set for the corresponding profile, the corresponding profile may not be deleted. If it is identified that deletion is not limited, the electronic device 101 may start a delete procedure. Or the electronic device 101 may display a popup window 1320 indicating that the network communication corresponding to the second SIM 541 may be temporarily released while deleting the profile as shown in FIG. 13B. When the icon 1322 for approval of the icon 1321 for rejection and the icon 1322 for approval included in the popup window 1320 is selected, the electronic device 101 may start a delete procedure.

According to various embodiments, in operation 1207, the electronic device 101 may delete or add a profile of the eSIM 550. For example, at least one of the processor 120 or the communication processor 510 may transfer a profile delete or add request to the eSIM 550, and the eSIM 550 may delete or add a profile. If the deletion or addition of a profile is done (or if transfer of a profile delete or add request to the eSIM 550 is done), the electronic device 101 may control the state of the switch 560 to the first state to connect at least one processor to the second slot 540 in operation 1209. The electronic device 101 may switch the second SIM 541 to the enabled state and recover the network communication corresponding to the second SIM 541.

Figure 8D:
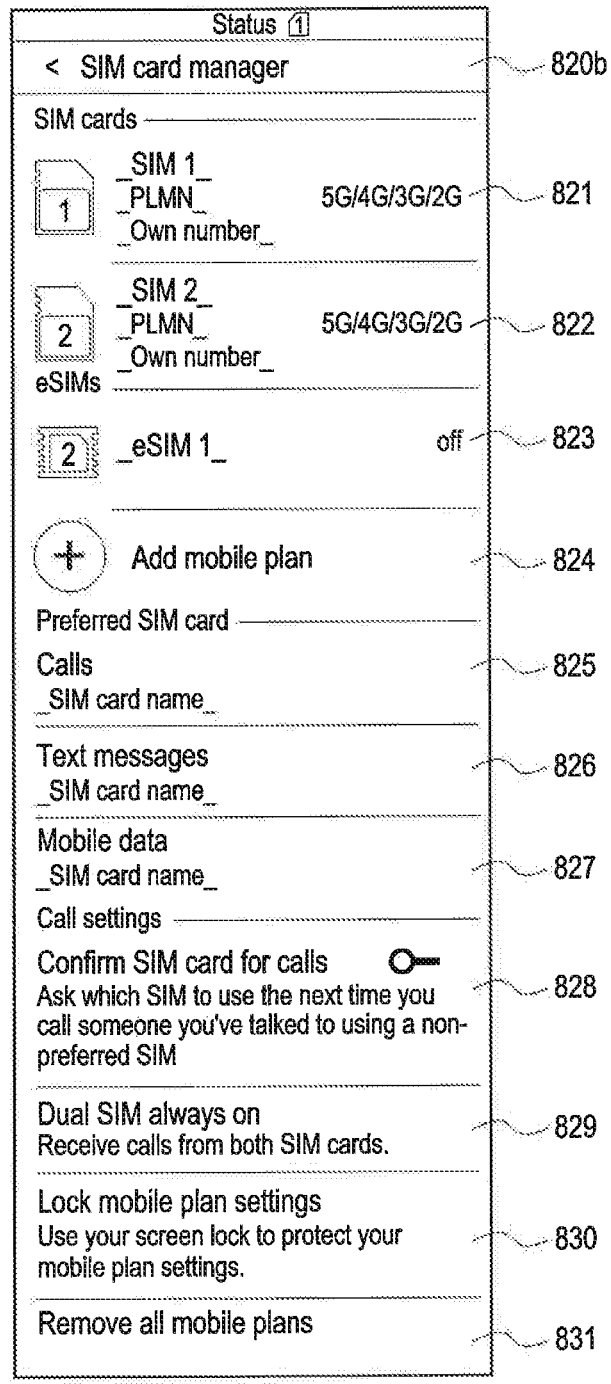
Figure 13C:
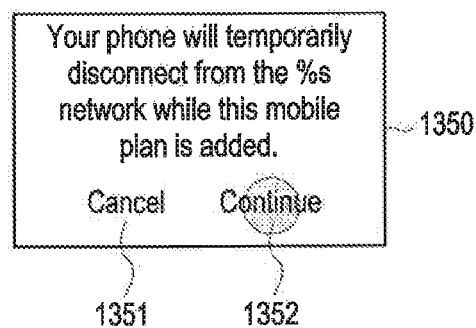
Figure 13D:
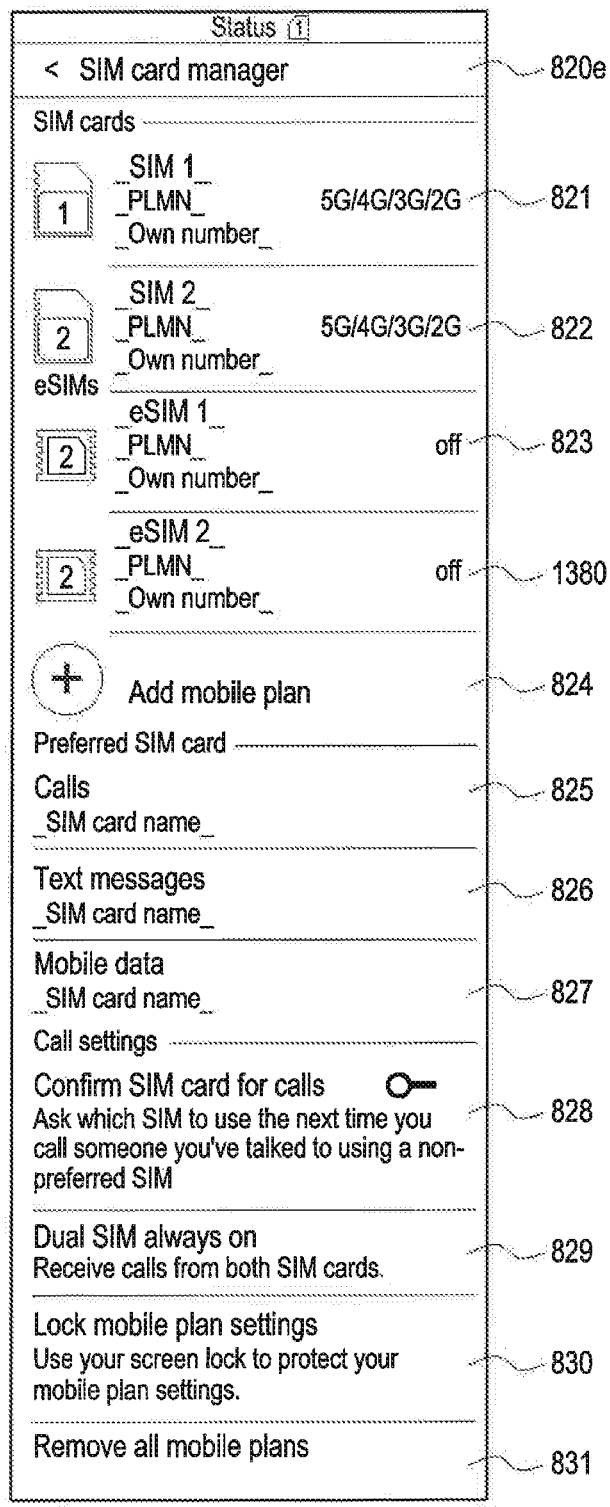

According to various embodiments, if a tab 824 for adding a mobile plan (e.g., profile) is selected on the screen as shown in FIG. 8D, the electronic device 101 may identify that a profile add command is obtained. When a command to add a mobile plan is obtained, the electronic device 101 may control the switch 560 to connect at least one processor to the eSIM 550. The electronic device 101 may identify whether it is possible to add a profile and, if possible, start a procedure for adding a profile. When PPR 1 is set for the profile set in the existing eSIM 550, the corresponding profile may be impossible to disable. In this case, the electronic device 101 may determine that it is impossible to add another profile. If PPR 1 is not set for the preset profile, the electronic device 101 may start a procedure for addition. Or the electronic device 101 may display a popup window 1350 indicating that the network communication corresponding to the second SIM 541 may be temporarily released while adding a profile as shown in FIG. 13C. When the icon 1352 for approval of the icon 1351 for rejection and the icon 1352 for approval (or continuation) included in the popup window 1350 is selected, the electronic device 101 may start an add procedure. If addition is done, the electronic device 101 may display a screen 820e including a tab 1380 corresponding to the added second profile (e.g., eSIM2) as shown in FIG. 13D. In FIG. 13D, 'eSIM2' is displayed on the tab 1380 corresponding to the added second profile according to an embodiment, but the added profile may be stored in the existing profile (e.g., the eSIM (e.g., eUICC 401) or eSIM 550 as the first profile eSIM1). If the tab 1380 corresponding to the added second profile is selected, at least one object capable of controlling the corresponding profile in the enabled state may be displayed. Meanwhile, in another embodiment, after adding a profile, the electronic device 101 may enable the eSIM 550 in which case a screen indicating that the added profile of the eSIM 550 is enabled may be displayed.

Figure 13E:
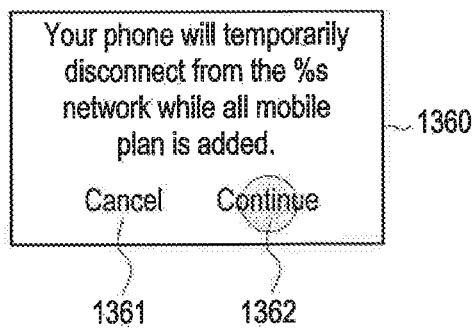

According to various embodiments, if a tab 831 for deleting all mobile plans (e.g., profiles) is selected on the screen as shown in FIG. 8D, the electronic device 101 may identify that a command for deleting all the profiles is obtained. According to various embodiments, upon obtaining an all profile delete command, the electronic device 101 may control the state of the switch 560 from the first state to the second state to connect at least one processor to the eSIM 550 in operation 1205. According to various embodiments, the electronic device 101 may identify whether at least some of all the profiles can be deleted and, if so, start a delete procedure to control the state of the switch 560 from the first state to the second state. Or the electronic device 101 may display a popup window 1360 indicating that the network communication corresponding to the second SIM 541 may be temporarily released while deleting all the profiles as shown in FIG. 13E. When the icon 1362 for approval of the icon 1361 for rejection and the icon 1362 for approval (or continuation) included in the popup window 1360 is selected, the electronic device 101 may start a delete procedure.

Figure 14A:
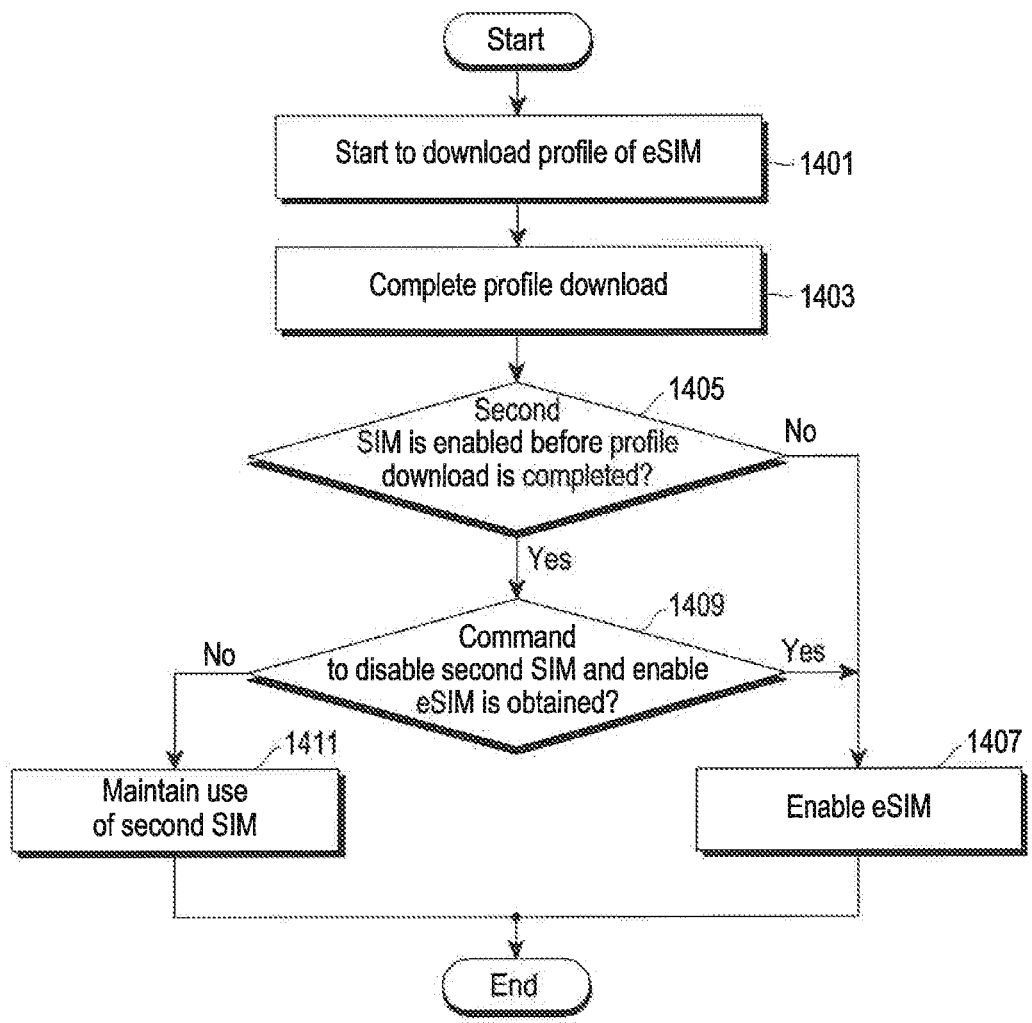
FIG. 14A is a flowchart illustrating an operation method of an electronic device according to an embodiment of the disclosure.

FIG. 14A is a flowchart illustrating an operation method of an electronic device according to an embodiment of the disclosure.

Among the operations of FIG. 14A, those already described above are briefly described below. FIG. 14A is described with reference to the electronic device 101 of FIG. 1A or 5A and FIG. 14B.

Figure 14B:
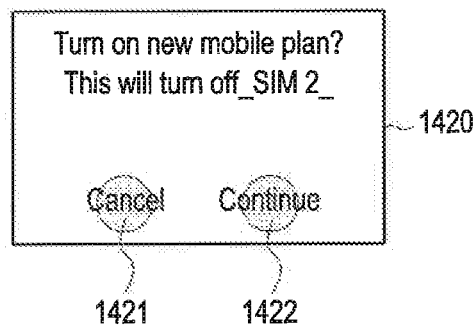
FIG. 14B is a view illustrating a screen displayed on an electronic device according to an embodiment of the disclosure.

FIG. 14B is a view illustrating a screen displayed on an electronic device according to an embodiment of the disclosure.

According to various embodiments, the electronic device 101 (e.g., at least one of the processor 120 or the communication processor 510) may start to download the profile of the eSIM 550 in operation 1401. In operation 1403, the electronic device 101 may complete the profile download. In operation 1405, the electronic device 101 may identify whether the second SIM 541 is enabled before the profile download is completed. For example, the second SIM 541 may be enabled before the profile is downloaded, and the electronic device 101 may identify whether the second SIM 541 is enabled.

Upon identifying that the second SIM 541 is not enabled (no in 1405), according to various embodiments, the electronic device 101 may enable the eSIM 550 in operation 1407 and perform network communication using the downloaded profile. In various embodiments, the electronic device 101 may output an inquiry about whether to enable the eSIM 550 and enable the eSIM 550 based on an additional user input. Upon identifying that the second SIM 541 is enabled (yes in 1405), the electronic device 101 may identify whether a command to disable the second SIM 541 and enable the eSIM 550 is obtained in operation 1409. For example, the electronic device 101 may display a popup window 1420 to inquire whether the second SIM 541 as shown in FIG. 14B is to be disabled and the downloaded profile is to be enabled. Upon obtaining a command to disable the second SIM 541 and enable the eSIM 550 (e.g., upon selecting the icon 1422 for approval (or continuation) of the popup window 1420) (yes in 1409), the electronic device 101 may enable the eSIM 550 in operation 1407. The electronic device 101 may switch the state of the switch 560 to the second state. Upon obtaining no command to disable the second SIM 541 and enable the eSIM 550 (e.g., if the icon 1421 for rejection on the popup window 1420 is selected) (no in 1409), the electronic device 101 may maintain use of the second SIM 541 in operation 1411. The electronic device 101 may maintain the state of the switch 560 as the first state.

Figure 15A:
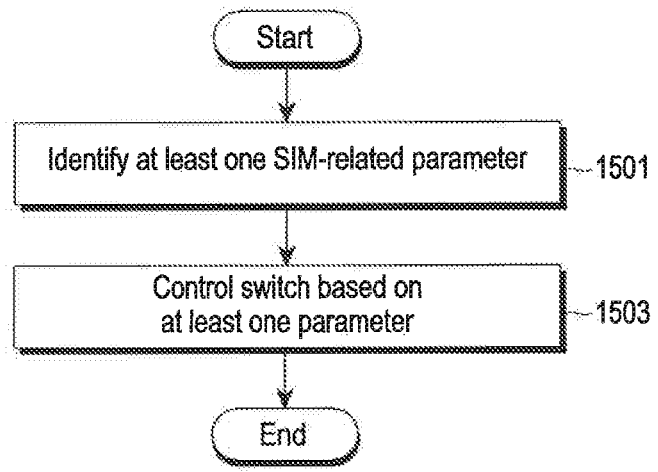
FIG. 15A is a flowchart illustrating an operation method of an electronic device according to an embodiment of the disclosure.

FIG. 15A is a flowchart illustrating an operation method of an electronic device according to an embodiment of the disclosure. Among the operations of FIG. 15A, those already described above are briefly described below. FIG. 15A is described with reference to the electronic device 101 of FIG. 1A or 5A and FIGS. 15B to 15D.

Figure 15B:
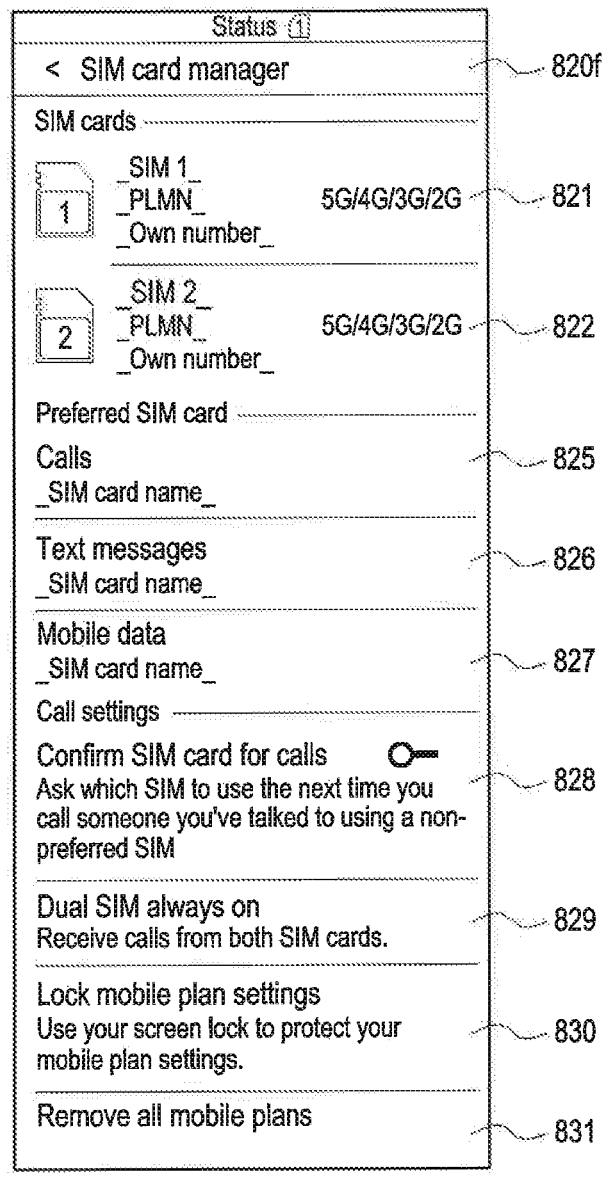
FIGS. 15B, 15C, and 15D illustrate screens displayed on an electronic device, according to various embodiments of the disclosure.
Figure 15C:
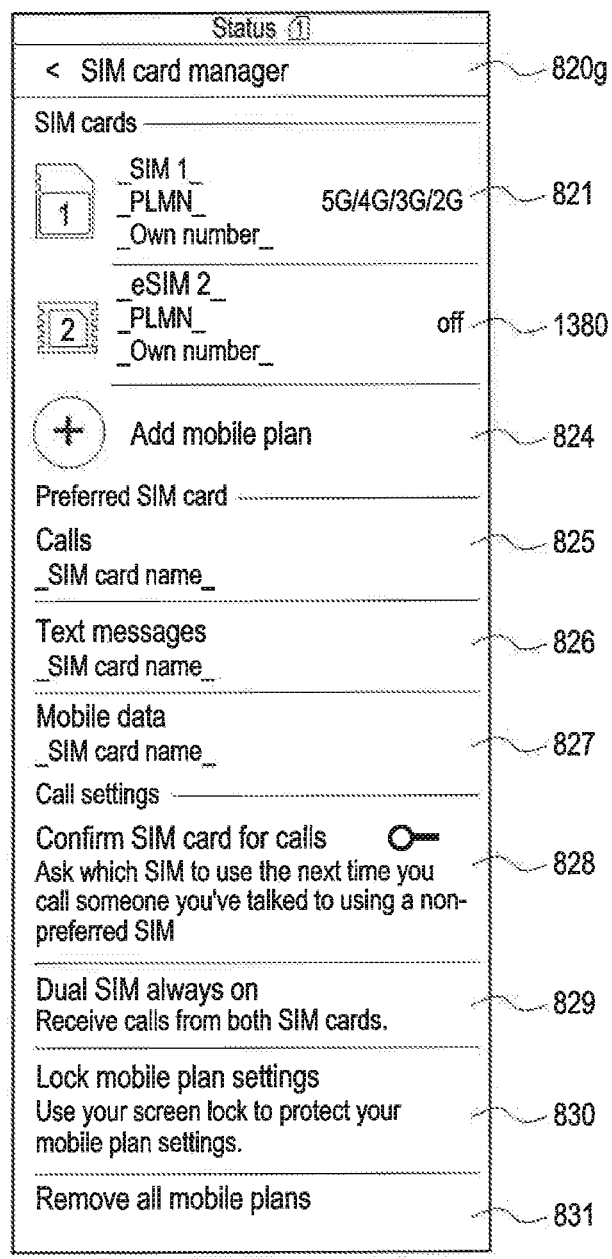
Figure 15D:
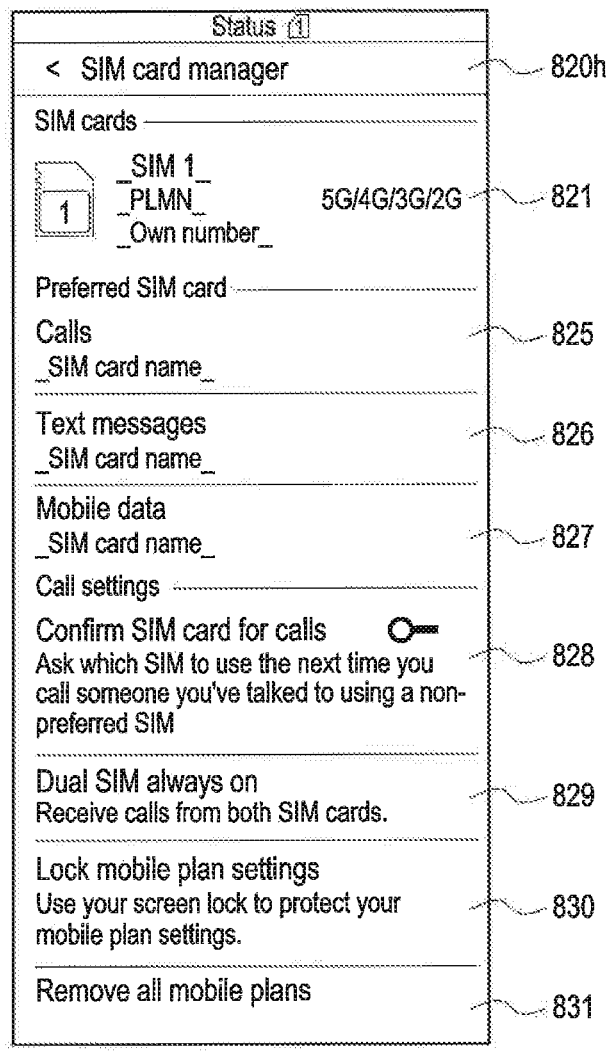

FIGS. 15B, 15C, and 15D illustrate screens displayed on an electronic device, according to various embodiments of the disclosure.

According to various embodiments, the electronic device 101 (e.g., at least one of the processor 120 or the communication processor 510) may identify at least one parameter related to SIM in operation 1501. According to various embodiments, the electronic device 101 may identify at least one of the parameter stored in the memory 130 or the parameter received from the network. For example, the memory 130 may store at least one of a first parameter (e.g., HAS EUICC) indicating whether the electronic device 101 includes the eSIM 550 or a second parameter (e.g., UICC SLOT) indicating the number of available slots. The number of available slots may indicate, e.g., the number of slots using rSIM and/or the number of slots capable of receiving rSIM as required by the operator. For example, the first to third parameters may be determined upon manufacture and be stored in a consumer software customization (CSC) file. In various embodiments, the first parameter and/or the second parameter may also be received and updated from the network. For example, as a change is made to whether the communication carrier supports eSIM, the electronic device 101 may receive the changed third parameter (e.g., SUPPORT EUICC) from the network and store it in the memory 130. For example, the electronic device 101 may identify the third parameter included in the consumer software customization (CSC) file, but the method for the electronic device 101 to identify whether the network supports the eSIM is not limited. At least part of operation 1501 or operation 1503 may be performed, e.g., while booting the electronic device 101, but the time of performing it is not limited.

According to various embodiments, in operation 1503, the electronic device 101 may control the switch 560 based on at least one parameter. In a first example, it may be identified that the first parameter is true and there are two second parameters, and the third parameter is true. In this case, the electronic device 101 may control the switch 560 to selectively connect either the second slot 540 or the eSIM 550 to the communication processor 510. For example, as described above in connection with operations 603 and 605 of FIG. 6A, the electronic device 101 may control the switch 560 to connect the second slot 540 to the communication processor 510 based on detection of an event for using the second SIM 541. Based on detection of an event for using the eSIM 550, the electronic device 101 may control the switch 560 to connect the eSIM 550 to the communication processor 510. The electronic device 101 may display, e.g., a screen as shown in FIG. 8B or 8D and control the switch 560 based on a user input to thereby enable either the second SIM 541 or the eSIM 550. According to various embodiments, when the third parameter is true, the electronic device 101 may display a screen including all of the tab corresponding to the first SIM 531, the tab corresponding to the second SIM 541, and the tab corresponding to the eSIM 550. Based on an input to the screen, the electronic device 101 may determine the SIM to enable of the second SIM 541 and eSIM 550. The electronic device 101 may control the switch 560 to connect the SIM determined to enable to at least one processor (e.g., the communication processor 510). According to various embodiments, e.g., as shown in FIG. 10, the electronic device 101 may store information about the disabled SIM and display the information even in the disabled state.

In a first example, it may be identified that the first parameter is true and there are two second parameters, and the third parameter is false. For example, a specific network communication operator may not support eSIM in which case the third parameter may be false. In this case, the electronic device 101 may control the switch 560 to connect the second slot 540 to the communication processor 510. For example, the electronic device 101 may identify the third parameter during booting and may control the switch 560 to connect the second slot 540 to the communication processor 510. The electronic device 101 may display, e.g., a screen 820*f* as shown in FIG. 15B. As shown in FIG. 15B, information about the profile of the eSIM may not be displayed. In another implementation example, the information about the eSIM may be displayed but be disabled not to be selected by the user.

In a third example, it may be identified that the first parameter is true and there is one second parameter, and the third parameter is true. For example, a specific network communication carrier may be an operator that requires that eSIM be necessarily used. The electronic device 101 may control the switch 560 to connect the eSIM 550 to the communication processor 510. The electronic device 101 may display, e.g., a screen 820*g* as shown in FIG. 15C. As shown in FIG. 15C, information about the first SIM 531 and the eSIM 550 may be displayed.

In a fourth example, it may be identified that the first parameter is true and there is one second parameter, and the third parameter is false. For example, a specific network communication carrier may be an operator that requires that only one rSIM be used. The electronic device 101 may control the switch 560 to connect the second slot 540 or eSIM 550 to the communication processor 510 or may not request information from the connected entity or disregard the received information. Alternatively, the electronic device 101 may control the switch 560 to connect neither the second slot 540 nor eSIM 550 to the communication processor 510. The electronic device 101 may display, e.g., a screen 820*h* as shown in FIG. 15D. As shown in FIG. 15D, information about the profile of at least one eSIM and the second SIM 541 may not be displayed. In another implementation example, the information about the profile of at least one eSIM and the second SIM 541 may be displayed but be disabled not to be selected by the user.

In a fifth example, the user of the electronic device 101 may switch the first network communication carrier supporting the third parameter being true to the second network communication carrier supporting the third parameter being false and use the network communication. For example, the electronic device 101 may change the settings to the first network communication carrier to the settings to the second network communication carrier. The electronic device 101 may configure the changed settings, e.g., during booting. In this case, the electronic device 101 may download and store the profile while using the eSIM 550. When there is a downloaded profile, the electronic device 101 may display a message indicating that it is impossible to change the network communication carrier. Or, the electronic device 101 may display a popup window inquiring to delete the profile of the eSIM 550 and, upon obtaining a profile delete command through the popup window, perform a procedure to change the settings to the network communication carrier after performing the profile delete command Meanwhile, certain countries (e.g., Turkey) have eUICC operation-related laws, it may not be possible to switch from a network communication carrier that supports eSIM to a network communication carrier that does not support eSIM or vice versa. Upon identifying that it is located in a specific country based on information about the country it is currently located, the electronic device 101 may display a message indicating that it is impossible to change the network communication carrier.

Figure 16:
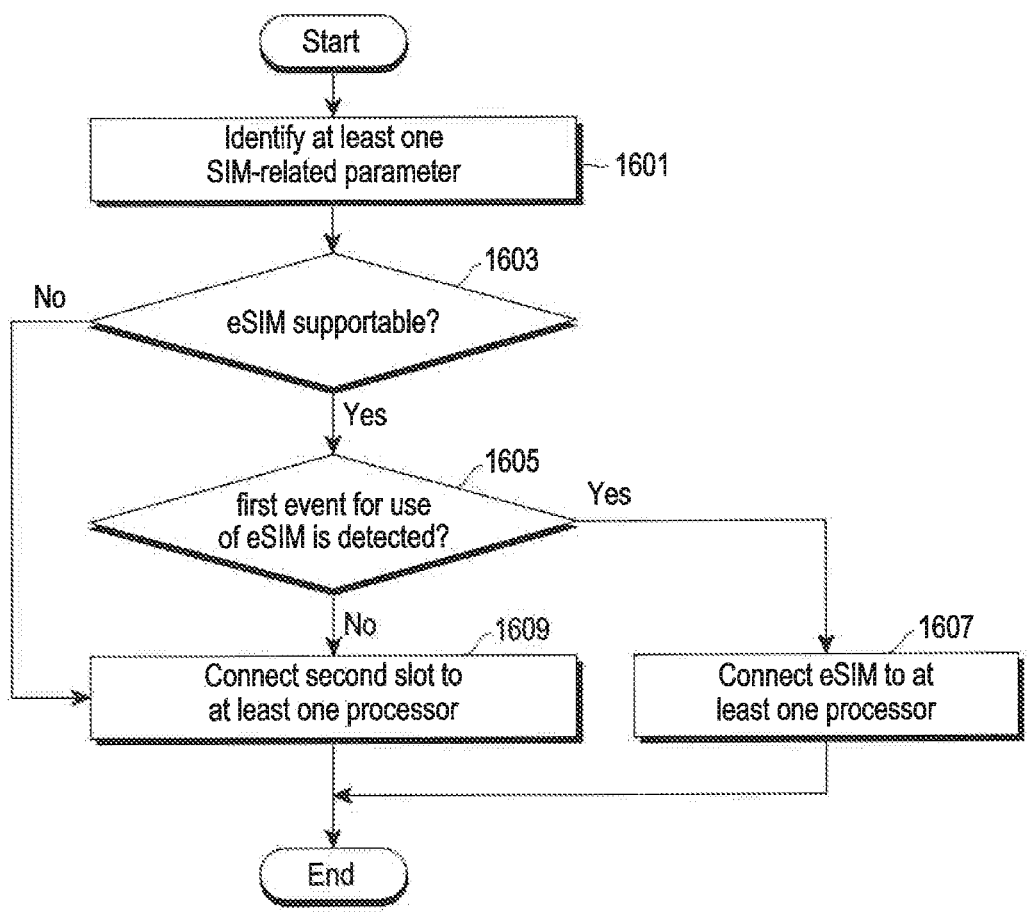
FIG. 16 is a flowchart illustrating an operation method of an electronic device according to an embodiment of the disclosure.

FIG. 16 is a flowchart illustrating an operation method of an electronic device according to an embodiment of the disclosure.

FIG. 16 is described with reference to the electronic device 101 of FIG. 1A or 5A. Among the operations of FIG. 16, those already described above are briefly described below.

According to various embodiments, the electronic device 101 (e.g., at least one of the processor 120 or the communication processor 510) may identify at least one parameter related to SIM in operation 1601. In operation 1603, the electronic device 101 may identify whether the network may support an eSIM based on at least one parameter. For example, the electronic device 101 may identify whether the third parameter is true or false. Upon identifying that the network may support an eSIM (e.g., upon identifying that the third parameter is true) (yes in 1603), the electronic device 101 may identify whether a first event for using the eSIM 550 is detected in operation 1605. For example, upon identifying that an eSIM is supportable, and the number of slots available is two, the electronic device 101 may identify whether a first event for using the eSIM 550 is detected. Upon identifying that the first event for using the eSIM 550 is detected (yes in 1605), the electronic device 101 may control the switch 560 to connect the eSIM 550 to at least one processor in operation 1607. Upon identifying that the first event for using the eSIM 550 is not detected (no in 1605), the electronic device 101 may control the switch 560 to connect the second slot 540 to at least one processor in operation 1609. Or, upon identifying that the network may not support an eSIM (e.g., when the third parameter is identified to be false) (no in 1603), the electronic device 101 may control the switch 560 to connect the second slot 540 to at least one processor in operation 1609.

Figure 17:
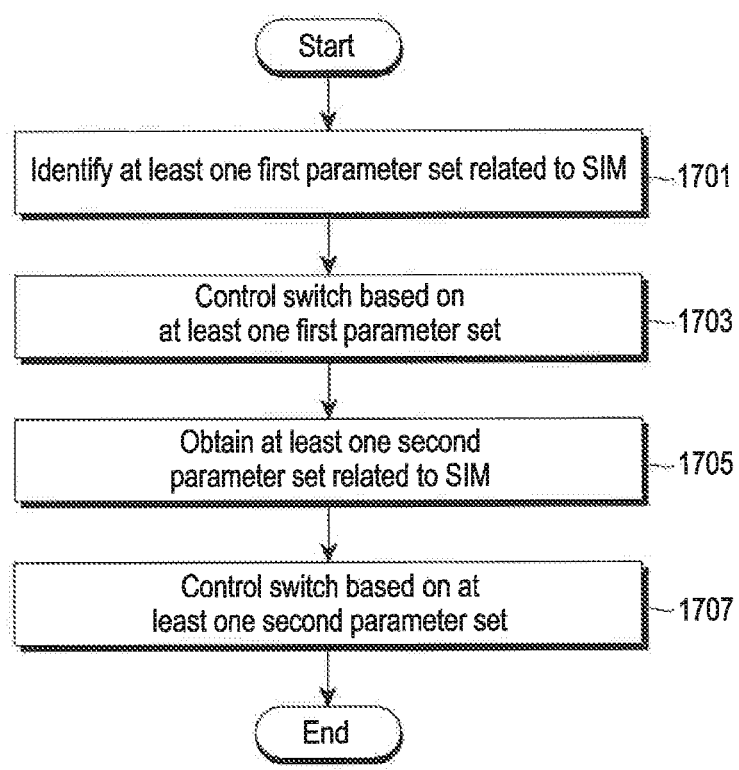
FIG. 17 is a flowchart illustrating an operation method of an electronic device according to an embodiment of the disclosure.

FIG. 17 is a flowchart illustrating an operation method of an electronic device according to an embodiment of the disclosure. Among the operations of FIG. 17, those already described above are briefly described below. The embodiment of FIG. 17 is described with reference to the electronic device 101 of FIG. 1A or 5A and FIG. 18.

Figure 18:
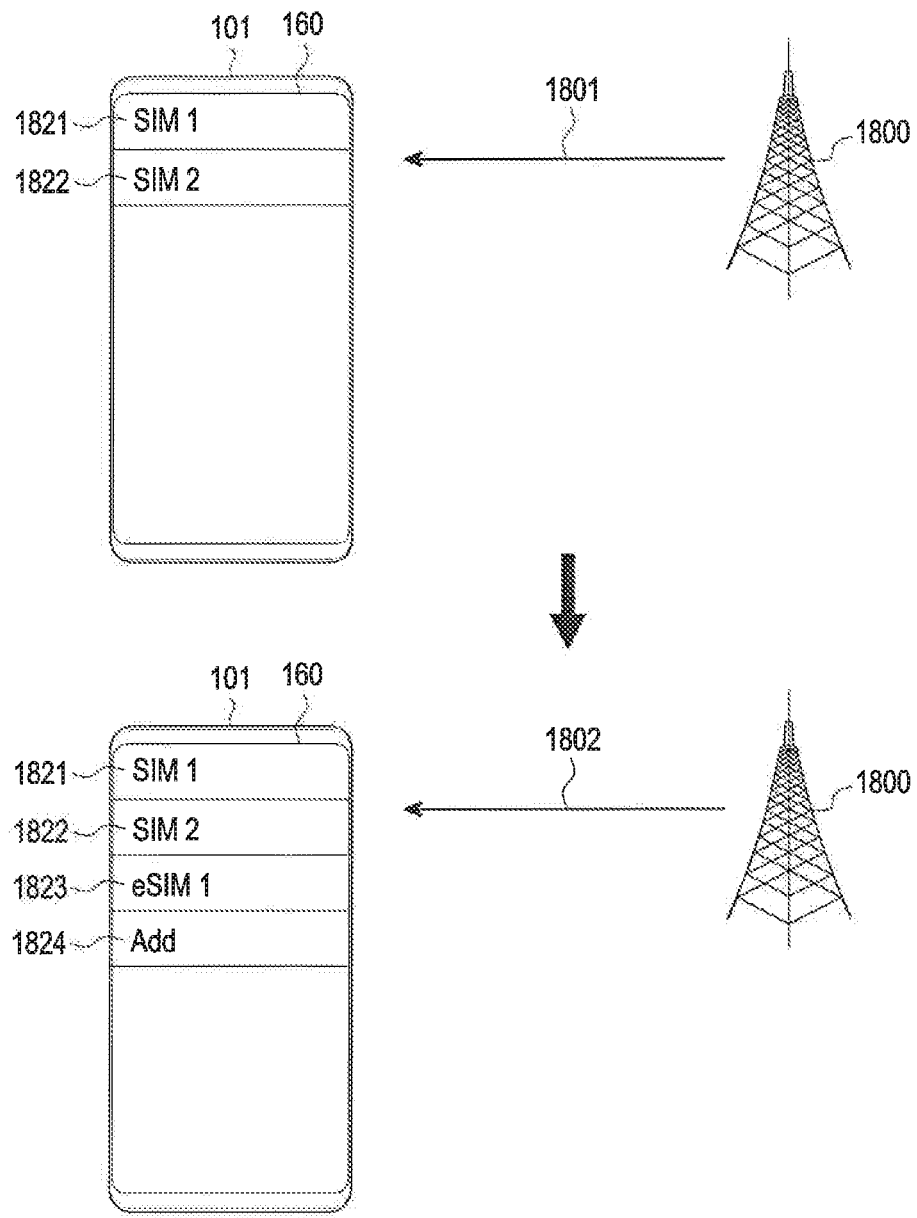
FIG. 18 is a view illustrating a network policy change according to an embodiment of the disclosure.

FIG. 18 is a view illustrating a network policy change according to an embodiment of the disclosure.

According to various embodiments, the electronic device 101 (e.g., at least one of the processor 120 or the communication processor 510) may identify at least one first parameter set related to SIM in operation 1701. In operation 1703, the electronic device 101 may control the switch 560 based on the at least one first parameter set. Referring to FIG. 18, the electronic device 101 may receive first information 1801 from the network 1800. The electronic device 101 may identify the first parameter set based on at least one of the first information 1801 or information stored in the memory 130. For example, the electronic device 101 may receive the first information and update the information stored in the memory 130 and identify the updated information. The first parameter set may indicate that the network 1800 does not support an eSIM. The electronic device 101 may control the switch 560 to connect the second slot 540 to the communication processor 510. The electronic device 101 may display information 1821 and 1822 about the first SIM 531 and the second SIM 541 which are rSIMs. The electronic device 101 may perform at least part of the identification of the first parameter set and the switch control based thereupon, during booting (or rebooting). For example, the electronic device 101 may output a message inquiring whether to reboot based on the received information and, upon obtaining a user input to the message, perform rebooting. During rebooting, at least part of identifying the first parameter set and controlling the switch based thereon may be performed.

According to various embodiments, the electronic device 101 may obtain at least one second parameter set related to the SIM in operation 1705. For example, the network communication carrier managing the network 1800 may change the policy to support eSIM. The network 1800 may provide the electronic device 101 with the second information 1802 indicating that the eSIM is supported. The electronic device 101 may store the second information 1802. The electronic device 101 may perform rebooting based on the reception of the second information. In operation 1707, the electronic device 101 may control the switch 560 based on the at least one second parameter set. For example, based on detection of an event for using the eSIM 550, the electronic device 101 may control the switch 560 to connect the eSIM 550 to the communication processor 510. The electronic device 101 may display information 1821, 1822, and 1823 about the first SIM 531, the second SIM 541, and the eSIM 550, and a tab 1824 for adding a profile. For example, when the second parameter set corresponds to the above-described first example, the electronic device 101, based on the detection of an event for using the eSIM 550, sends the eSIM 550 to the communication processor (The switch 560 may be controlled to be connected to the 510. If the second parameter set corresponds to the third example, the electronic device 101 may control the switch 560 to connect the eSIM 550 to the communication processor 510.

According to various embodiments, at least part of operation 1705 and operation 1707 may be performed during reboot of the electronic device 101 after operation 1703.

Alternatively, even when the network communication carrier which used to support eSIM changes the policy not to support eSIM, the network 1800 may provide a dual-SIM function to correspond to the changed policy by providing the information indicating that eSIM is not supported to the electronic device 101.

Hereinafter, embodiments of limiting the operation of the eSIM profile is described with reference to FIGS. 19 to 25, 26A to 26C, 27, 28A to 28C, 29, 30A to 30C, 31, 32A to 32F, 33A to 33C, 34A to 34C, 35A, and 35B. According to various embodiments, as described above, the electronic device 101 may include at least one eUICC (e.g., eSIM 201). In the following description, eUICC 401 may be used as a term corresponding to eSIM. According to various embodiments, the eSIM1 and/or eSIM2 shown in the drawings (e.g., FIGS. 28A and 29D) may be each profile included in one eUICC 401. For example, it may refer to a profile included in the eSIM.

As shown in FIG. 3, the eUICC (e.g., eSIM 201) may be included in the electronic device 101 to communicate with the processor 101. According to various embodiments, the eUICC 401 may include at least one profile 410, 420, and 430 as shown in FIG. 4. Each profile included in the eUICC 401 may be referred to as an eSIM profile. For example, in FIG. 4, one eUICC 401 may include a first profile 410 (a first eSIM profile), a second profile 420 (a second eSIM profile), and a third profile 430 (a third eSIM profile). According to various embodiments, when a plurality of profiles are installed in the one eUICC 401, only one profile (e.g., the first profile 410) may be in the enabled state, and the remaining profiles (e.g., the second profile 420 and the third profile 430) may be in the disabled state.

According to various embodiments, although FIG. 5A illustrates that the electronic device 101 is connected to the first SIM 531 and the second SIM 541 through the first slot 530 and the second slot 540, the electronic device 101 does not include the first slot 530 and/or the second slot 540, or the first SIM 531 and the second SIM 541 are not connected but only the eUICC (e.g., the eSIM 550) may be connected to the communication processor 510. In the various embodiments, the switch 560 of FIG. 5A may be omitted.

According to various embodiments, for each profile stored in the eUICC (e.g., the eUICC 401 of FIG. 4), the profile policy rule (PPR) for restricting (or not allowing) the operation of the corresponding profile may be included. For example, the PPR may be set not to allow a state change (e.g., change from the enabled state to disabled state or from the disabled state to the enabled state) of the corresponding profile or deletion of the profile. The PPR may be defined by a profile owner and may be set by the SM-DP server 220. Information related to the SM-DP server 220 may be included in metadata of the profile.

According to various embodiments, the PPR may not be included in each profile stored in the eUICC 401. One or more PPRs may be included. When a specific profile is installed in the eUICC 401, the PPR may be included in the corresponding profile. According to various embodiments, the PPR may be set to PPR1 and PPR2 as follows. Embodiments of the disclosure are not limited to the PPRs exemplified below, and various profile policy rules for operating and managing profiles may be added as PPRs of the disclosure.

PPR1: 'Disabling of this Profile is not Allowed'
PPR2: 'Deletion of this Profile is not allowed'

For example, when the PPR1 is set for a specific profile, the corresponding profile may not be allowed to switch from the enabled state to the disabled state or such switch may be restricted. Further, when the PPR2 is set for a specific profile, deletion of the corresponding profile may not be allowed or be restricted. According to various embodiments, the PPR2 may not affect the application of the PPR1 of another profile (e.g., the application of the disablement of the other profile).

Figure 20:
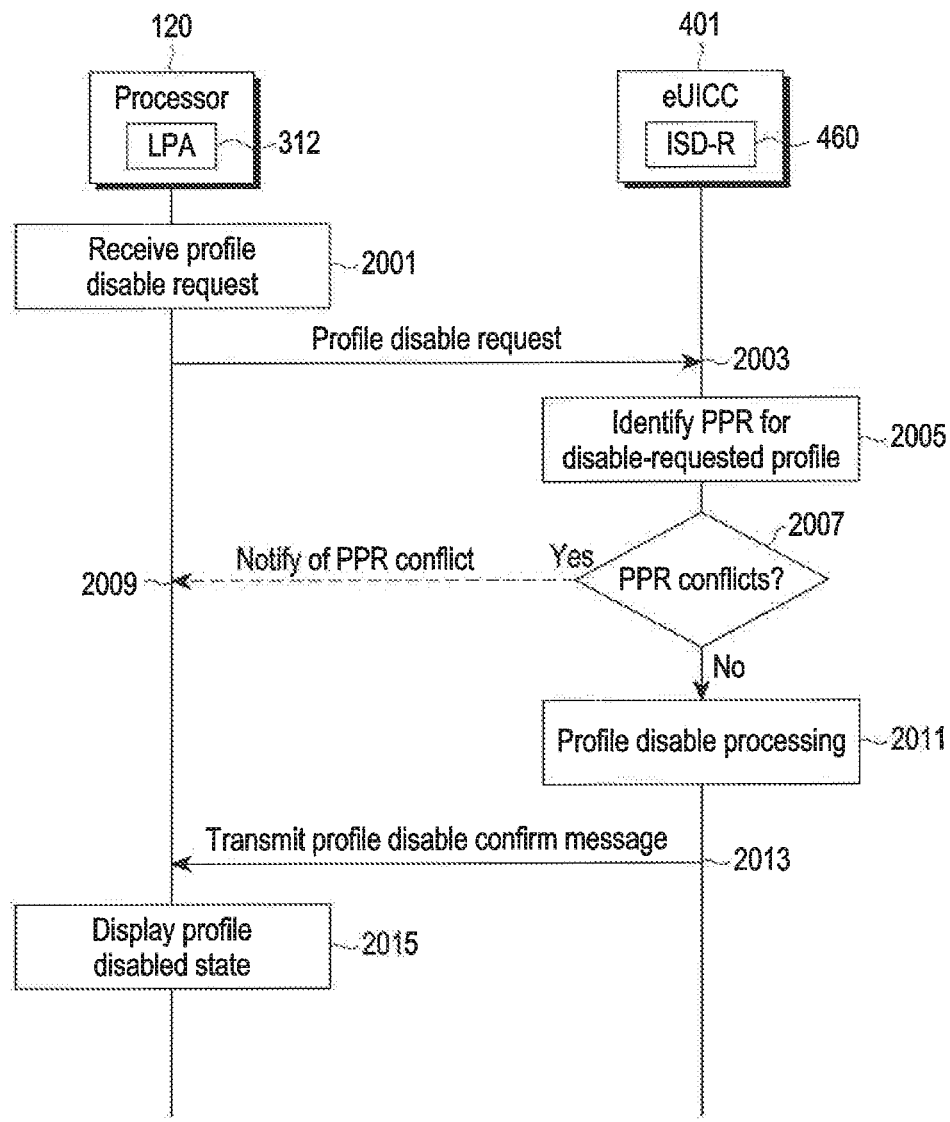
FIG. 20 is a flowchart illustrating a profile disabling method according to an embodiment of the disclosure.
Figure 21:
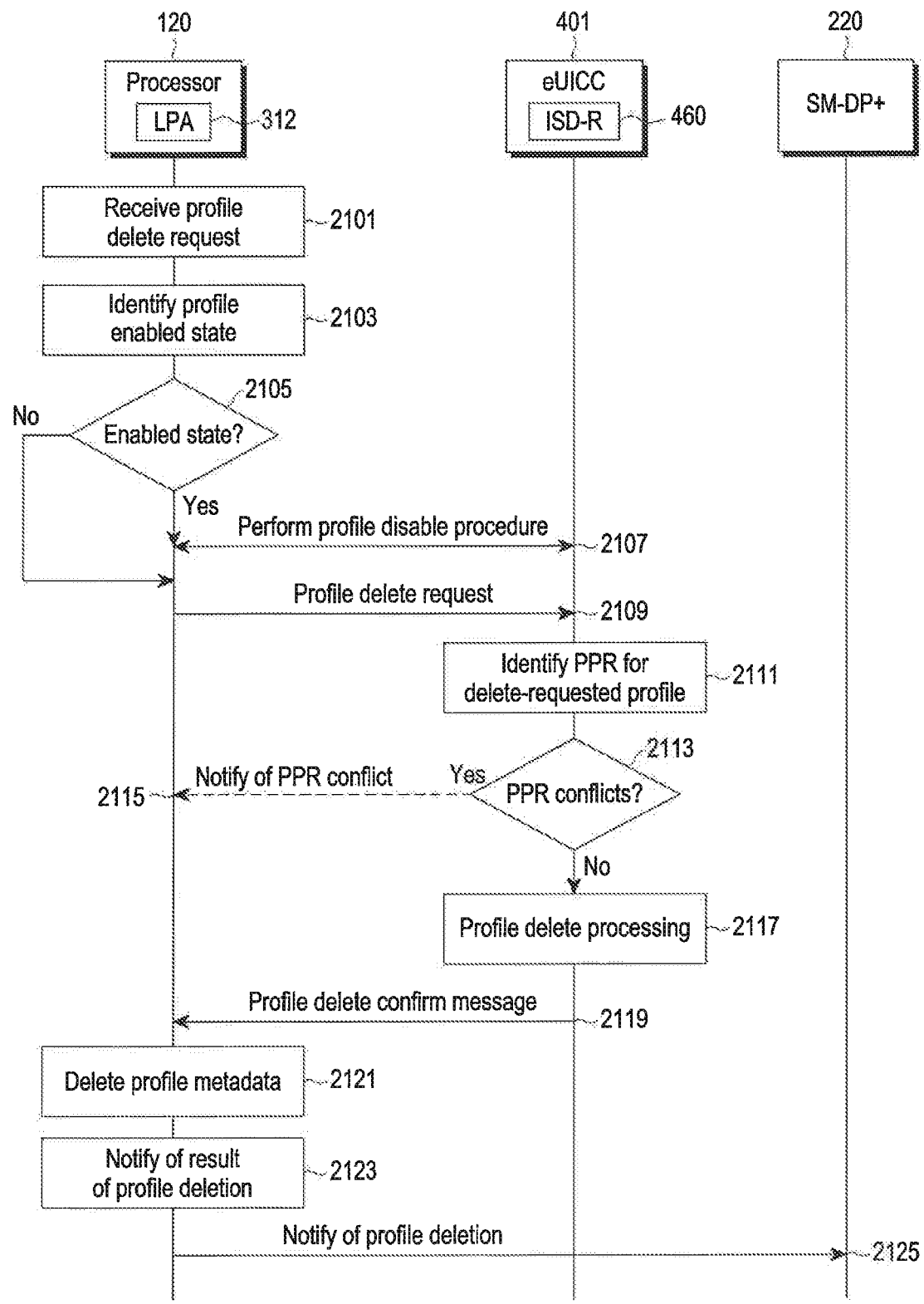
FIG. 21 is a flowchart illustrating a profile deleting method according to an embodiment of the disclosure.

Hereinafter, operations of the electronic device according to the profile policy rule are described with reference to FIGS. 19 to 24. According to various embodiments, FIGS. 19 to 21 illustrate the operation of the electronic device according to enablement, disablement, and deletion of a profile to which a profile policy rule (PPR) is applied.

Figure 19:
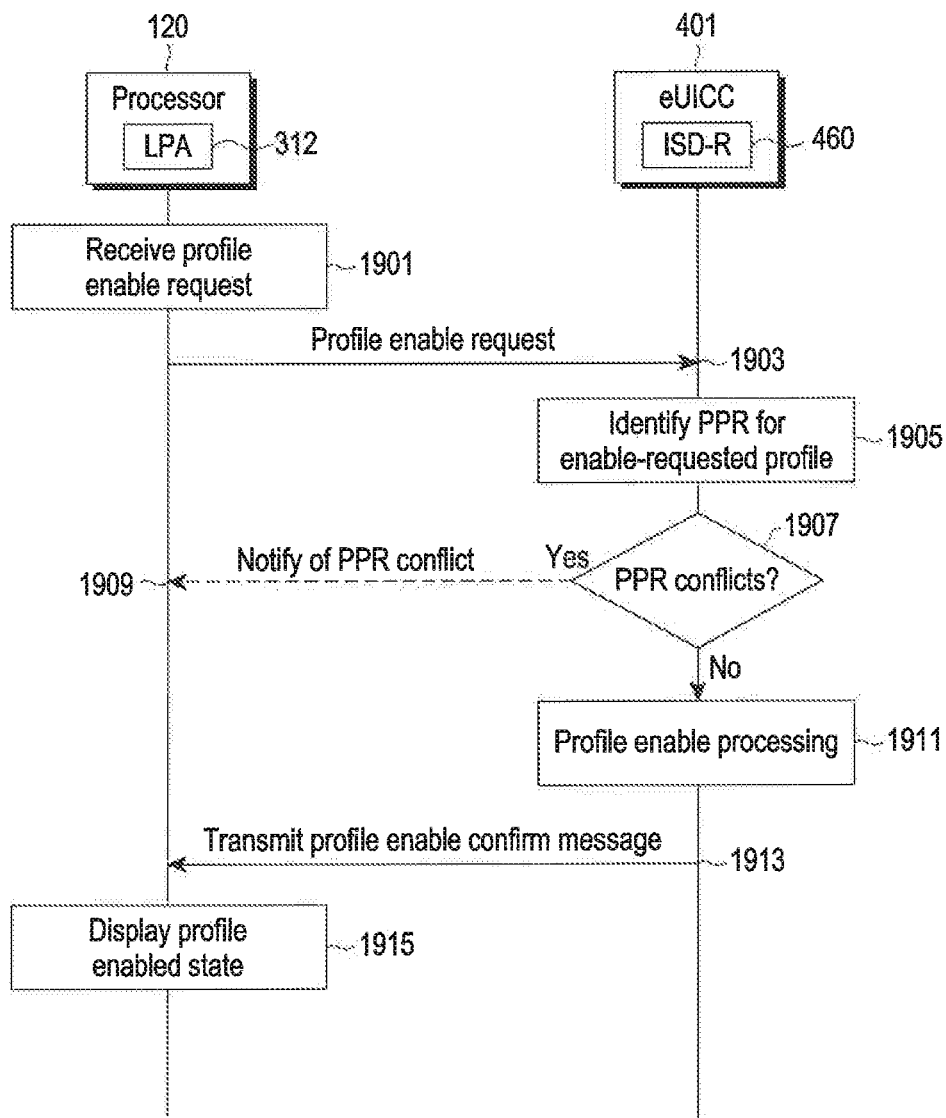
FIG. 19 is a flowchart illustrating a profile enabling method according to an embodiment of the disclosure.

FIG. 19 is a flowchart illustrating a profile enabling method according to an embodiment of the disclosure.

According to various embodiments, the processor 120 (e.g., the LPA 312) of the electronic device 101 may receive an enable request for the profile that is currently in the disabled state, in operation 1901. The enable request for the profile may be performed when the user selects a corresponding menu through the screens 820*a* and 820*b* including information associated with the SIM as shown in FIG. 8B or 8D. Detailed embodiments of an enable request method are described below.

According to various embodiments, the processor 120 of the electronic device 101 may, in operation 1903, transmit an enable request for a specific profile selected by the user to the eUICC 401 (e.g., ISD-R 460).

According to various embodiments, the eUICC 401 of the electronic device 101, in operation 1905, may identify whether the PPR is applied to the specific profile requested to be enabled or to another profile that has already been installed. As a result of the identification, in operation 1907, when it is determined that the enable request conflicts with the PPR applied to the enable-requested specific profile or the already installed profile (yes in 1907), the eUICC 401 may notify the processor 120 of the PPR confliction in operation 1909.

According to various embodiments, as a result of the identification, when it is determined that the enable request does not conflict with the PPR applied to the profile in operation 1907 (no in 1907), the eUICC 401 may process the profile which is in the disabled state into the enabled state in operation 1911.

According to various embodiments, the eUICC 401 of the electronic device 101 may transmit a profile enable confirmation message, as a result of enabled state processing on the profile, to the processor 120 in operation 1913.

According to various embodiments, the processor 120 of the electronic device 101 may receive the profile enable confirmation message from the eUICC 401 and may display on the screen that the corresponding profile is in the enabled state, in operation 1915.

FIG. 20 is a flowchart illustrating a profile disabling method according to an embodiment of the disclosure.

According to various embodiments, the processor 120 (e.g., the LPA 312) of the electronic device 101 may receive a disable request for the profile that is currently in the enabled state, in operation 2001. The disable request for the profile may be performed when the user selects a corresponding menu through the screens 820*a* and 820*b* including information associated with the SIM as shown in FIG. 8B or 8D. Detailed embodiments of a disable request method are described below.

According to various embodiments, the processor 120 of the electronic device 101 may, in operation 2003, transmit a disable request for a specific profile selected by the user to the eUICC 401 (e.g., ISD-R 460).

According to various embodiments, the eUICC 401 of the electronic device 101, in operation 2005, may identify whether the PPR is applied to the specific profile requested to be disabled. As a result of the identification, in operation 2007, when it is determined that the disable request conflicts with the PPR applied to the profile (yes in 2007), the eUICC 401 may notify the processor 120 of the PPR confliction in operation 2009. For example, when PPR1 is applied to the profile, the profile may not be allowed to switch from the enabled state to the disabled state as defined in the PPR1 as described above.

According to various embodiments, as a result of the identification, when it is determined that the disable request does not conflict with the PPR applied to the profile in operation 2007 (no in 2007) (e.g., when the PPR1 is not applied to the profile), the eUICC 401 may process the profile which is in the enabled state into the disabled state in operation 2011.

According to various embodiments, the eUICC 401 of the electronic device 101 may transmit a profile disable confirmation message, as a result of disabled state processing on the profile, to the processor 120 in operation 2013.

According to various embodiments, the processor 120 of the electronic device 101 may receive the profile disable confirmation message from the eUICC 401 and may display on the screen that the corresponding profile is in the disabled state, in operation 2015.

FIG. 21 is a flowchart illustrating a profile deleting method according to an embodiment of the disclosure.

According to various embodiments, the processor 120 (e.g., the LPA 312) of the electronic device 101 may receive a delete request for the profile that is currently in the enabled state, in operation 2101. The delete request for the profile may be performed when the user selects a corresponding menu through the screens 820*a* and 820*b* including information associated with the SIM as shown in FIG. 8B or 8D. Detailed embodiments of a profile delete request method are described below.

According to various embodiments, when the profile to be deleted is in the enabled state, the processor 120 of the electronic device 101 may delete the profile after processing the disabled state. For example, in operation 2103, the processor 120 may identify the enabled state for the deleted profile. As a result of the identification, in operation 2105, if it is determined that the delete-requested profile is in the enabled state (yes in 2105), the processor 120 may perform a procedure for disabling the delete-requested profile and the eUICC 401 in operation 2107. In one example, the disable processing procedure between the processor 120 and the eUICC 401 may be performed according to the above-described procedure of FIG. 20.

As a result of the identification, in operation 2105, when it is determined that the delete-requested profile is in the disabled state (no in 2105), the processor 120 of the electronic device 101 may transmit a request for deleting the specific profile selected by the user to the eUICC 401 (e.g., ISD-R 460) in operation 2109.

According to various embodiments, the eUICC 401 of the electronic device 101, in operation 2111, may identify whether the PPR is applied to the specific profile requested to be deleted. As a result of the identification, in operation 2113, when it is determined that the delete request conflicts with the PPR applied to the profile (yes in 2113), the eUICC 401 may notify the processor 120 of the PPR confliction in operation 2115. For example, when PPR2 is applied to the profile, the deletion of the profile may not be allowed as defined in the PPR2 as described above. According to various embodiments, when PPR1 is applied to the profile, the profile is not allowed to be disabled as defined in the PPR1 as described above so that the delete processing may not be performed.

According to various embodiments, as a result of the identification, when it is determined that the delete request does not conflict with the PPR applied to the profile in operation 2113 (no in 2113) (e.g., when the PPR2 is not applied to the profile), the eUICC 401 may delete the profile which is in the disabled state in operation 2117.

According to various embodiments, the eUICC 401 of the electronic device 101 may transmit a profile disable confirmation message, as a result of delete processing on the profile, to the processor 120 in operation 2119.

According to various embodiments, the processor 120 of the electronic device 101 may receive the profile delete confirmation message from the eUICC 401 and delete the metadata for the profile in operation 2121 and may display on the screen that the corresponding profile has been deleted in operation 2123.

According to various embodiments, the processor 120 of the electronic device 101 may notify the SM-DP+ server 220 of the result of deletion of the profile in operation 2125.

Figure 22:
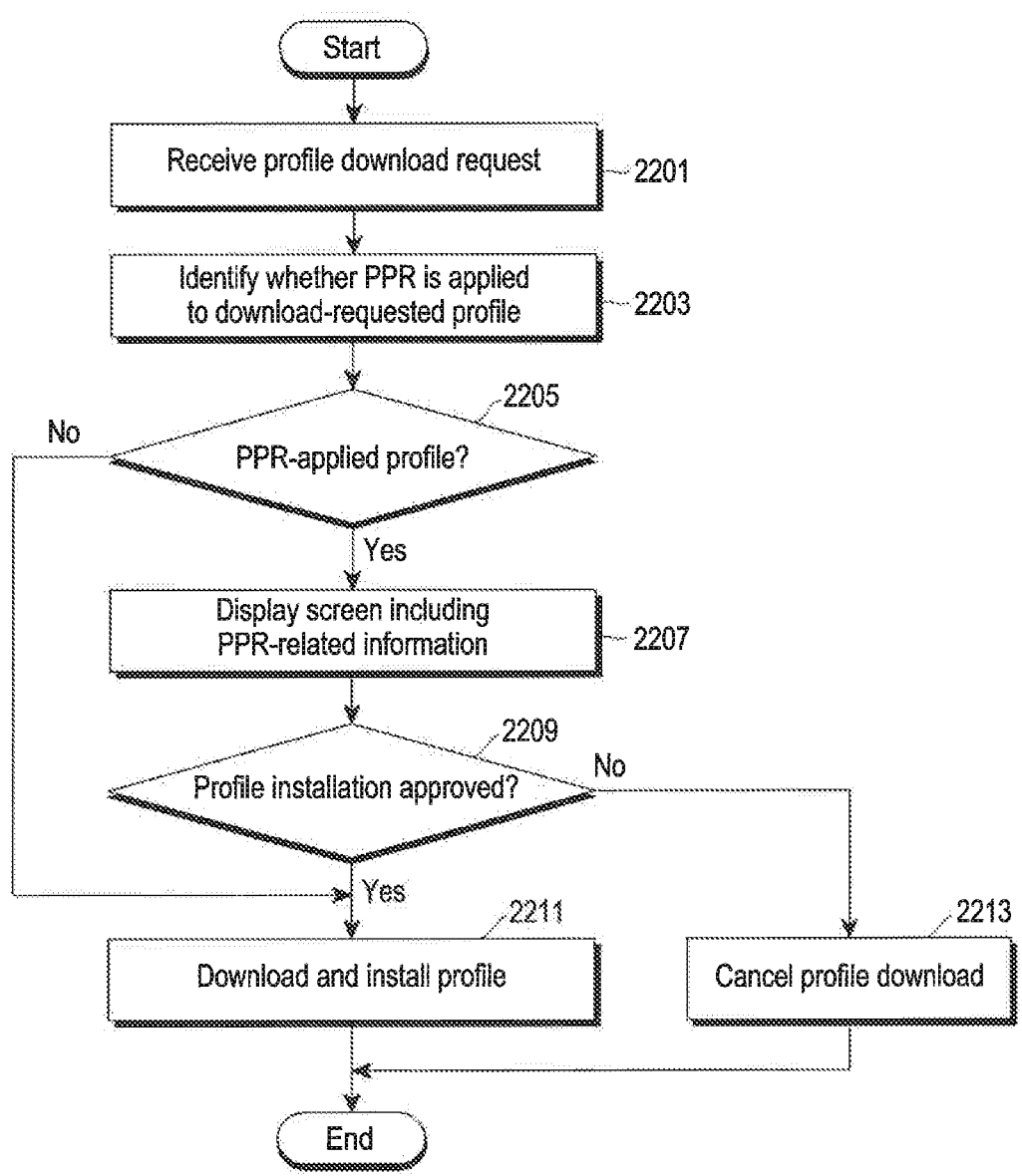
FIG. 22 is a flowchart illustrating a profile download method according to an embodiment of the disclosure.

FIG. 22 is a flowchart illustrating a profile download method according to an embodiment of the disclosure.

According to various embodiments, the operations of FIG. 22 are described with reference to the electronic device 101 of FIG. 1A or 3.

According to various embodiments, the processor 120 (e.g., the LPA 312) of the electronic device 101 may receive a profile download request, in operation 2201. The download request for the profile may be performed by requesting to download through a menu for downloading a specific profile or a link included in the webpage or by purchasing an activation code-included quick response (QR) code-based voucher and scanning the QR code by the electronic device 101, but embodiments of the disclosure are not limited to the methods.

According to various embodiments, the processor 120 of the electronic device 101, in operation 2203, may identify whether the PPR is applied to the profile requested to be downloaded. As a result of the identification, in operation 2205, when it is determined that the download-requested profile is a PPR-applied profile (yes in 2205) (e.g., when the PPR1 and/or PPR2 is determined to be applied to the profile), the processor 120 may display a PPR-related information-containing screen in operation 2207. According to various embodiments, the processor 120 may include and display a menu for approving installation of the profile in the PPR-related information-containing screen.

According to various embodiments, in operation 2209, upon receiving an approval of installing the profile through the menu for approving installation of the profile (yes in 2209), the processor 120 of the electronic device 101 may download and install the profile in the eUICC 401 in operation 2211.

According to various embodiments, in operation 2209, if a cancel profile installation is input through the menu for approving the profile installation (no in 2209), the processor 120 of the electronic device 101 may cancel the profile download procedure in operation 2213.

According to various embodiments, as a result of identifying whether PPR is applied to the download-requested profile in operation 2203, if the download-requested profile is determined to be a profile to which PPR is not applied in operation 2205 (no in 2205) (e.g., when the PPR1 and/or PPR2 is determined not to be applied to the profile), the processor 120 may download and install the profile in the eUICC 401 in operation 2211.

Figure 23:
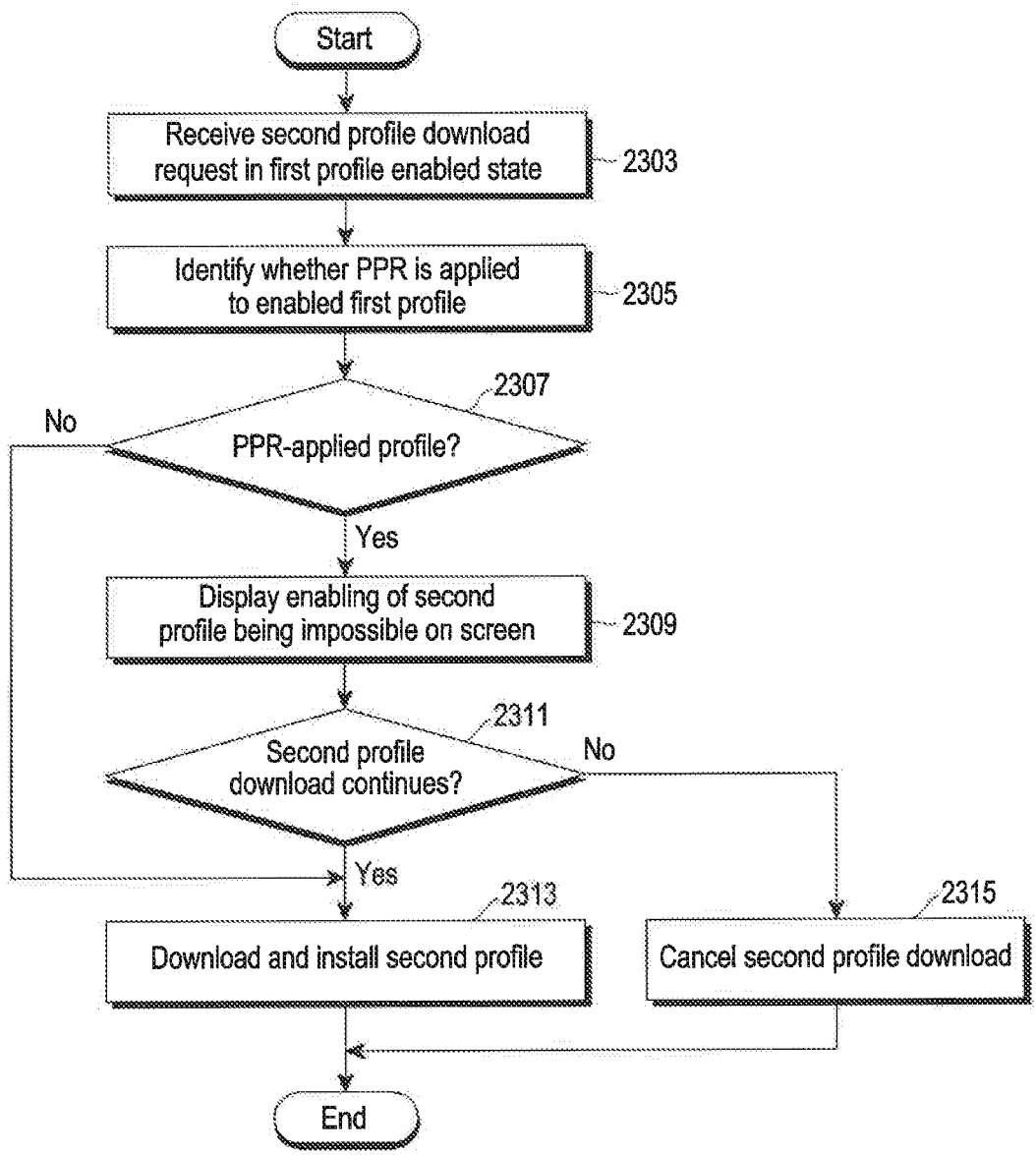
FIG. 23 is a flowchart illustrating a profile download method according to an embodiment of the disclosure.

FIG. 23 is a flowchart illustrating a profile download method according to an embodiment of the disclosure.

According to various embodiments, the operations of FIG. 23 are described with reference to the electronic device 101 of FIG. 1A or 3.

According to various embodiments, in the state that the first profile already installed in the eUICC 401 is in the enabled state, the processor 120 (e.g., the LPA 312) of the electronic device 101 may receive a second profile download request in operation 2303. The download request for the second profile may be performed by requesting to download through a menu for downloading the second profile or a link included in the webpage or by purchasing an activation code-included quick response (QR) code-based voucher and scanning the QR code by the electronic device 101, but embodiments of the disclosure are not limited to the methods.

According to various embodiments, in operation 2305, the processor 120 of the electronic device 101 may identify whether PPR is applied to the first profile which has been already installed on the electronic device 101 and is in the enabled state. As a result, if the first profile in the enabled state is determined to be a PPR-applied profile in operation 2307 (e.g., when the PPR1 and/or PPR2 is determined to be applied to the profile), the processor 120 may display a screen including information indicating that the second profile is not allowed to be enabled although downloaded in operation 2309. According to various embodiments, the processor 120 may include and display a menu for continuing to download the second profile in the screen including the information. Further, the processor may notify that a memory reset needs to be performed to download a new profile on the information-containing screen and may further include a menu for a shortcut to the memory reset function in the screen.

According to various embodiments, when requested to continue to download the second profile through the menu in operation 2311, the processor 120 of the electronic device 101 may download the second profile and install it in the eUICC 401 in operation 2313.

According to various embodiments, in operation 2311, upon receiving an input for canceling the download or installation of the second profile through the menu in operation 2311, the processor 120 of the electronic device 101 may cancel the second profile download procedure in operation 2315.

According to various embodiments, as a result of identifying whether PPR is applied to the first profile in the enabled state in operation 2305, if the first profile is determined to be a profile to which PPR is not applied in operation 2307 (e.g., when the PPR1 and/or PPR2 is determined not to be applied to the profile), the processor 120 may download and install the profile of the second eSIM in the eUICC 401 in operation 2313.

Figure 24:
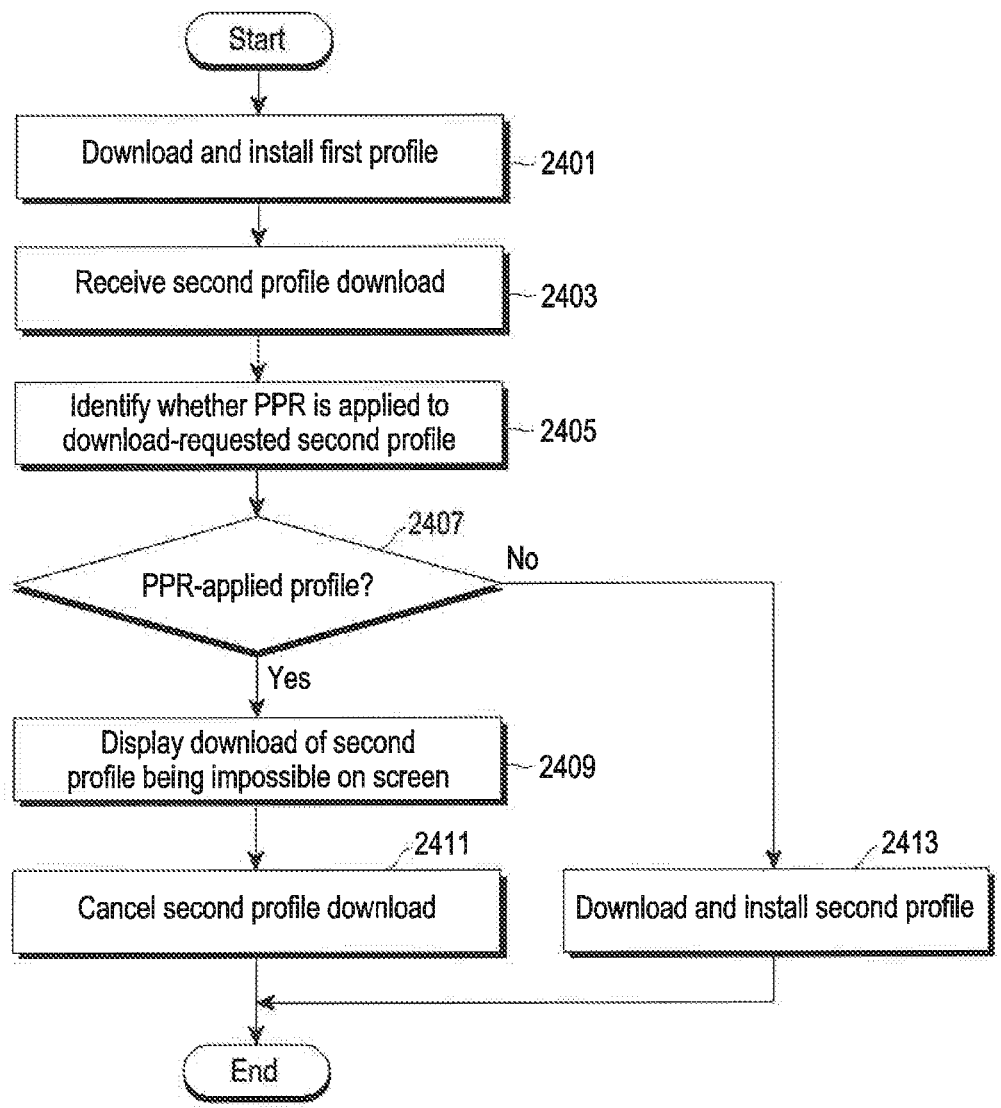
FIG. 24 is a flowchart illustrating a profile download method according to an embodiment of the disclosure.

FIG. 24 is a flowchart illustrating a profile download method according to an embodiment of the disclosure.

According to various embodiments, the operations of FIG. 24 are described with reference to the electronic device 101 of FIG. 1A or 3.

According to various embodiments, the processor 120 (e.g., the LPA 312) of the electronic device 101 may download the first profile and install it in the eUICC 401 of the electronic device 101 in operation 2401. The processor 120 may receive a second profile download request in operation 2403 while the first profile is installed in the electronic device 101. The download request for the second profile may be performed by requesting to download through a menu for downloading the second profile or a link included in the webpage or by purchasing an activation code-included quick response (QR) code-based voucher and scanning the QR code by the electronic device 101, but embodiments of the disclosure are not limited to the methods.

According to various embodiments, the processor 120 of the electronic device 101, in operation 2405, may identify whether the PPR is applied to the second profile requested to be downloaded. As a result of the identification, in operation 2407, when it is determined that the PPR is applied to the download-requested second profile (yes in 2407) (e.g., when it is determined that PPR1 and/or PPR2 is applied to the corresponding profile), the processor 120 may display a screen including information indicating that the download of the second profile is impossible in operation 2409. According to various embodiments, the processor 120 may cancel the download of the second profile in operation 2411.

According to various embodiments, as a result of identifying whether PPR is applied to the download-requested second profile in operation 2405, if the download-request second profile is determined to be a profile to which PPR is not applied in operation 2407 (no in 2407) (e.g., when the PPR1 and/or PPR2 is determined not to be applied to the profile), the processor 120 may download and install the second profile in the eUICC 401 in operation 2413.

Figure 25:
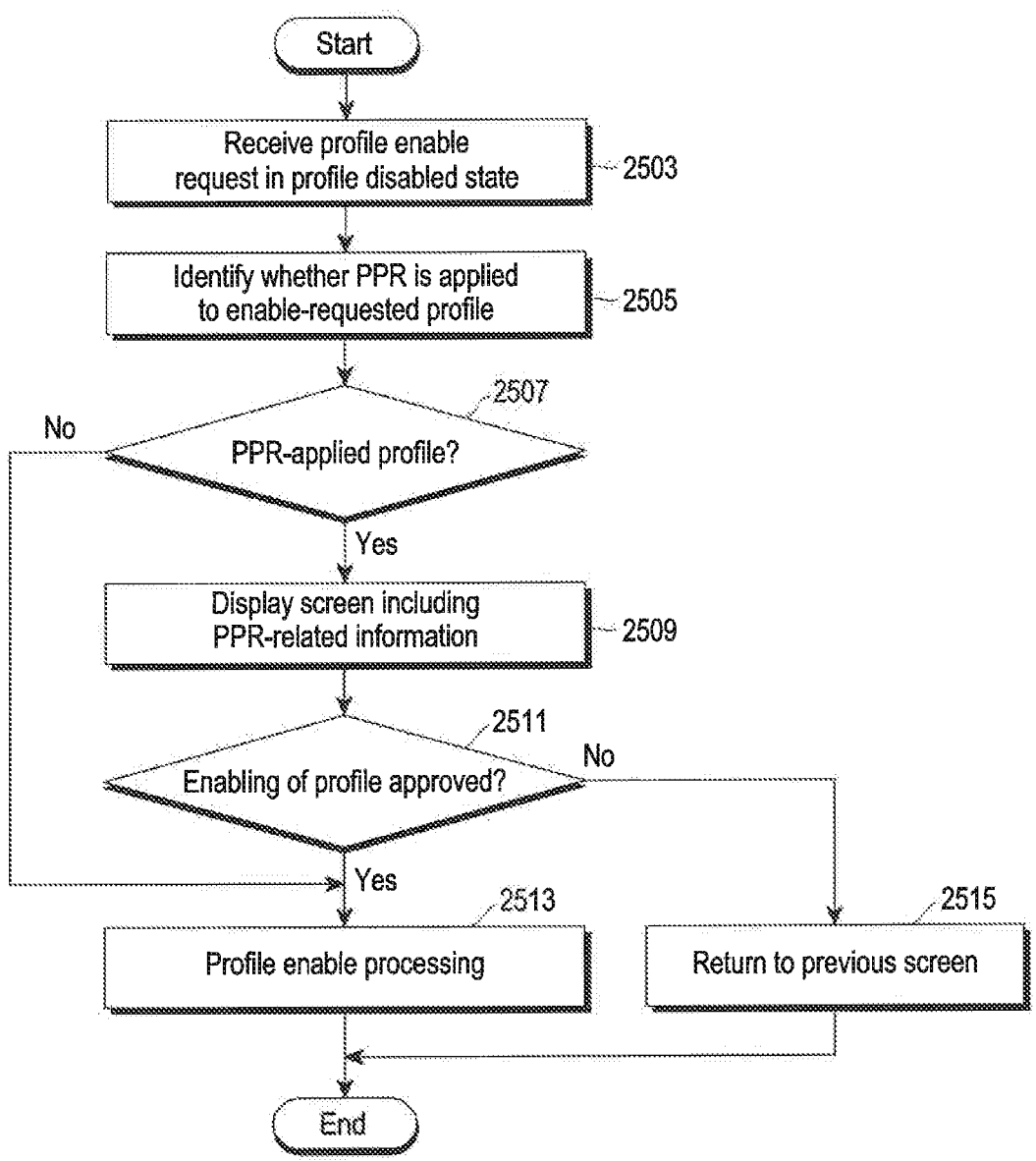
FIG. 25 is a flowchart illustrating a profile enabling method according to an embodiment of the disclosure.

FIG. 25 is a flowchart illustrating a profile enabling method according to an embodiment of the disclosure. FIG. 25 is described with reference to the electronic device 101 of FIG. 1A or 3 and FIGS. 26A, 26B, and 26C.

Figure 26A:
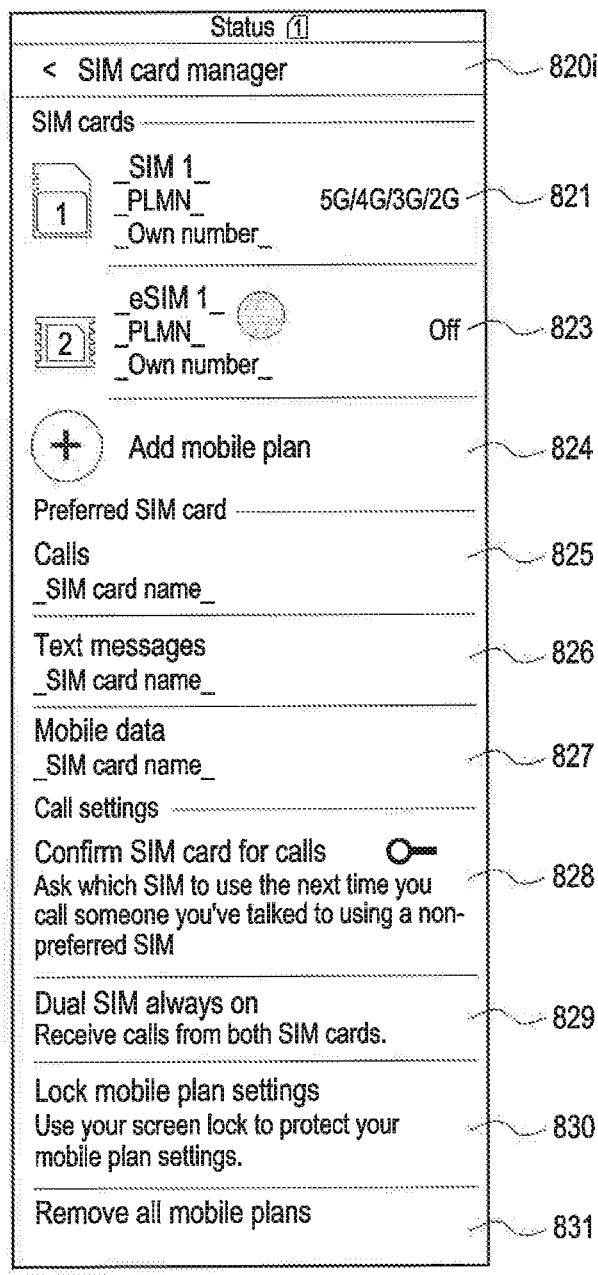
FIGS. 26A, 26B, and 26C illustrate screens displayed on an electronic device, according to various embodiments of the disclosure.
Figure 26B:
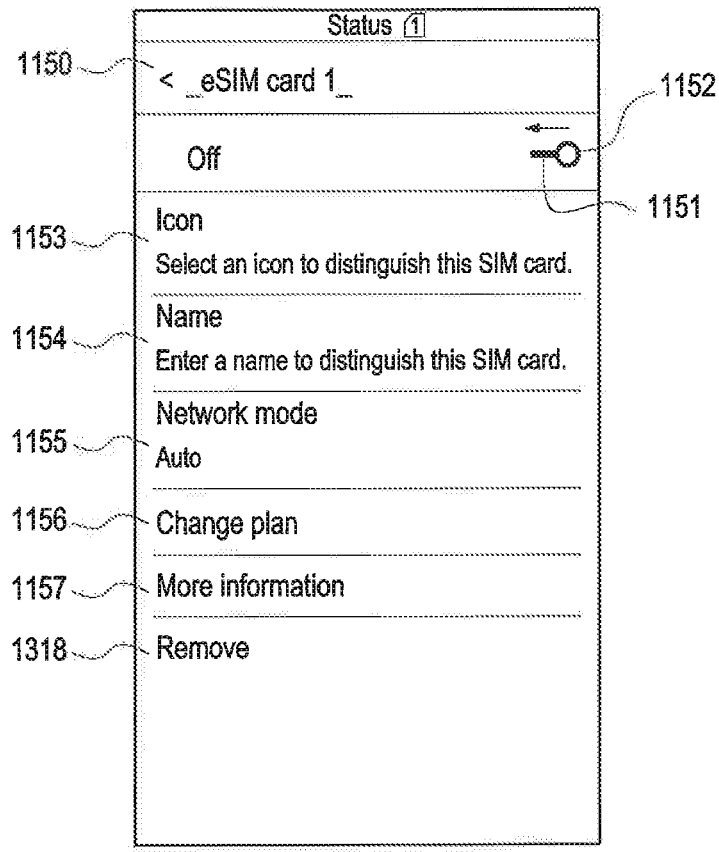
Figure 26C:
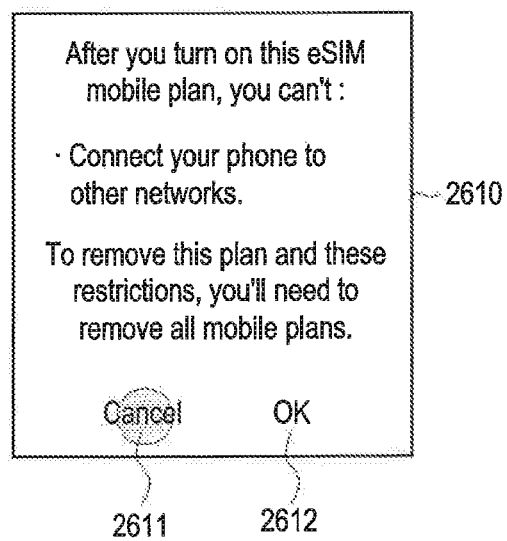

FIGS. 26A, 26B, and 26C illustrate screens displayed on an electronic device, according to various embodiments of the disclosure.

According to various embodiments, in the state that the profile installed in the eUICC of the electronic device 101 is in the disabled state, the processor 120 (e.g., the LPA 312) of the electronic device 101 may receive an enable request for the profile in the disabled state in operation 2503. The enable request for the profile may be performed by the user selecting a corresponding function through a screen as shown in FIGS. 26A and 26B.

According to various embodiments, the screen 820i including information associated with the SIM shown in FIG. 26A may include a tab 821 corresponding to the first SIM 531 and a tab 823 corresponding to the first profile (eSIM 1). According to various embodiments, when the first SIM 531 is not included in the electronic device 101, the tab 821 corresponding to the first SIM 531 may not be displayed on the screen 820i. The electronic device 101 may display information (e.g., own number (e.g., MSISDN), PLMN information, or supportable network types) associated with the first SIM 531 on the tab 821 corresponding to the first SIM 531. The electronic device 101 may display the supportable network communication type to be visually distinguished from the disabled SIM based on the first SIM 531 being in the enabled state. According to various embodiments, the electronic device 101 may simply display only the characters "off" based on the first profile being in the disabled state. The electronic device 101 may display information (e.g., own number (e.g., MSISDN), PLMN information, or supportable network types) associated with the first profile on the tab 823 corresponding to the first profile. The electronic device 101 may display the supported network types (e.g., 5G/4G/3G/2G) for the enabled SIMs (e.g., the first SIM 531) and display an indicator (e.g., the text "off") indicating that the disabled SIM (e.g., the eSIM 550) is in the disabled state for the disabled SIM, thereby allowing the user to identify the currently enabled/disabled SIMs.

According to various embodiments, the screen 820i including the information associated with the SIM may further include a tab 824 for adding a mobile plane, a calls-related tab 825, a text messages-related tab 826, a mobile data-related tab 827, a confirm SIM card for calls tab 828, a dual SIM always on tab 829, a lock mobile plan settings tab 830, and a delete all mobile plans tab 831, but is not limited. A mobile plan may include a profile.

According to various embodiments, the electronic device 101 may detect a selection of the tab 823 corresponding to the first profile eSIM 1 while the screen as shown in FIG. 26A is displayed. If the tab 823 corresponding to the first profile is selected, the electronic device 101 may display the screen 1150 including the information corresponding to the first profile as shown in FIG. 26B. The screen 1150 including the information corresponding to the first profile may include a bar 1151 for toggling may include a bar 1151 for toggling the object 1152. If the object 1152 is placed in a first position on the bar 1151, the first profile may be enabled, and text (e.g., On) indicating that it is in the enabled state may be displayed. If the object 1152 is placed in a second position on the bar 1151, the first profile may be disabled, and text (e.g., Off) indicating that it is in the disabled state may be displayed. The electronic device 101 may change the position of the object 1122 based on a drag input corresponding to the object 1122 and control whether to enable first profile based on the position of the object 1152. As shown in FIG. 26B, upon identifying an input to move the object 1152 from the second position of the bar 1151 to the first position, the electronic device 101 may identify that a profile enable request for the first profile in the disabled state is received. The screen 1150 shown in FIG. 26B may include at least one of an icon control tab 1153 corresponding to the first profile, a name-related tab 1154, a network mode-related tab 1155, a mobile plan change tab 1156, an additional information-related tab 1157, or a mobile plan (e.g., profile) delete tab 1318. If the mobile plan delete tab 1318 is selected, the electronic device 101 may identify that a delete command for the first profile is obtained.

According to various embodiments, in operation 2503, if the processor 120 receives the profile enable request, the eUICC 401 of the electronic device 101 may identify whether PPR is applied to the enable-requested profile in operation 2505. As a result of the identification, in operation 2507, when it is determined that the enable-requested profile is a PPR-applied profile (yes in 2507) (e.g., when the PPR1 and/or PPR2 is determined to be applied to the profile), the processor 120 may display a screen (e.g., popup window) including information indicating that PPR is applied to the profile in operation 2509. According to various embodiments, the screen may be displayed as shown in FIG. 26C. For example, referring to FIG. 26C, upon enabling the PPR-applied first eSIM through the screen 2610, the electronic device 101 may not download and enable other profiles and notify that all of the profiles installed on the electronic device 101 need to be removed to remove the already installed first profile or the application of the PPR applied to the first eSIM.

According to various embodiments, upon receiving the profile enable approval in operation 2511 (yes in 2511), the processor 120 may perform profile enable processing in operation 2513. As shown in FIG. 26C, the menu for the profile enable approval may be included and provided in the screen including information indicating that PPR is applied to the profile. When the icon 2612 for approval of the icon 2611 for cancelation or rejection and the icon 2612 for approval included in the screen 2610 of FIG. 26C is selected, the processor 120 may perform a profile enable procedure. If the profile enable procedure is completed, the processor 120 may display supportable network types (e.g., 5G/4G/3G/2G) on the tab 823 corresponding to the enabled eSIM (e.g., the first eSIM 550) in the screen 820i of FIG. 26A.

According to various embodiments, in operation 2511, upon receiving the profile enable rejection (no in 2511) (e.g., when the icon 2611 for cancellation or rejection of the icon 2611 for cancellation or rejection or the icon 2612 for approval included in the screen 2610 of FIG. 26C is selected), the processor 120 may not perform the profile enable processing but return to the previous screen in operation 2515.

According to various embodiments, as a result of identifying whether PPR is applied to the enable-requested eSIM profile in operation 2505, if the profile is determined to be a profile to which PPR is not applied in operation 2507 (no in 2507) (e.g., when the PPR1 and/or PPR2 is determined not to be applied to the profile), the processor 120 of the electronic device 101 may enable the profile in operation 2513.

Figure 27:
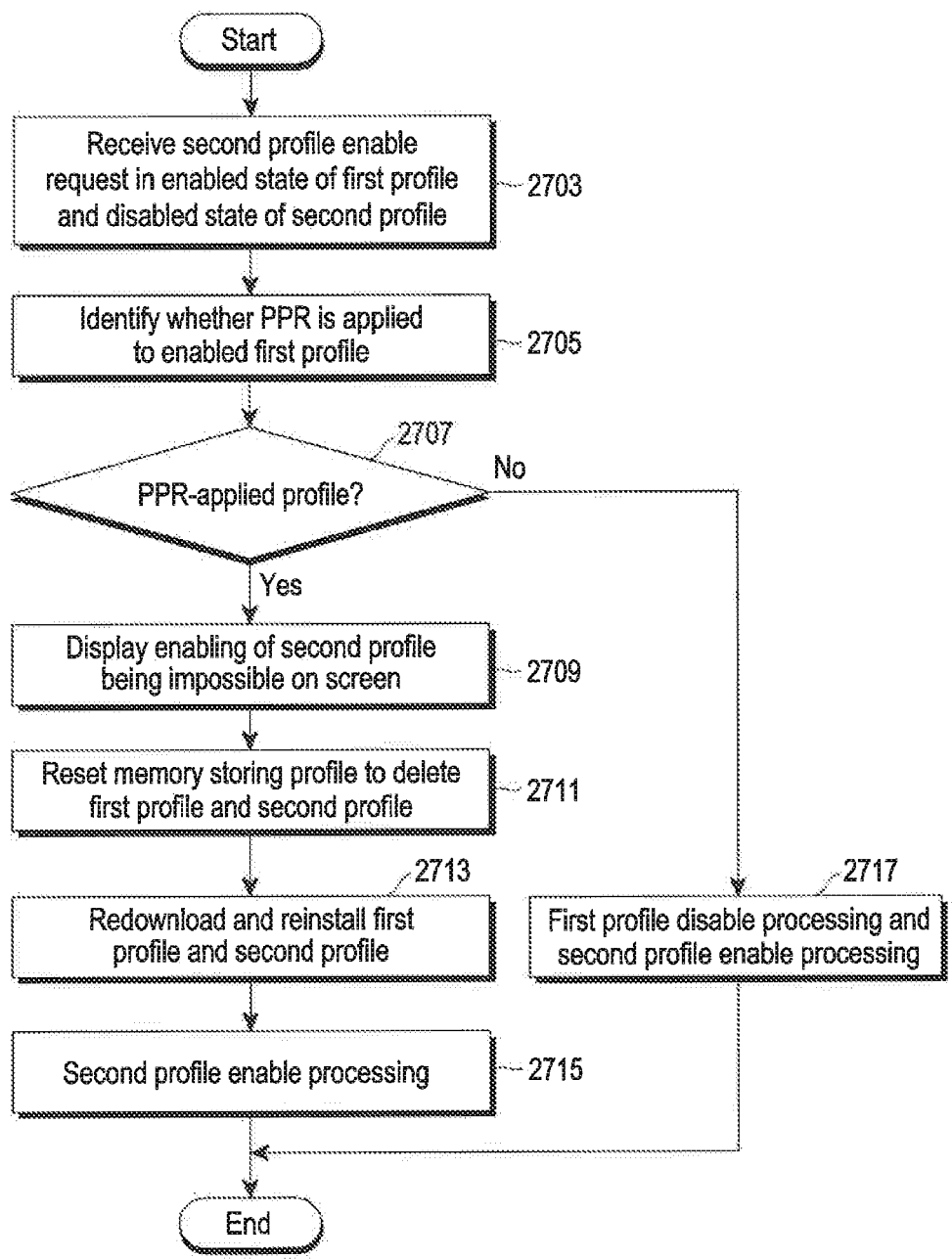
FIG. 27 is a flowchart illustrating a profile enabling method of an eSIM according to an embodiment of the disclosure.

FIG. 27 is a flowchart illustrating a profile enabling method of an eSIM profile according to an embodiment of the disclosure. FIG. 27 is described with reference to the electronic device 101 of FIG. 1 or 3, the eUICC 401 of FIG. 4, and FIGS. 28A, 28B, 28C and 28D.

FIGS. 28A, 28B, 28C, and 28D illustrate screens displayed on an electronic device, according to various embodiments of the disclosure.

According to various embodiments, in the enabled state of the first profile installed on the eUICC 401 of the electronic device 101 and in the disabled state of the second profile, the processor 120 may receive a second profile enable request in operation 2703. The enable request for the second profile may be performed by the user selecting a corresponding function through a screen as shown in FIG. 28A.

Figure 28A:
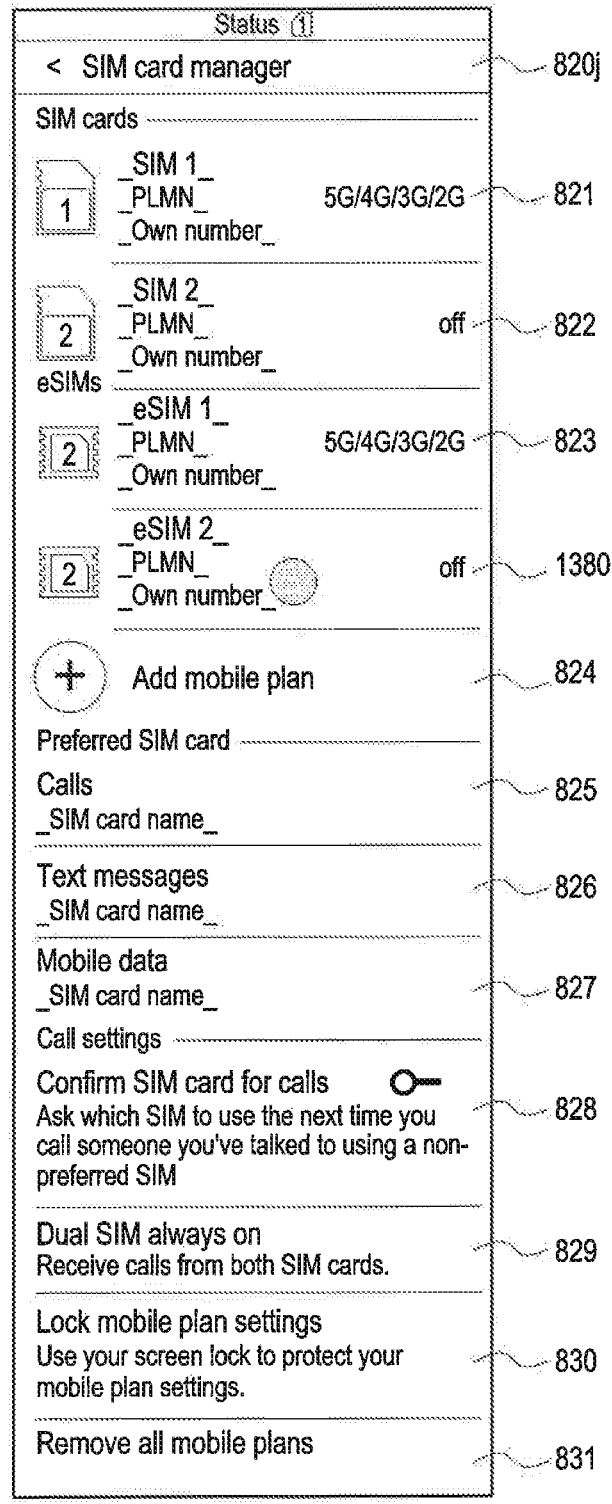
FIGS. 28A, 28B, 28C, and 28D illustrate screens displayed on an electronic device, according to various embodiments of the disclosure.

According to various embodiments, the screen 820j including information associated with the SIM as shown in FIG. 28A may include a tab 821 corresponding to the first SIM 531, a tab 822 corresponding to the second SIM 541, a tab 823 corresponding to the first profile (eSIM1), and a tab 1380 corresponding to the second profile (eSIM 2). According to various embodiments, when the first SIM 531 and/or the second SIM 541 is not included in the electronic device 101, the tab 821 corresponding to the first SIM 531 and/or the tab 822 corresponding to the second SIM 541 may not be displayed on the screen 820j. The electronic device 101 may display the supportable network communication type to be visually distinguished from the disabled second profile based on the first profile being in the enabled state. According to various embodiments, the electronic device 101 may simply display only the characters "off" based on the second profile being in the disabled state. The electronic device 101 may display information (e.g., own number (e.g., MSISDN), PLMN information, or supportable network types) associated with the first profile and the second profile on the tabs 823 and 1380 corresponding to the first profile and the second profile. The electronic device 101 may display the supportable network types (e.g., 5G/4G/3G/2G) for the enabled profile (e.g., the first profile) and display an indicator (e.g., the text "off") indicating that the disabled profile (e.g., the second profile) is in the disabled state for the disabled profile, thereby allowing the user to identify the currently enabled/disabled profiles.

According to various embodiments, the electronic device 101 may detect a selection of the tab 1380 corresponding to the second profile while the screen as shown in FIG. 28A is displayed. If the tab 1380 corresponding to the second profile is selected, the electronic device 101 may display a screen including the information corresponding to the second profile in the form shown in FIG. 28B. For example, the screen 2800 including the information corresponding to the second profile may include a bar 1151 for toggling may include a bar 1151 for toggling the object 1152. If the object 1152 is placed in a first position on the bar 1151, the second profile may be enabled, and text (e.g., On) indicating that it is in the enabled state may be displayed. If the object 1152 is placed in a second position on the bar 1151, the second profile may be disabled, and text (e.g., Off) indicating that it is in the disabled state may be displayed. The electronic device 101 may change the position of the object 1122 based on a drag input corresponding to the object 1122 and control whether to enable second profile based on the position of the object 1152. Upon identifying an input to move the object 1152 from the second position of the bar 1151 to the first position, the electronic device 101 may identify that an enable request for the second profile in the disabled state is received.

According to various embodiments, in operation 2703, if the processor 120 receives the second profile enable request, the eUICC 401 of the electronic device 101 may identify whether PPR is applied to the first profile, which is already in the enabled state, in operation 2705. As a result of the identification, in operation 2707, when it is determined that the first profile in the enabled state is a PPR-applied profile (yes in 2707) (e.g., when the PPR1 and/or PPR2 is determined to be applied to the profile), the processor 120 may display a screen (e.g., popup window) including information indicating that it is impossible to enable the second profile requested to be enabled in operation 2709. According to various embodiments, the screen may be displayed as shown in FIG. 28C. For example, referring to FIG. 28C, the electronic device 101 may notify, through the screen 2810, that the second profile needs to be reinstalled after deleting all of the profiles currently installed on the electronic device 101 or removing the first profile currently in the enabled state to enable the second profile. If the icon 2811 indicating the confirm on the screen 2810 of FIG. 28C is selected, it may return to the screen 2800 of FIG. 28B.

Figure 28B:
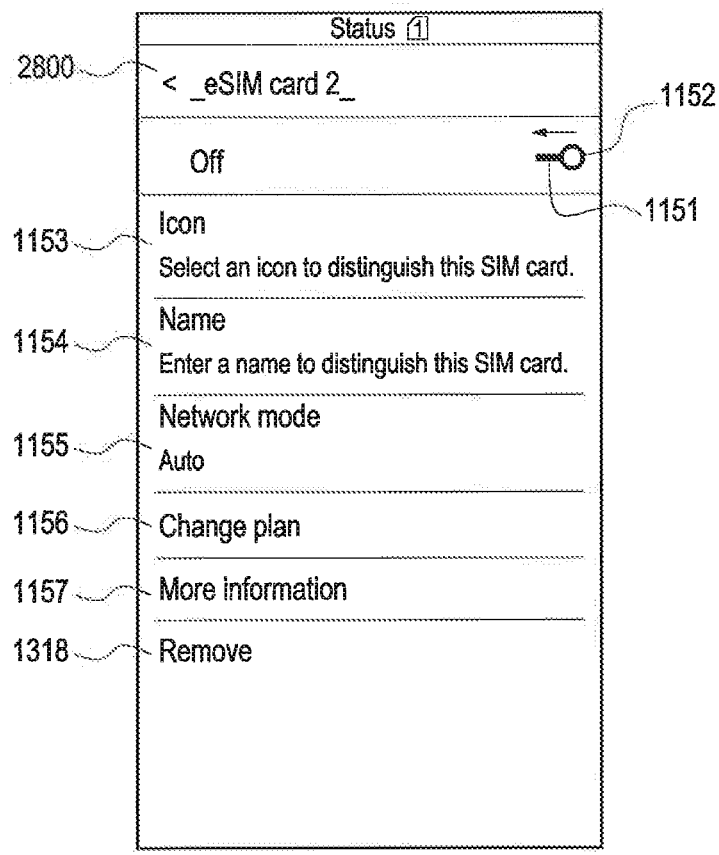
Figure 28C:
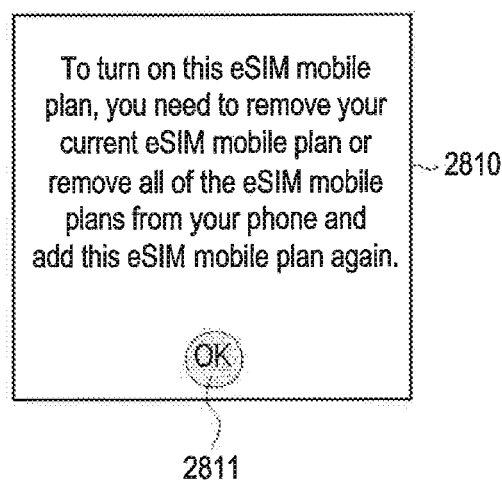

According to various embodiments, if the mobile plan delete tab 1318 is selected on the screen 2800 of FIG. 28B, the processor 120 may reset the memory of storing the profiles to delete the first profile and the second profile in operation 2711.

According to various embodiments, in operation 2713, the processor 120 may redownload and install the first profile and the second profile in operation 2713. The reinstalled first profile and second profile are in the disabled state, and thus, the second profile may be enabled.

According to various embodiments, the electronic device 101 may perform the second profile enable processing in operation 2715. According to another embodiment, of the first profile and second profile deleted, only the second profile may be reinstalled and enabled.

Figure 28D:
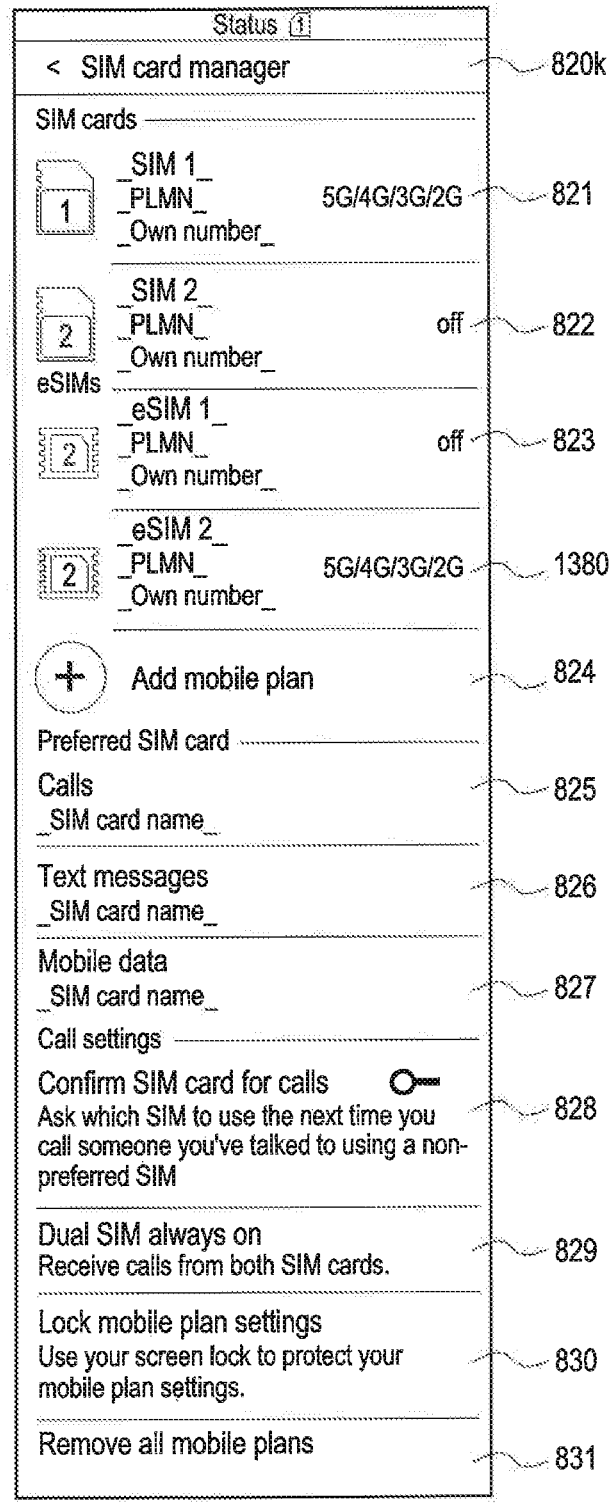

If the enable procedure for the second profile is completed after reinstalling the first profile and the second profile, the processor 120 may change the screen 820*j* of FIG. 28A to the screen of FIG. 28D (820*k*) and display it. For example, referring to FIG. 28D, off may be displayed on the tab 823 corresponding to the first profile (eSIM 1) to indicate the disabled state, and the supportable network types (e.g., 5G/4G/3G/2G) may be displayed on the tab 1380 corresponding to the second profile (eSIM 2) to indicate the enabled state.

According to various embodiments, as a result of identifying whether PPR is applied to the enabled first profile in operation 2705, if the first profile is determined to be a profile to which PPR is not applied in operation 2707 (no in 2707) (e.g., when the PPR1 and/or PPR2 is determined not to be applied to the profile), the processor 120 may disable the first profile and then enable the disabled second profile in operation 2717.

Figure 29:
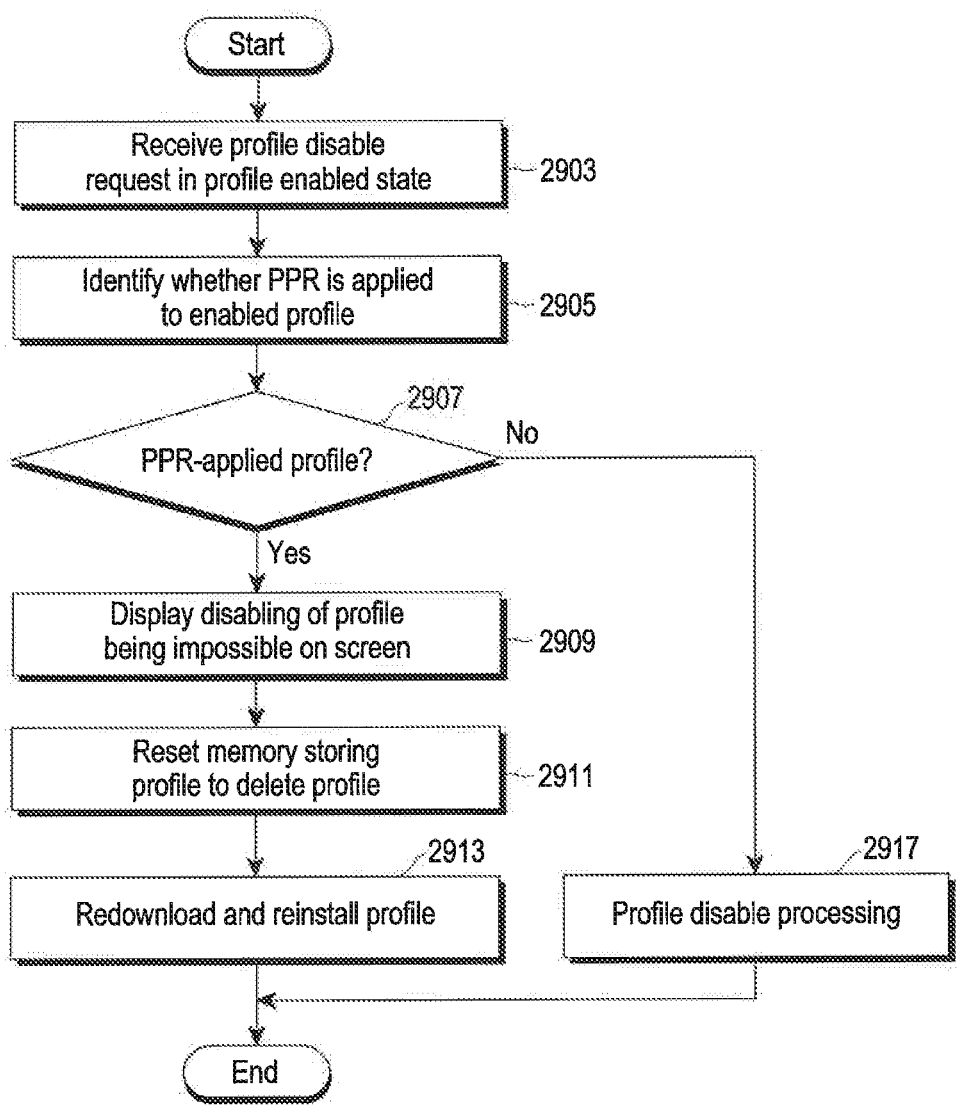
FIG. 29 is a flowchart illustrating a profile disabling method according to an embodiment of the disclosure.

FIG. 29 is a flowchart illustrating a profile disabling method according to an embodiment of the disclosure. FIG. 29 is described with reference to the electronic device 101 of FIG. 1 or 3, the eUICC 401 of FIG. 4, and FIGS. 30A, 30B, and 30C.

Figure 30A:
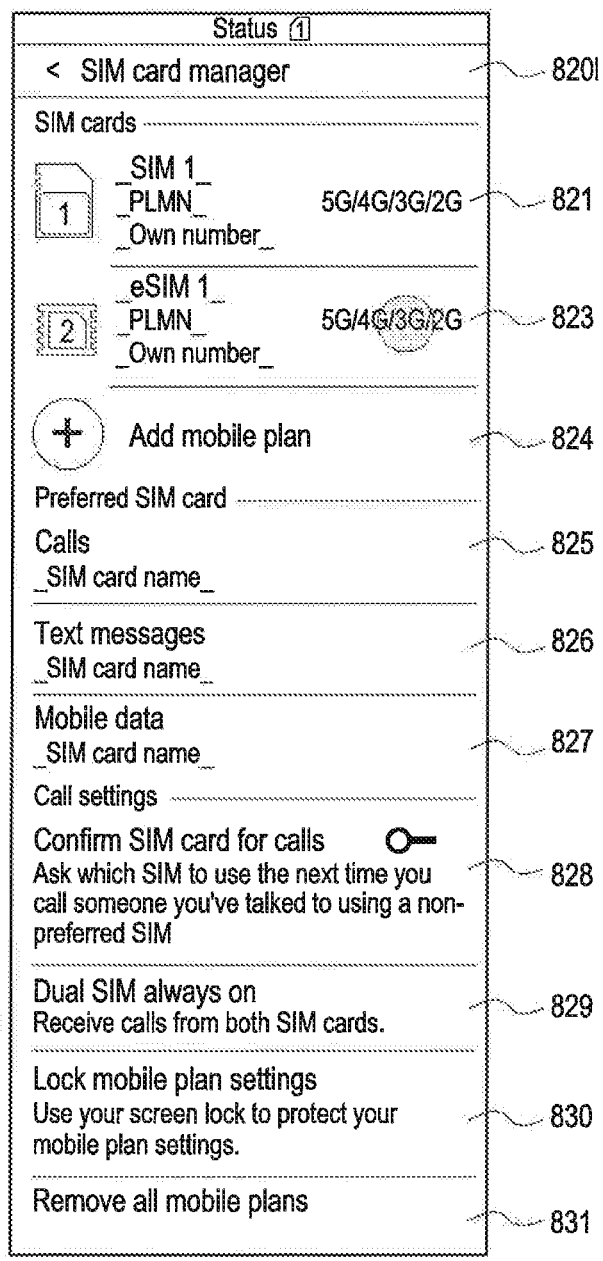
FIGS. 30A, 30B, and 30C illustrate screens displayed on an electronic device, according to various embodiments of the disclosure.
Figure 30B:
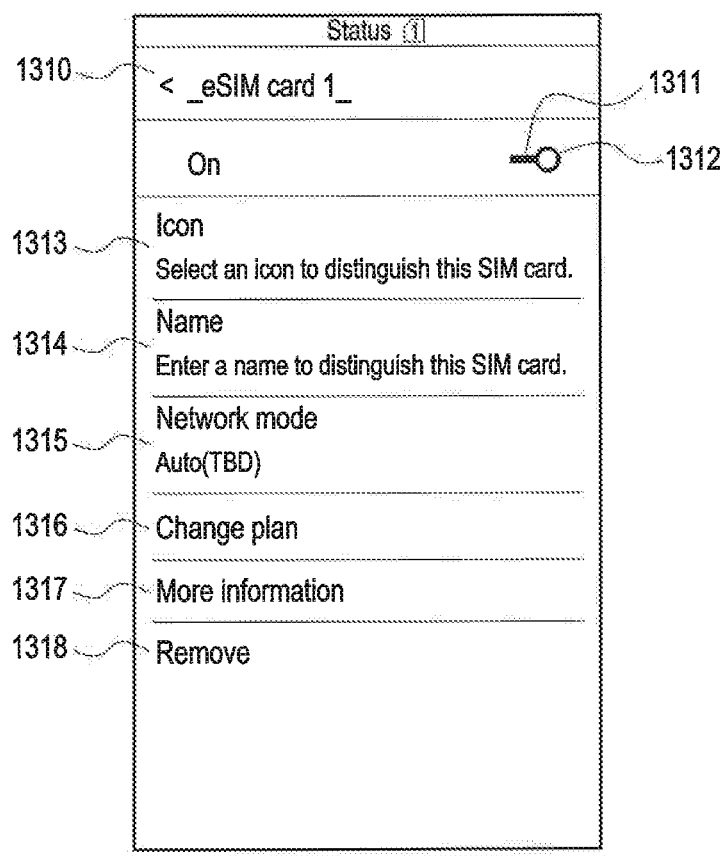
Figure 30C:
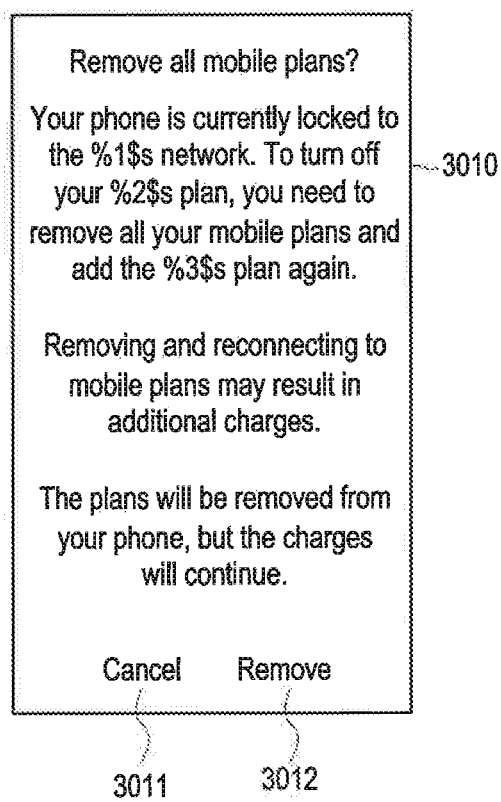

FIGS. 30A, 30B, and 30C illustrate screens displayed on an electronic device, according to various embodiments of the disclosure.

According to various embodiments, in the enabled state of the profile installed on the eUICC 401 of the electronic device 101, the processor 120 may receive a profile enable request in operation 2903. The enable request for the profile may be performed by the user selecting a corresponding function through a screen as shown in FIG. 30A.

According to various embodiments, the screen 8201 including information associated with the SIM shown in FIG. 30A may include a tab 821 corresponding to the first SIM 531 and a tab 823 corresponding to the first profile (eSIM 1). According to various embodiments, when the first SIM 531 is not included in the electronic device 101, the tab 821 corresponding to the first SIM 531 may not be displayed on the screen 8201. The electronic device 101 may display information (e.g., own number (e.g., MSISDN), PLMN information, or supportable network types) associated with the first SIM and the first profile on the tabs 821 and 823 corresponding to the first SIM and the first profile. The electronic device 101 may display the supportable network type (e.g., 5G/4G/3G/2G) for the enabled SIM (e.g., the first SIM and the first profile).

According to various embodiments, the electronic device 101 may detect a selection of the tab 823 corresponding to the first profile while the screen as shown in FIG. 30A is displayed. If the tab 823 corresponding to the first profile is selected, the electronic device 101 may display a screen including the information corresponding to the first profile in the form shown in FIG. 30B. For example, the screen 1310 including the information corresponding to the first profile may include a bar 1151 for toggling may include a bar 1151 for toggling the object 1152. If the object 1152 is placed in a first position on the bar 1151, the first profile may be enabled, and text (e.g., On) indicating that it is in the enabled state may be displayed. If the object 1152 is placed in a second position on the bar 1151, the first profile may be disabled, and text (e.g., Off) indicating that it is in the disabled state may be displayed. The electronic device 101 may change the position of the object 1122 based on a drag input corresponding to the object 1122 and control whether to enable first profile based on the position of the object 1152. According to various embodiments, upon identifying an input to move the object 1152 from the first position of the bar 1151 to the second position, the electronic device 101 may identify that a disable request for the first profile in the enabled state is received.

According to various embodiments, in operation 2903, if the processor 120 receives the profile disable request for the profile (e.g., the first profile), the electronic device 101 may identify whether PPR is applied to the disable-requested profile (e.g., the first profile), in operation 2905. As a result of the identification, in operation 2907, when it is determined that the enabled profile is a PPR-applied profile (yes in 2907) (e.g., when the PPR1 and/or PPR2 is determined to be applied to the profile), the processor 120 may display a screen (e.g., popup window) including information indicating that it is impossible to disable the disable-requested profile in operation 2909. According to various embodiments, the screen may be displayed as shown in FIG. 30C. For example, referring to FIG. 30C, the electronic device 101 may notify, through the screen 3010, that the first profile needs to be reinstalled after deleting all of the profiles currently installed on the electronic device 101 to disable the first profile. If the icon 3011 indicating the cancellation on the screen 3010 of FIG. 30C is selected, it may return to the screen 1310 of FIG. 30B.

According to various embodiments, if the icon 3012 indicating mobile plan deletion is selected on the screen 3010 of FIG. 30C, the processor 120 may reset the memory of storing the profiles to delete all the profiles installed on the electronic device 101 including the first profile in operation 2911.

According to various embodiments, the processor 120 may redownload and reinstall the profile in operation 2913. The profile reinstalled on the electronic device 101 may be in the disabled state.

According to various embodiments, as a result of identifying whether PPR is applied to the disable-requested profile in operation 2905, if the profile is determined to be a profile to which PPR is not applied in operation 2907 (e.g., when the PPR1 and/or PPR2 is determined not to be applied to the profile), the processor 120 of the electronic device 101 may disable the profile in operation 2917. The electronic device 101 may identify that the disabled profile is in the disabled state in operation 2915.

Figure 31:
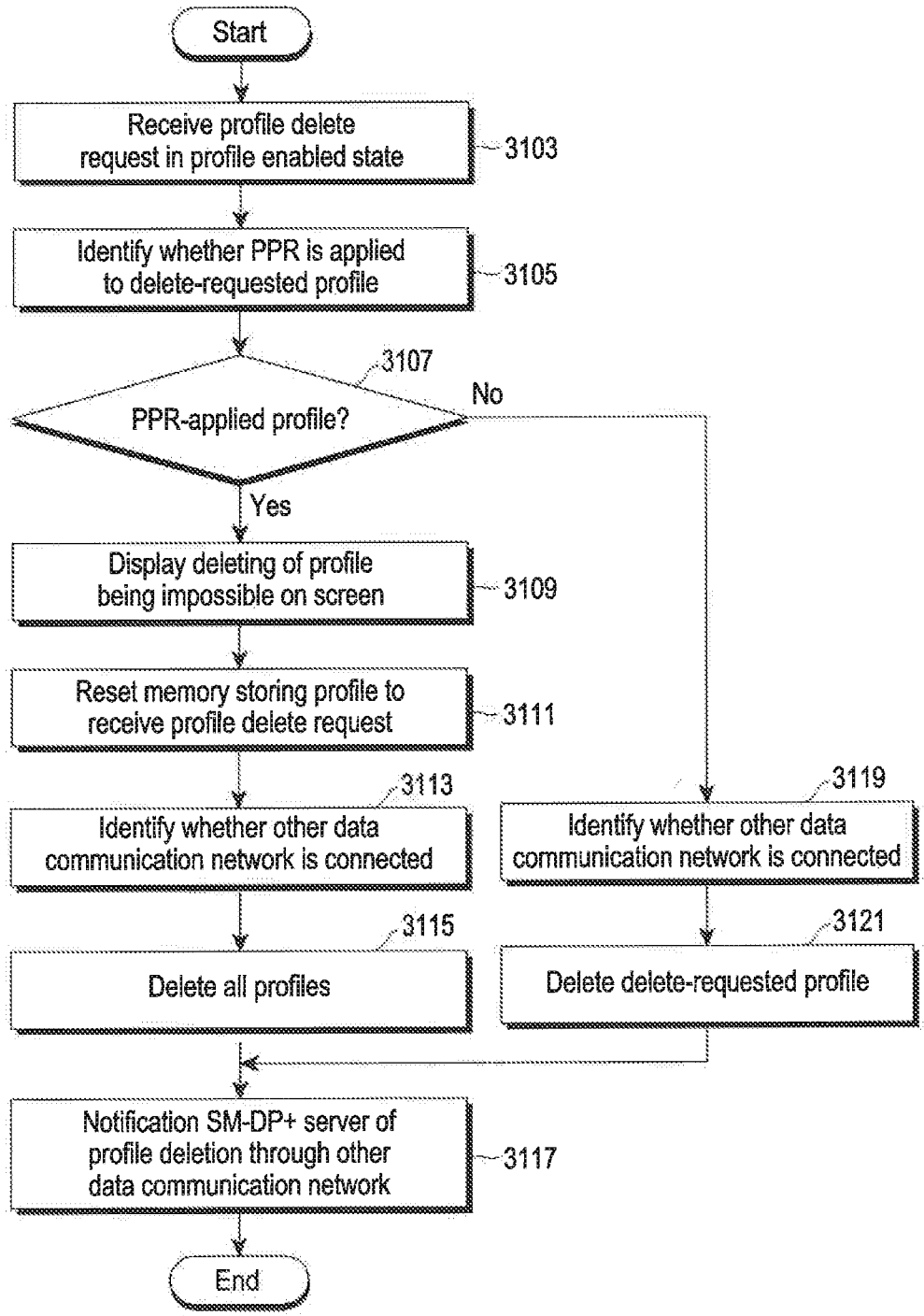
FIG. 31 is a flowchart illustrating a profile deleting method according to an embodiment of the disclosure.

FIG. 31 is a flowchart illustrating a profile deleting method according to an embodiment of the disclosure. FIG. 31 is described with reference to the electronic device 101 of FIG. 1 or 3, the eUICC 401 of FIG. 4, and FIGS. 32A, 32B, 32C, 32D, 32E, and 32F.

FIGS. 32A, 32B, 32C, 32D, 32E, and 32F illustrate screens displayed on an electronic device, according to various embodiments of the disclosure.

According to various embodiments, in the enabled state of the profile installed on the eUICC 401 of the electronic device 101, the processor 120 may receive a profile delete request in operation 3103. The delete request for the profile may be performed by the user selecting a corresponding function through a screen as shown in FIGS. 32A and 32B.

Figure 32A:
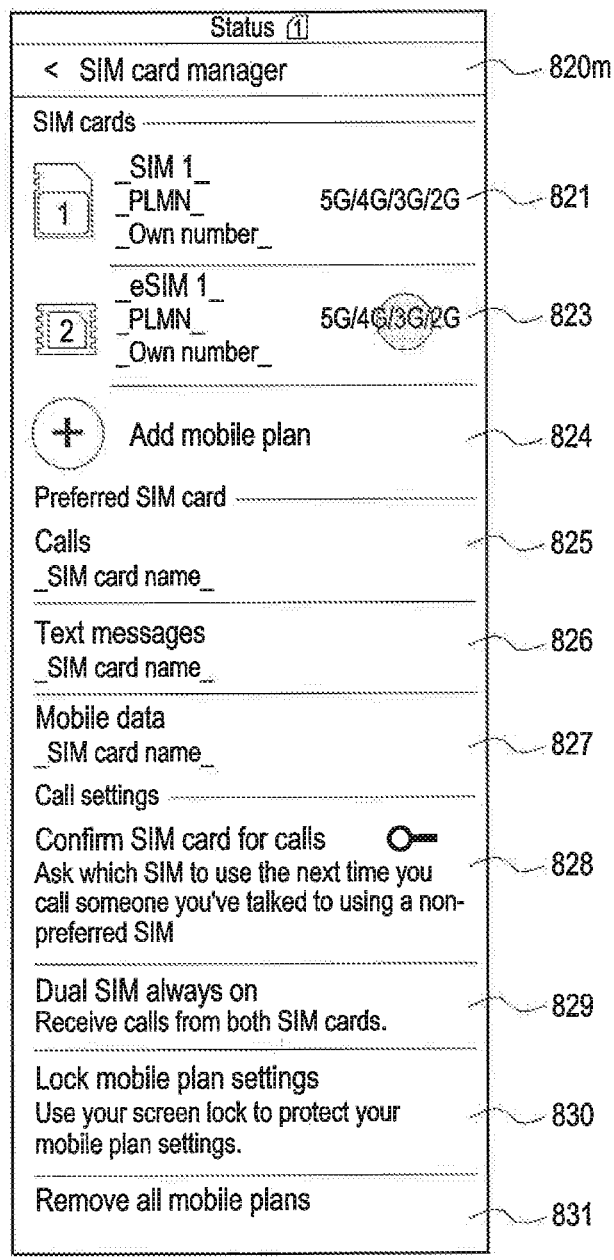
FIGS. 32A, 32B, 32C, 32D, 32E, and 32F illustrate screens displayed on an electronic device, according to various embodiments of the disclosure.

According to various embodiments, the screen 820*m* including information associated with the SIM shown in FIG. 32A may include a tab 821 corresponding to the first SIM 531 and a tab 823 corresponding to the first profile. According to various embodiments, when the first SIM 531 is not included in the electronic device 101, the tab 821 corresponding to the first SIM 531 may not be displayed on the screen 820*m*. The electronic device 101 may display information (e.g., own number (e.g., MSISDN), PLMN information, or supportable network types) associated with the first SIM and the first profile on the tabs 821 and 823 corresponding to the first SIM and the first profile. The electronic device 101 may display the supportable network type (e.g., 5G/4G/3G/2G) for the enabled SIM (e.g., the first SIM and the first profile).

According to various embodiments, the electronic device 101 may detect a selection of the tab 823 corresponding to the first profile eSIM 1 while the screen as shown in FIG. 32A is displayed. If the tab 823 corresponding to the first profile is selected, the electronic device 101 may display a screen including the information corresponding to the first profile, as shown in FIG. 32B.

Figure 32B:
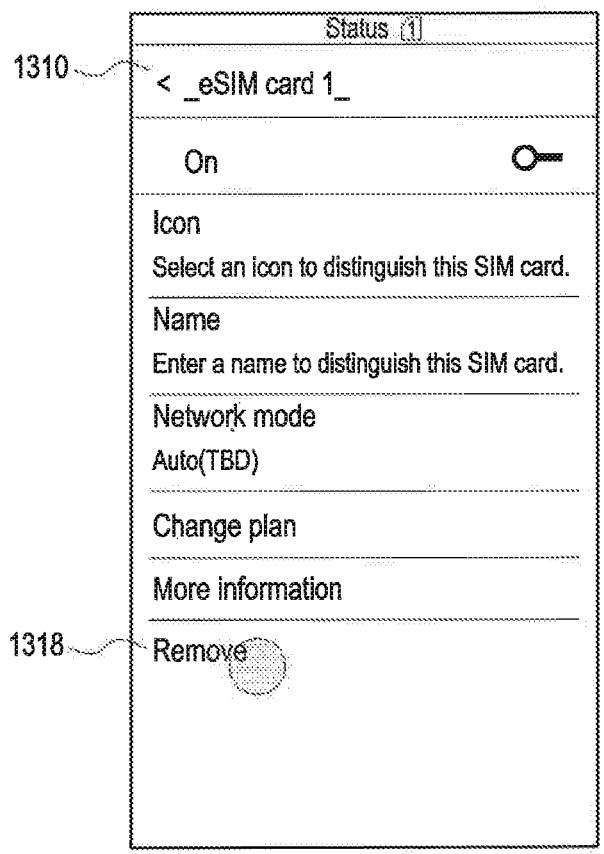

According to various embodiments, when the mobile plan delete tab 1318 is selected on the screen 1310 of FIG. 32B, the electronic device 101 may identify that a profile delete request of the profile (e.g., the first profile) is received.

Figure 32C:
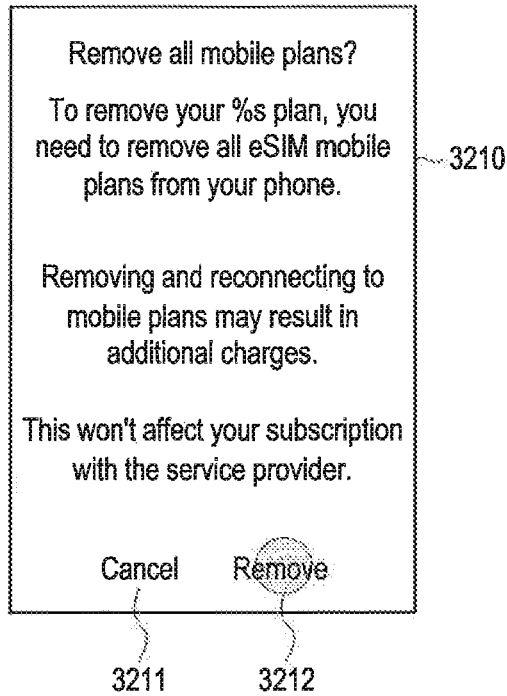

According to various embodiments, in operation 3103, if the processor 120 receives the profile delete request for the profile (e.g., the first profile), the electronic device 101 may identify whether PPR is applied to the profile in operation 3105. As a result of the identification, in operation 3107, if it is determined that the PPR is applied to the profile (yes in 3107) (e.g., if it is determined that PPR1 and/or PPR2 is applied to the profile), the processor 120 may display a screen (e.g., popup window) including information indicating that it is impossible to delete the delete-requested profile in operation 3109. According to various embodiments, the screen may be displayed as shown in FIG. 32C. For example, referring to FIG. 32C, the electronic device 101 may notify, through the screen 3210, that it is required to delete all of the profiles currently installed on the electronic device 101 to delete the profile. If the icon 3211 indicating the cancellation on the screen 3210 of FIG. 32C is selected, it may return to the screen 1310 of FIG. 32B.

Figure 32D:
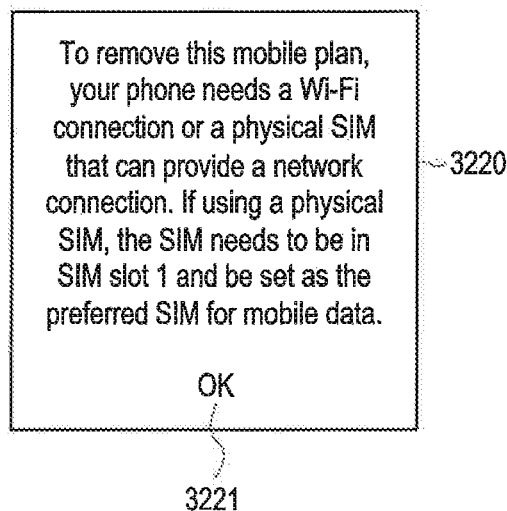

According to various embodiments, when the icon 3212 indicating mobile plan deletion is selected on the screen 3210 of FIG. 32C, the processor 120 may identify that a request for deleting all the profiles currently installed on the electronic device 101 is received. In operation 3113 before deleting all the profiles, the processor 120 may identify whether the connection is connection not with the communication network by the profile (e.g., the first profile) but with another data communication network (e.g., a communication network by physical SIM or Wi-Fi). As a result of the identification, if there is no communication connection by the other data communication network, the processor 120 may display a screen 3220 (e.g., popup window) notifying that connection with the other data communication network is needed as shown in FIG. 32D. Referring to FIG. 32D, the screen 3220 may notify that to delete all the profiles, connection with the other data communication network is needed and, to connect by the physical SIM, the SIM card is inserted to the SIM slot, and the physical SIM should be set to the SIM to be first connected. If the icon 3221 indicating the approval of deletion on the screen 3220 of FIG. 32D is selected, network connection may be awaited.

According to various embodiments, upon identifying that there is connection of the communication network by another data communication network, the processor 120 may reset the memory storing the profiles in operation 3111 to delete all the profiles installed on the electronic device 101 including the profile (e.g., the first profile) in operation 3115. In operation 3117, the processor 120 may notify the server (e.g., the SM-DP+ server 220) that the corresponding profile is deleted through the connected other data communication network.

Figure 32E:
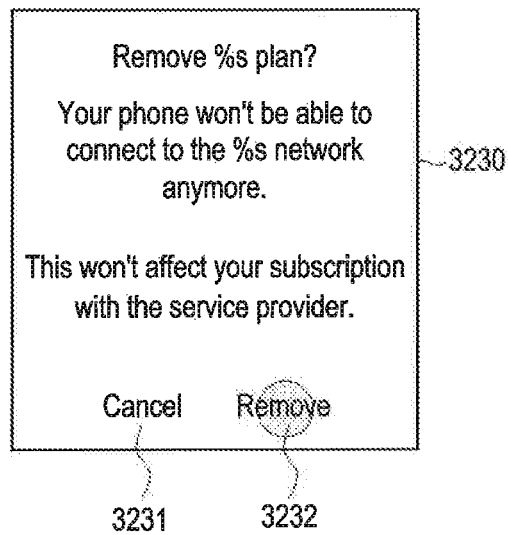

According to various embodiments, as a result of identifying whether PPR is applied to the delete-requested profile in operation 3105, if the profile is determined to be a profile to which PPR is not applied in operation 3107 (no in 3107) (e.g., when the PPR1 and/or PPR2 is determined not to be applied to the profile), the processor 120 of the electronic device 101 may display a screen (e.g., popup window) including information previously indicating that it is impossible to provide the communication network service using the profile as the profile is deleted. According to various embodiments, the screen may be displayed as shown in FIG. 32E. For example, referring to FIG. 32E, the electronic device 101 may notify, through the screen 3230, that it is impossible to provide the communication network service if the profile is deleted. If the icon 3231 indicating the cancellation on the screen 3230 of FIG. 32C is selected, it may return to the screen 1310 of FIG. 32E

Figure 32F:
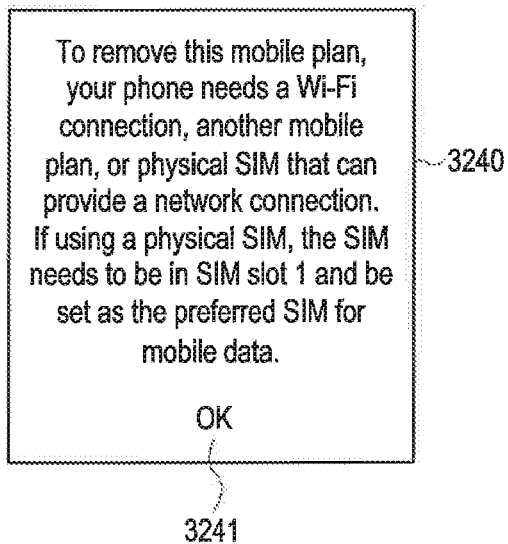

According to various embodiments, when the icon 3232 indicating mobile plan deletion is selected on the screen 3230 of FIG. 32E, the processor 120 may identify that the request for deleting the profile is received and terminate the network connection based on the delete-requested profile. In operation 3119 before deleting the delete-requested profile, the processor 120 may identify whether the connection is connection not with the communication network by the profile (e.g., the first profile) but with another data communication network (e.g., Wi-Fi or communication network by another profile which is not delete-requested or physical SIM). As a result of the identification, if the communication connection by the other data communication network is not connected, the processor 120 may display a screen 3240 (e.g., popup window) notifying that connection with the other data communication network is needed as shown in FIG. 32*f*. Referring to FIG. 32F, the screen 3240 may notify that to delete the delete-requested profile, connection with the other data communication network is needed and, to connect by the physical SIM, the SIM card is inserted to the SIM slot, and the physical SIM should be set to the SIM to be first connected. If the icon 3241 indicating the approval of deletion on the screen 3240 of FIG. 32F is selected, network connection may be awaited.

According to various embodiments, if it is identified that a communication network by another data communication network is connected, the processor 120 may delete the delete-requested profile in operation 3121. In operation 3117, the processor 120 may notify the server (e.g., the SM-DP+ server 220) that the corresponding profile (e.g., the first profile) is deleted through the connected other data communication network.

Figure 33A:
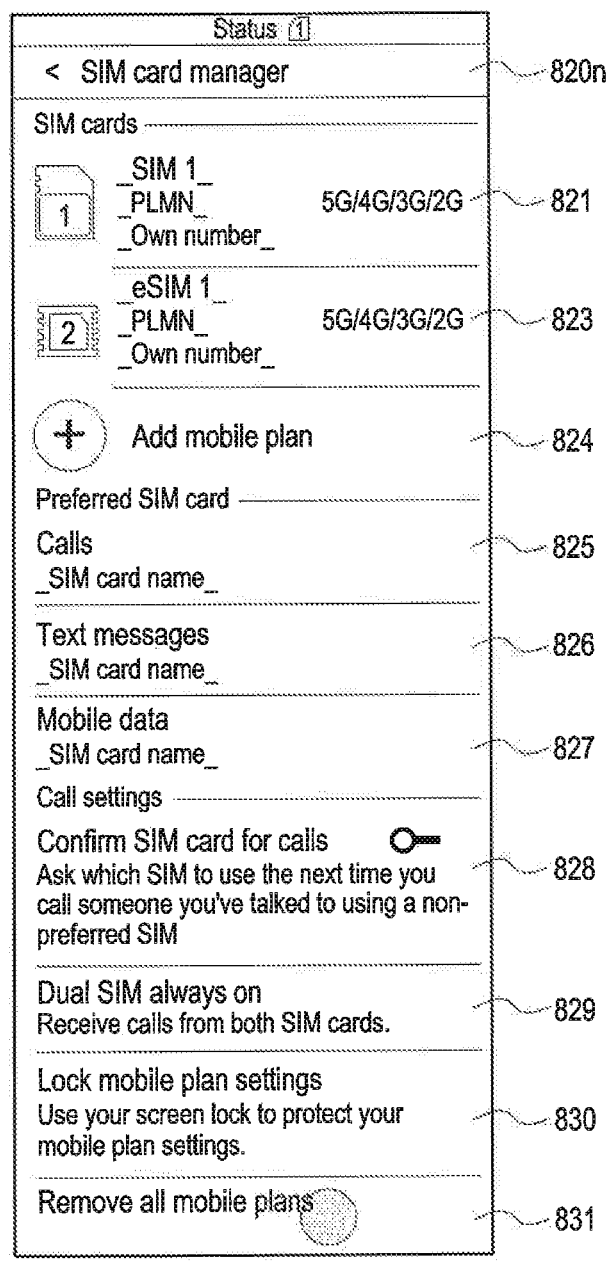
FIGS. 33A, 33B, and 33C illustrate screens displayed on an electronic device, according to various embodiments of the disclosure.
Figure 33B:
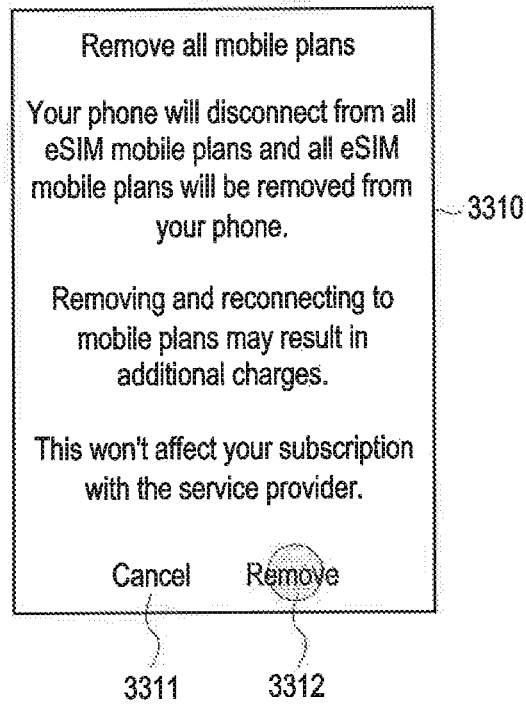
Figure 33C:
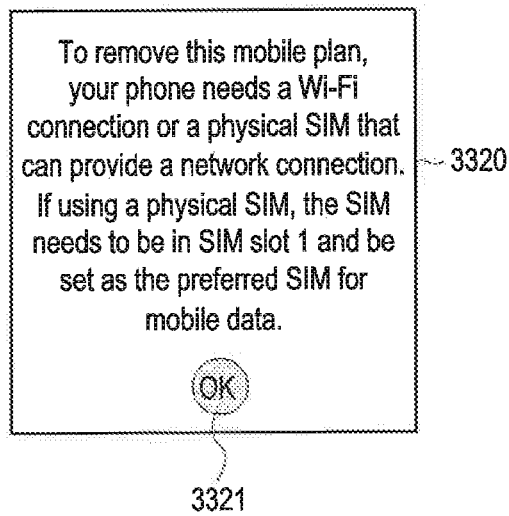

FIGS. 33A, 33B, and 33C illustrate screens displayed on an electronic device, according to various embodiments of the disclosure.

According to various embodiments, if the delete all mobile plans tab 831 is selected on the screen 820*n* of FIG. 33A, the processor 120 may display a screen (e.g., popup window) including information indicating that communication network connection by all the profiles is stopped according to the delete request. According to various embodiments, the screen may be displayed as shown in FIG. 33B. For example, referring to FIG. 33B, the electronic device 101 may notify through the screen 3310 that if the profile is deleted, future additional download of the profile may be charged. If the icon 3311 indicating the cancellation on the screen 3310 of FIG. 33B is selected, it may return to the screen 1310 of FIG. 33A.

According to various embodiments, when the icon 3312 indicating mobile plan deletion is selected on the screen 3310 of FIG. 33B, the processor 120 may identify that a request for deleting all the profiles currently installed on the electronic device 101 is received. Before deleting all the profiles, the processor 120 may identify whether there is connection with another data communication network (e.g., Wi-Fi or communication network by the physical SIM). As a result of the identification, if the communication connection by the other data communication network is not connected, the processor 120 may display a screen 3320 (e.g., popup window) notifying that connection with the other data communication network is needed as shown in FIG. 33C. Referring to FIG. 33C, the screen 3320 may notify that to delete all the profiles, connection with the other data communication network is needed and, to connect by the physical SIM, the SIM card is inserted to the SIM slot, and the physical SIM should be set to the SIM to be first connected. When the icon 3321 indicating approval of deletion is selected on the screen 3320 of FIG. 33C, the processor 120 may identify that a request for deleting all the profiles is received.

According to various embodiments, the processor 120 may delete all the profiles installed in the electronic device 101 including the profile by resetting the memory storing the profiles.

Figure 34A:
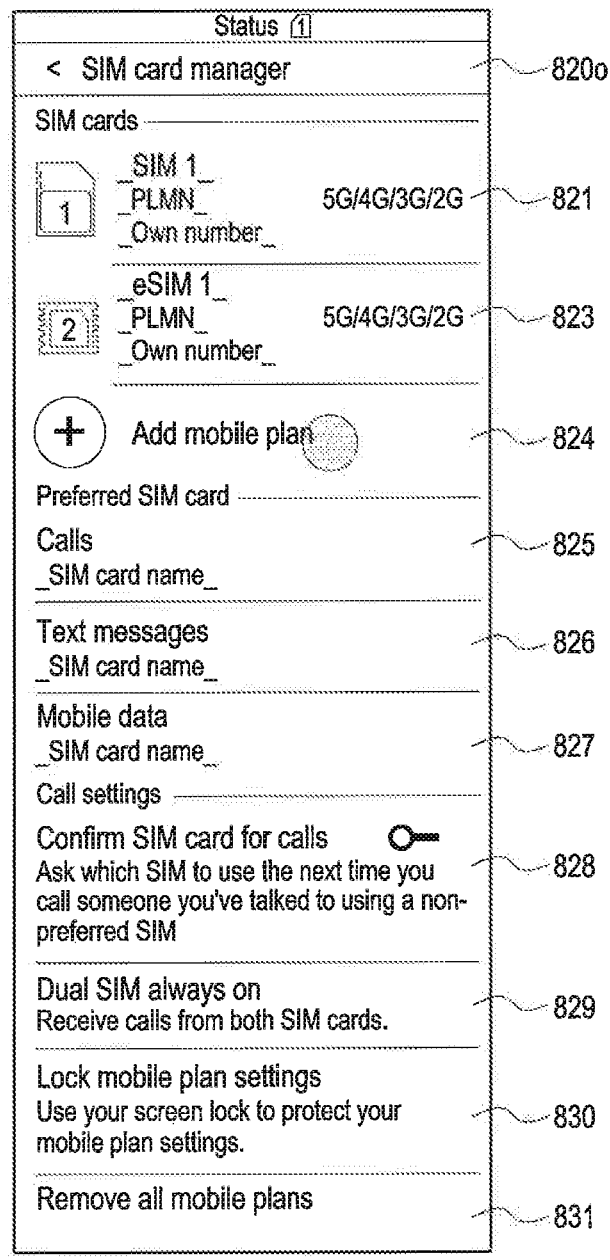
FIGS. 34A, 34B, and 34C illustrate screens displayed on an electronic device, according to various embodiments of the disclosure.
Figure 34B:
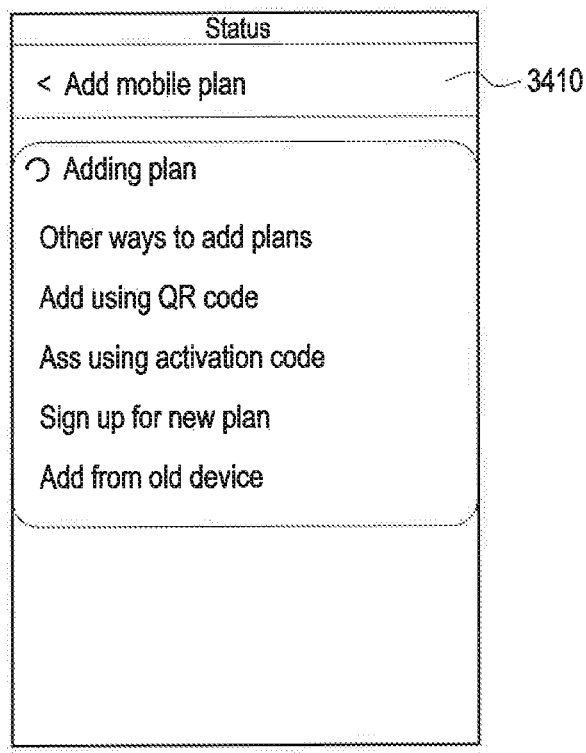
Figure 34C:
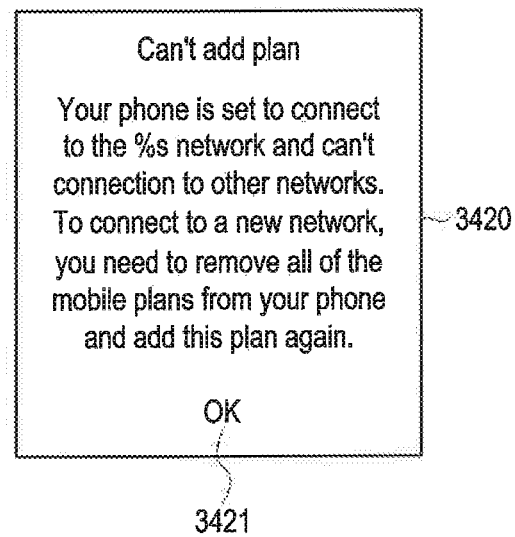

FIGS. 34A, 34B, and 34C illustrate screens displayed on an electronic device, according to various embodiments of the disclosure.

According to various embodiments, if a tab 824 to add a mobile plan is selected on the screen 820*o* of FIG. 34A, the processor 120 may display the screen 3410 shown in FIG. 34B. When a specific method for adding a mobile plan is selected on the screen 3410 shown in FIG. 34, it may be identified whether PPR is applied to an already installed eSIM. If is identified that there is a PPR-applied profile among the already installed profiles (e.g., when PPR1 and/or PPR2 is determined to be applied to the profile), the processor 120 may display a screen (e.g., popup window) including information indicating that it is impossible to add a new profile. According to various embodiments, the screen may be displayed as shown in FIG. 34C. For example, referring to FIG. 34C, the electronic device 101 may notify through the screen 3420 that it is impossible to add a new profile and, to add a new profile, all the profiles currently installed need to be deleted. If the icon 3421 indicating the confirm on the screen 3420 of FIG. 34C is selected, it may return to the screen 820*o* of FIG. 34A or the screen 3410 of FIG. 34B. According to various embodiments, the order of display of 34B and 34C may be changed. According to various embodiments, if a tab 824 to add a mobile plan is selected on the screen 820*o* of FIG. 34A, the screen 3420 of FIG. 34C may be first displayed. Thereafter, if the icon 3421 indicating the confirm on the screen 3420 of FIG. 34C is selected, the screen 3410 of FIG. 34B may be displayed.

Figure 35A:
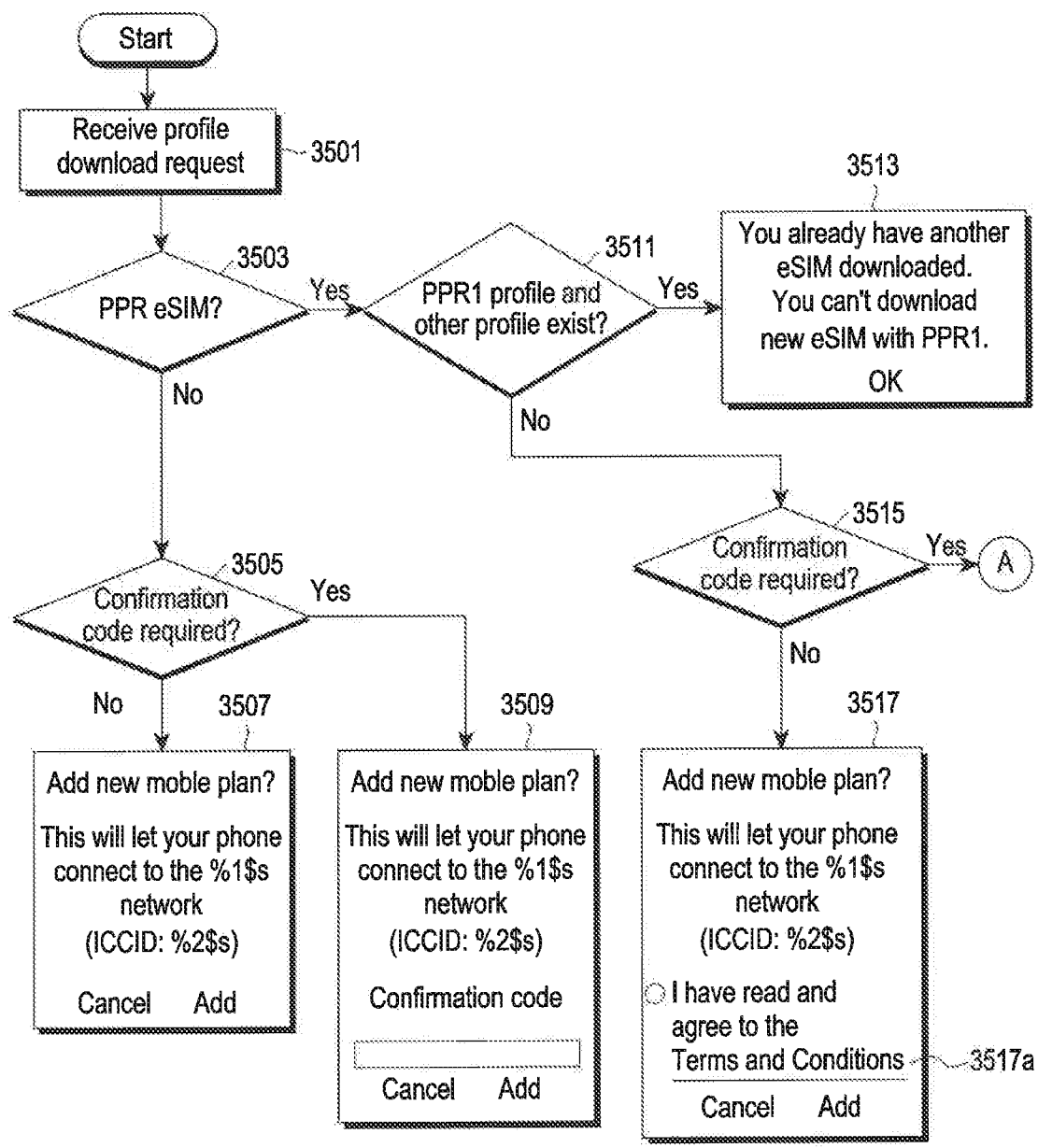
FIGS. 35A and 35B illustrate screens displayed on an electronic device according to various embodiments of the disclosure.
Figure 35B:
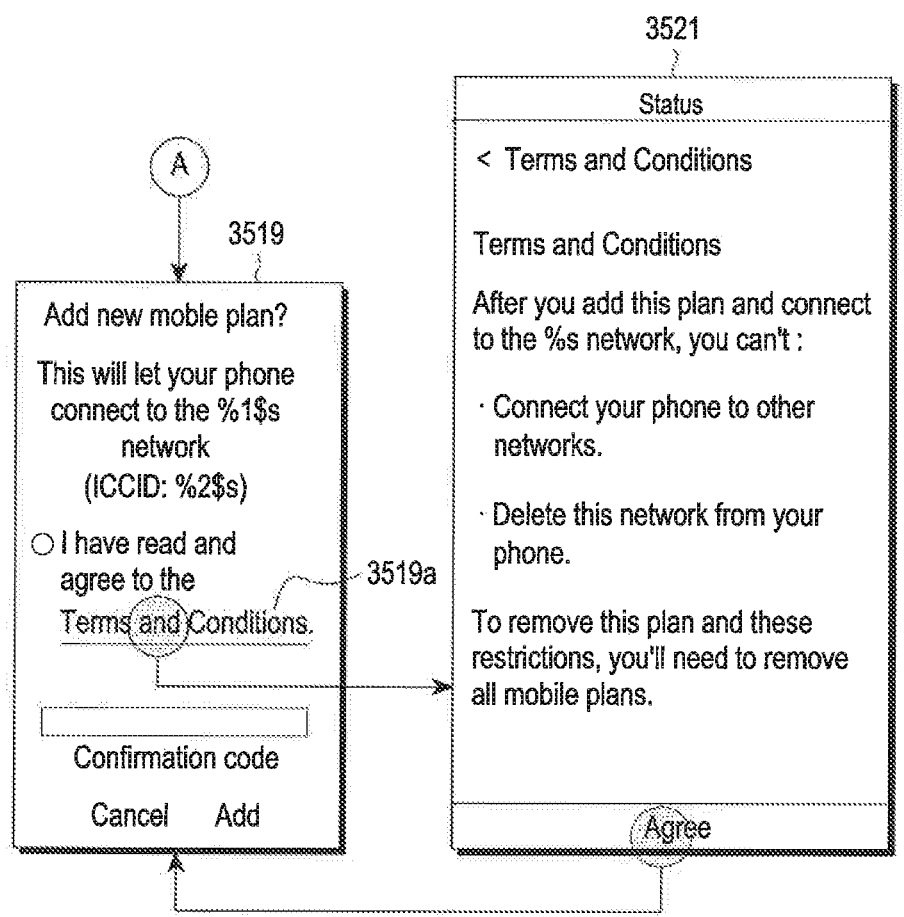

FIGS. 35A and 35B illustrate screens displayed on an electronic device according to various embodiments of the disclosure.

Referring to FIGS. 35A and 35B, the electronic device 101 may receive a profile download request in operation 3501.

According to various embodiments, the electronic device 101 may identify whether the download-requested profile is a PPR-applied profile and, upon determining that it is a profile to which PPR is not applied in operation 3503 (no in 3503), identify whether a confirmation code is needed. According to various embodiments, after receiving metadata before downloading the profile for the download-requested profile, the electronic device 101 may identify whether PPR is applied to the download-requested profile through the metadata. The confirmation code is a code that may be used when requesting to download a profile and be provided by the SM-DP+220. Upon requesting to download the profile, the SM-DP+220 may perform authentication by comparing the confirmation code entered by the user and the pre-stored confirmation code. If it is identified that no confirmation code is needed (no in 3505), the electronic device 101 may display an additional confirm screen 3507 to download a new profile (e.g., popup window). If it is identified that the confirmation code is needed (yes in 3505), the electronic device 101 may display an additional confirm and confirmation code input screen 3509 (e.g., popup window) to download a new profile.

According to various embodiments, the electronic device 101 may identify whether the download-requested profile is a PPR-applied profile and, upon determining that it is a PPR-applied profile in operation 3503 (yes in 3503), identify whether the download-requested profile is a PPR1-applied profile and identify whether there is another pre-installed profile. If it is identified that the download-requested profile is a PPR1-applied profile, and there is another pre-installed profile (yes in 3511), the electronic device 101 may display a screen 3513 indicating that it is impossible to download a new, PPR-applied profile because there is already another profile.

If it is identified that the download-requested profile is not a PPR1-applied profile (e.g., PPR2-applied profile) or there is no pre-installed profile (no in 3511), the electronic device 101 may identify whether the confirmation code is needed in operation 3515. If it is identified that no confirmation code is needed (no in 3515), the electronic device 101 may display an additional confirm screen 3517 to download a new profile (e.g., popup window), along with link information 3517*a* related to PPR. If it is identified that the confirmation code is needed (yes in 3515), the electronic device 101 may display an additional confirm and confirmation code input screen 3519 (e.g., popup window) to download a new profile, along with link information 3519*a* related to PPR. A SIM identification number (e.g., an integrated circuit card identifier (ICCID)) may also be displayed on the screen 3519.

According to various embodiments, if the PPR-related link information 3517*a* and 3519*a* is selected on the screen 3517 and screen 3519, detailed information related to PPR may be displayed on the screen 3521.

According to any one of various embodiments, an electronic device may comprise a display device; at least one embedded universal integrated circuit card (eUICC) each storing at least one subscriber identification information; and at least one processor electrically connected to the display device and the eUICC. The at least one processor may be configured to receive an enable request for a first profile stored in the eUICC, in response to the enable request, identify whether at least one profile policy rule (PPR) is applied to the first profile, when the at least one PPR is applied to the first profile as a result of the identification, control to display a first screen including information related to the application of the PPR through the display device, and upon receiving an enable approval for the first profile input through the first screen, process to enable the first profile.

According to various embodiments, the at least one PPR may include at least one of a rule to restrict disablement of the first profile or a rule to restrict deletion of the first profile.

According to various embodiments, the at least one processor may be further configured to receive a download request for a second profile, in response to the download request, identify whether at least one PPR is applied to the second profile, when the at least one PPR is applied to the second profile as a result of the identification, control to display a second screen including information related to the application of the PPR through the display device, and upon receiving an install approval for the second profile input through the second screen, download and install the second profile.

According to various embodiments, the at least one processor may be further configured to, upon receiving a download cancellation for the second profile input through the second screen, cancel a download procedure for the second profile.

According to various embodiments, the at least one processor may be configured to receive a download request for a second profile, in response to the download request, identify whether at least one PPR is applied to the first profile, and when the at least one PPR is applied to the first profile as a result of the identification, control to display a third screen including information related to the application of the PPR through the display device.

According to any one of various embodiments, a method for operating an electronic device may comprise receiving an enable request for a first profile stored in at least one embedded universal integrated circuit card (eUICC) each storing at least one subscriber identification information; in response to the enable request, identifying whether at least one profile policy rule (PPR) is applied to the first profile; when the at least one PPR is applied to the first profile as a result of the identification, displaying a first screen including information related to the application of the PPR through the display device; and upon receiving an enable approval for the first profile input through the first screen, processing to enable the first profile.

According to various embodiments, the at least one PPR may include at least one of a rule to restrict disablement of the first profile or a rule to restrict deletion of the first profile.

According to various embodiments, the method may further comprise receiving a download request for a second profile; in response to the download request, identifying whether at least one PPR is applied to the second profile; when the at least one PPR is applied to the second profile as a result of the identification, displaying a second screen including information related to the application of the PPR through the display device; and upon receiving an install approval for the second profile input through the second screen, downloading and installing the second profile.

According to various embodiments, the method may further comprise, upon receiving a download cancellation for the second profile input through the second screen, canceling a download procedure for the second profile.

According to various embodiments, the method may further comprise receiving a download request for the second profile; in response to the download request, identifying whether at least one PPR is applied to the first profile; and when the at least one PPR is applied to the first profile as a result of the identification, displaying a third screen including information related to the application of the PPR through the display device.

According to any one of various embodiments, an electronic device may comprise a display device; an embedded universal integrated circuit card (eUICC) storing at least one subscriber identification information; and at least one processor electrically connected to the display device and the eUICC. The at least one processor may be configured to receive a disable request for a first profile stored in the eUICC, in response to the disable request, identify whether at least one profile policy rule (PPR) is applied to the first profile, and when the at least one PPR is applied as a result of the identification, display, through the display device, a first screen including information indicating that it is impossible to disable the first profile requested to be disabled.

According to various embodiments, the at least one PPR may include at least one of a rule to restrict disablement of the first profile or a rule to restrict deletion of the first profile.

According to various embodiments, the at least one processor may be further configured to, upon receiving an input corresponding to profile deletion through the first screen, reset a memory storing the first profile to delete the first profile.

According to various embodiments, the at least one processor may be further configured to redownload the first profile after resetting the memory.

According to various embodiments, the at least one processor may be further configured to identify a setting of a communication network to redownload the first profile before resetting the memory.

According to any one of various embodiments, a method for operating an electronic device may comprise receiving a disable request for a first profile stored in an embedded universal integrated circuit card (eUICC) storing at least one subscriber identification information; in response to the disable request, identifying whether at least one profile policy rule (PPR) is applied to the first profile; and when the at least one PPR is applied as a result of the identification, displaying, through the display device, a first screen including information indicating that it is impossible to disable the first profile requested to be disabled.

According to various embodiments, the at least one PPR may include at least one of a rule to restrict disablement of the first profile or a rule to restrict deletion of the first profile.

According to various embodiments, the method may further comprise, upon receiving an input corresponding to profile deletion through the first screen, resetting a memory storing the first profile to delete the first profile.

According to various embodiments, the method may further comprise redownloading the first profile after resetting the memory.

According to various embodiments, the method may further comprise identifying a setting of a communication network to redownload the first profile before resetting the memory.

The electronic device according to an embodiment of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a display device;
   at least one embedded universal integrated circuit card (eUICC) each storing at least one subscriber identification information;
   at least one processor electrically connected to the display device and the eUICC; and
   memory storing instructions,
   wherein the instructions, when executed by the at least one processor individually or collectively, cause the electronic device to:
      in response to receiving an enable request for a first profile stored in the eUICC, identify whether at least one profile policy rule (PPR) is applied to the first profile, wherein at least one PPR includes at least one of a rule to restrict disablement of the first profile or a rule to restrict deletion of the first profile,
      based on identifying the at least one PPR is applied to the first profile, control to display, through the display device, information related to the at least one PPR being applied to the first profile,
      based on receiving a user input to approve an enable approval for enabling of the first profile, enable the first profile, and
      in response to receiving a download request for a second profile while the first profile with the at least one PPR applied is enabled, display information indicating that an enablement of the second profile is not allowed after downloaded.

2. The electronic device of claim 1, wherein the instructions, when executed by the at least one processor individually or collectively, cause the electronic device to:
   in response to a download request for a third profile, identify whether at least one PPR is applied to the third profile;
   based on identifying that the at least one PPR is applied to the third profile, display, through the display device, a third screen including information related to the at least one PPR being applied to the third profile; and
   upon receiving an install approval for the third profile, input through the third screen, download and install the third profile.

3. The electronic device of claim 2, wherein the instructions, when executed by the at least one processor individually or collectively, cause the electronic device to, upon receiving an user input for a download cancellation of the third profile through the third screen, cancel a download procedure for the third profile.

4. A method for operating an electronic device, the method comprising:
receiving an enable request for a first profile stored in at least one embedded universal integrated circuit card (eUICC) each storing at least one subscriber identification information;
in response to receiving the enable request, identifying whether at least one profile policy rule (PPR) is applied to the first profile, wherein at least one PPR includes at least one of a rule to restrict disablement of the first profile or a rule to restrict deletion of the first profile;
based on identifying that the at least one PPR is applied to the first profile, displaying information related to the at least one PPR being applied to the first profile;
based on receiving a user input to approve an enabling of the first profile, enabling the first profile; and
in response to receiving a download request for a second profile while the first profile with the at least one PPR applied is enabled, displaying information indicating that an enablement of the second profile is not allowed after downloaded.

5. The method of claim 4, further comprising:
in response to a download request for a third profile, identifying whether at least one PPR is applied to the third profile;
based on identifying that the at least one PPR is applied to the third profile, displaying a third screen including information related to the at least one PPR being applied to the third profile; and
upon receiving an install approval for the third profile input through the third screen, downloading and installing the third profile.

6. The method of claim 5, further comprising, upon receiving an user input for a download cancellation of the third profile input through the third screen, canceling a download procedure for the third profile.

7. An electronic device, comprising:
a display device;
an embedded universal integrated circuit card (eUICC) storing at least one subscriber identification information;
memory storing instructions; and
at least one processor electrically connected to the display device and the eUICC,
wherein the instructions, when executed by the at least one processor individually or collectively, cause the electronic device to:
receive a disable request for a first profile stored in the eUICC,
in response to the disable request, identify whether at least one profile policy rule (PPR) is applied to the first profile, and
when the at least one PPR is applied as a result of the identification, display, through the display device, a first screen including information indicating that it is impossible to disable the first profile requested to be disabled.

8. The electronic device of claim 7, wherein the at least one PPR includes at least one of a rule to restrict disablement of the first profile or a rule to restrict deletion of the first profile.

9. The electronic device of claim 7, wherein the instructions, when executed by the at least one processor individually or collectively, cause the electronic device to, upon receiving an input corresponding to profile deletion through the first screen, reset a memory storing the first profile to delete the first profile.

10. The electronic device of claim 9, wherein the instructions, when executed by the at least one processor individually or collectively, cause the electronic device to redownload the first profile after resetting the memory.

11. The electronic device of claim 9, wherein the instructions, when executed by the at least one processor individually or collectively, cause the electronic device to identify a setting of a communication network to redownload the first profile before resetting the memory.

12. A method for operating an electronic device, the method comprising:
receiving a disable request for a first profile stored in an embedded universal integrated circuit card (eUICC) storing at least one subscriber identification information,
in response to the disable request, identifying whether at least one profile policy rule (PPR) is applied to the first profile, and
when the at least one PPR is applied as a result of the identification, displaying, through a display of the electronic device, a first screen including information indicating that it is impossible to disable the first profile requested to be disabled.

13. The method of claim 12,
wherein the at least one PPR includes at least one of a rule to restrict disablement of the first profile or a rule to restrict deletion of the first profile.

14. The method of claim 12, further comprising:
receiving an input corresponding to profile deletion through the first screen, and
resetting a memory storing the first profile to delete the first profile.

15. The method of claim 14, further comprising:
redownloading the first profile after resetting the memory.

16. The method of claim 14, further comprising:
identifying a setting of a communication network to redownload the first profile before resetting the memory.

17. The electronic device of claim 1, wherein the instructions, when executed by the at least one processor individually or collectively, cause the electronic device to:
display, in response to receiving a download request for a second profile while the first profile with the at least one PPR applied is enabled, information for notifying that a memory reset needs to download a new profile, or a menu for a shortcut to the memory reset.

18. The electronic device of claim 17, wherein the instructions, when executed by the at least one processor individually or collectively, cause the electronic device to:
receive the download request for the second profile through a menu for downloading a specific profile,
receive the download request for the second profile through a link included in a webpage, or
scan an activation code-included quick response (QR) code-based voucher.

19. The method of claim 4, further comprising:
in response to receiving a download request for a second profile while the first profile with the at least one PPR applied is enabled, displaying information for notifying that a memory reset needs to download a new profile, or a menu for a shortcut to the memory reset.

20. The method of claim 19, further comprising:
receiving the download request for the second profile through a menu for downloading a specific profile,
receiving the download request for the second profile through a link included in a webpage, or
scanning an activation code-included quick response (QR) code-based voucher.

\* \* \* \* \*